United States Patent
Merwaday et al.

(10) Patent No.: US 12,302,234 B2
(45) Date of Patent: May 13, 2025

(54) MANAGING SESSION CONTINUITY FOR EDGE SERVICES IN MULTI-ACCESS ENVIRONMENTS

(71) Applicant: Intel Corporation, Santa Clara, CA (US)

(72) Inventors: Arvind Merwaday, Hillsboro, OR (US); Kathiravetpillai Sivanesan, Portland, OR (US); Hassnaa Moustafa, San Jose, CA (US); Suman A. Sehra, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 17/727,072

(22) Filed: Apr. 22, 2022

(65) Prior Publication Data

US 2022/0248296 A1   Aug. 4, 2022

Related U.S. Application Data

(60) Provisional application No. 63/179,113, filed on Apr. 23, 2021.

(51) Int. Cl.
 *H04W 36/00* (2009.01)
 *H04W 36/12* (2009.01)
 (Continued)

(52) U.S. Cl.
 CPC ........ *H04W 48/18* (2013.01); *H04W 36/0011* (2013.01); *H04W 36/125* (2018.08); *H04W 36/302* (2023.05); *H04W 88/06* (2013.01)

(58) Field of Classification Search
 CPC .......... H04W 36/0011; H04W 36/302; H04W 36/0016
 See application file for complete search history.

(56) References Cited

U.S. PATENT DOCUMENTS

| | | | |
|---|---|---|---|
| 2016/0205606 A1* | 7/2016 | Park | H04W 48/20 |
| | | | 455/436 |
| 2019/0124522 A1* | 4/2019 | Cao | H04W 16/30 |

(Continued)

OTHER PUBLICATIONS

David Garcia-Roger et al., "V2X Support in 3GPP Specifications: From 4G to 5G and Beyond", IEEE Access, vol. 8, pp. 190946-190963 (Oct. 5, 2020), doi: 10.1109/ACCESS.2020.3028621.

(Continued)

*Primary Examiner* — Barry W Taylor
(74) *Attorney, Agent, or Firm* — Schwegman Lundberg & Woessner, P.A.

(57) ABSTRACT

The present disclosure describes mechanisms to manage session continuity for edge computing services for edge service consumers. The session management mechanisms include continuity or handing over edge service sessions between edge computing platforms in a same edge compute cluster and between edge computing platforms in different edge compute clusters. The session management mechanisms include edge computing platform switching/handover for user equipment capable of utilizing multiple access network connections and/or multiple access technologies. The described solutions can provide edge service session continuity between connected vehicles and road side units and/or edge compute nodes.

25 Claims, 13 Drawing Sheets

(51) Int. Cl.
    *H04W 36/30*     (2009.01)
    *H04W 48/18*     (2009.01)
    *H04W 88/06*     (2009.01)

(56) References Cited

U.S. PATENT DOCUMENTS

2020/0178198 A1*   6/2020  Ding .................... H04W 60/04
2022/0272672 A1*   8/2022  Zhu ..................... H04L 5/0053

OTHER PUBLICATIONS

C. Armani et al., "Cognitive multi-mode and multi-standard base stations: architecture and system analysis", Wireless Innovation Forum European Conference Communications Technologies Software Defined Radio (WInnComm-Europe 2012), 8 pages, (Jun. 27, 2012).
"Multi-access Edge Computing (MEC); V2X Information Service API", ETSI GS MEC 030 V2.1.1, 59 pages (Apr. 2020).
"Multi-access Edge Computing (MEC); Framework and Reference Architecture", ETSI GS MEC 003 V2.2.1, 21 pages (Dec. 2020).

\* cited by examiner

MANAGING SESSION CONTINUITY FOR EDGE SERVICES IN MULTI-ACCESS ENVIRONMENTS

RELATED APPLICATIONS

The present application claims priority to U.S. Provisional App. No. 63/179,113 filed on Apr. 23, 2021, the contents of which are hereby incorporated by reference in its entirety.

TECHNICAL FIELD

The present disclosure is generally related to edge computing, network communication, communication system implementations, and vehicle-to-everything (V2X) communications, and in particular, to techniques for managing edge session/service continuity in edge networks with multi-access connections.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services. Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

DETAILED DESCRIPTION

Figure 1:
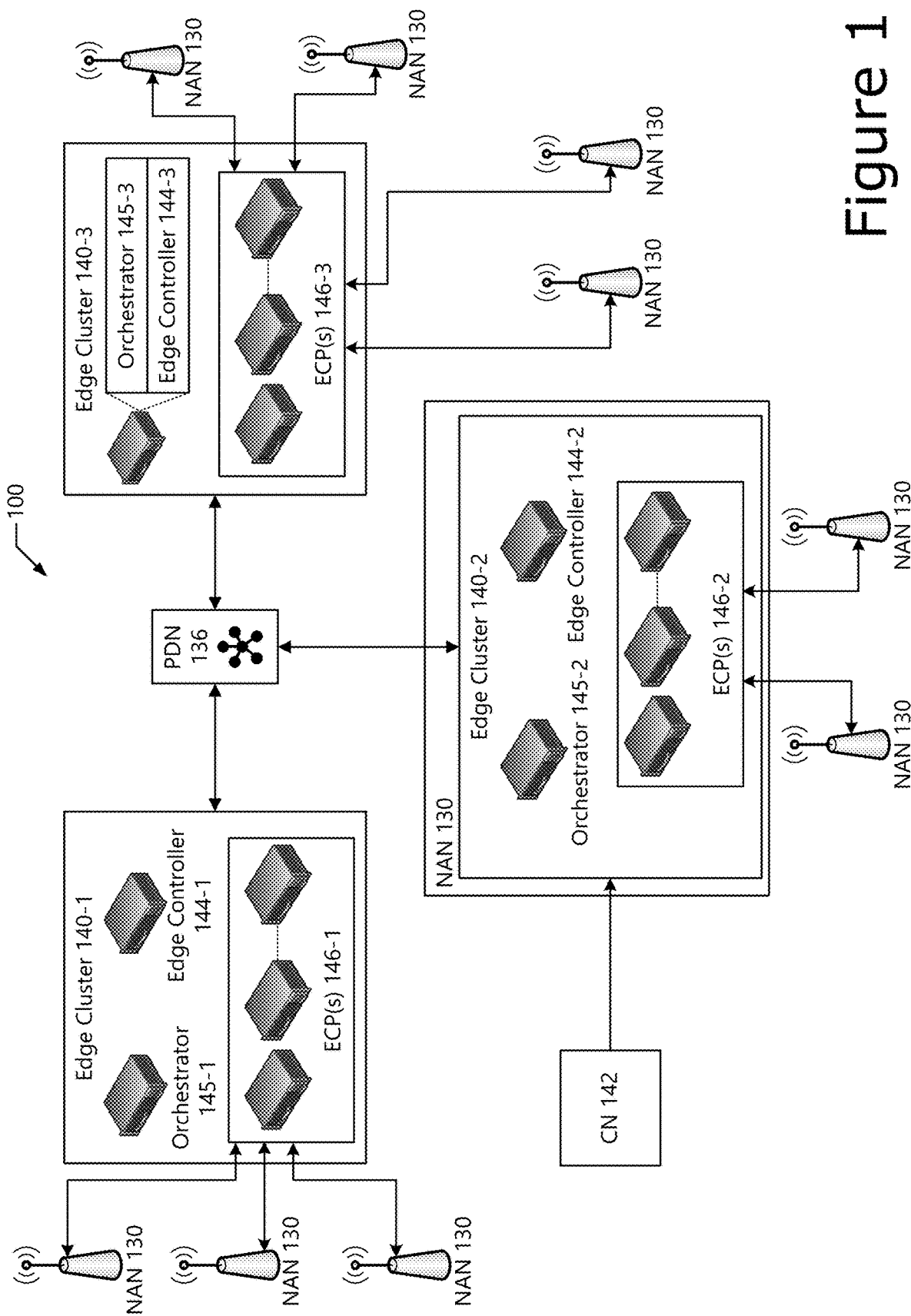
FIG. 1 depicts an example distributed architecture for the edge network to support mobility.

The present disclosure is generally related to edge computing, network communication, communication system implementations, and vehicle-to-everything (V2X) communications, and in particular, to techniques for managing edge session/service continuity in edge networks with multi-access connections.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, and the like), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like. One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, and the like). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies. For purposes of the present disclosure, V2X RATs include C-V2X RATs (e.g., LTE-V2X including LTE-Uu and LTE-PC5 interfaces, NR-V2X including the NR-Uu and NR-PC5 interfaces, and the like), a WLAN V2X (W-V2X) RATs (e.g., including DSRC in the USA or ITS-G5 in the EU, [IEEE80211p], [IEEE16090], IEEE 802.11bd, and/or the like), and/or other V2X RATs. These systems do not have mechanisms to coexist with one another and are usually not interoperable with one another.

Road side units (RSUs) are being deployed to bring wireless connectivity (V2I) to vehicles, and other road users, and enable new set of applications such as safety warnings and smart city services. Edge computing platforms (ECPs) are being deployed along with RSUs in order to provide edge services to the vehicles and other connected nodes. Different air-interface standards such cellular V2X (C-V2X) RATs, WLAN V2X (W-V2X) RATs, among others, are expected to co-exist in RSU deployments due to wireless spectrum policies in different countries, government mandates, availability of these technologies, and/or other like constraints.

As ECPs and RSUs aim at providing environment awareness, safety and smart city services to vehicles and other road users, message and services continuity throughout the vehicle journey is important. Otherwise, the vehicle and other road users' needs to be re-authenticated whenever they move to a new RUS's coverage area. Cellular air-interfaces/C-V2X RATs inherently support continuity in network sessions, via handovers, when a mobile node moves from one base station to another. However, the mobility management functions therein provide session continuity only with respect to the core network. An open issue is that none of these air-interfaces provide a solution for session continuity in edge services. Another issue is that, given the co-existence of different air-interfaces and/or RATs, there is no existing solution available when a mobile node switches its connectivity from one interface/RAT type to another interface/RAT type (or is handed over from one interface/RAT type to another interface/RAT type). For example, when a vehicle switches connectivity from a C-V2X RAT to a W-V2X RAT, the continuity in edge services and/or edge session is likely to be lost or disconnected.

In ETSI specifications (see e.g., [MEC003], [MEC030], [MEC]), the MEC system reference architecture includes an Mp3 reference point as the interface for control communication between MEC platforms. [MEC003] annex A.4 provides requirements of the MEC system to handle edge application (app) and UE mobility. However, the procedures for handling edge app and UE mobility, and the message formats for Mp3 interface are not provided in these specifications. The ETSI specifications briefly mention about the handling of edge app and UE mobility to achieve session continuity in edge services, however, it does not provide any details about the same.

The present disclosure provides solutions for achieving session continuity for edge services consumed by vehicles and/or other users that switch between RSUs and/or ECPs, or are handed over between RSUs and/or ECPs. In some implementations, whenever cellular connectivity is available at an RSU and/or ECP, the (edge) session continuity processes are coordinated to reduce the signaling overhead and provide better service to user devices. The solution discussed herein solve issues related to session continuity upon C-V2X (e.g., PC5 interface) usage, and supports session continuity upon a connectivity switch from C-V2X RATs to W-V2X RATs (e.g., inter-RAT handover). The mechanisms discussed herein provide efficiencies in operation and management of network edge infrastructure platforms and can open opportunity for multi-tenant edge infrastructure deployments.

The mechanisms discussed herein may be implemented using new messages/packets for session continuity/mobility management, which can be detected using packet inspection and tracing mechanisms. Furthermore, the example implementations discussed herein can be part of software releases(s) with ECPs for roadside infrastructure and can be shown in the products documentation. Additionally or alternatively, the example implementations herein can be specified in suitable standards such as 3GPP, ETSI, 5GAA, AECC, and/or other like standards.

1. Edge Computing Platform (ECP) Session Continuity

FIG. 1 shows an example mobility architecture 100 for an edge network, which includes edge clusters 140 (including edge cluster 140-1, edge cluster 140-2, and edge cluster 140-3) interconnected via packet data network (PDN) 136 and/or any other private network. One or more of the edge clusters 140 can be connected to a core network (CN) 142, a cloud computing service (e.g., cloud 360 of FIGS. 3, 6, and 7; cloud 1060 of FIG. 10; and/or the like), and/or more app servers (not shown by FIG. 1). The edge clusters 140 may be the same or similar as the edge compute node 1040 of FIG. 10; the NANs 130 may be the same or similar as the NANs 1030 of FIG. 10 and/or ANs 1104 of FIG. 11; the CN 142 may be the same or similar as the CN 1120 of FIG. 11; and the PDN 136 may be the same or similar as the DN 1136 of FIG. 11.

In some implementations, an edge cluster 140 can be co-located with one or more network access nodes (NANs) 130 (see e.g., edge clusters 140-1 and 140-3 in FIG. 1). An edge cluster 140 being "co-located" with a NAN 130 can involve an edge cluster 140 being deployed or disposed at a same cell site or location as the NAN 130 (e.g., within some predefined distance or the like), where the NAN 130 and the edge cluster 140 are operated by different compute nodes and/or are separate standalone entities (e.g., edge clusters 140-1 and 140-3 in FIG. 1). Additionally or alternatively, an edge cluster 140 being "co-located" with the NAN 130 can include an edge cluster 140 being operated on the same compute platform as the NAN 130 (or one or more RAN functions of the underlying RAT(s) of the NAN 130), where the NAN 130 and the edge cluster 140 are different chips or integrated circuits (ICs) within a same compute node housing. Additionally or alternatively, an edge cluster 140 being "co-located" with the NAN 130 can include an edge cluster 140 and the NAN 130 (or one or more RAN functions of the underlying RAT(s) of the NAN 130) being software elements operated by the same compute node or circuitry. In some implementations, the edge cluster 140 and the NAN 130 are part of a multi-site network service, wherein the NAN 130 and the edge cluster 140 are deployed at more than one site or location. Additionally or alternatively, an edge cluster 140 being "co-located" with the NAN 130 can include an edge cluster 140 being deployed within a NAN 130 (see e.g., edge cluster 140-2 in FIG. 1).

Each edge cluster 140 includes an edge controller 144, an orchestrator 145, and one or more edge platforms (ECPs) 146. In some implementations, the edge controller 144 and the orchestrator 145 can be implemented as separate HW platforms (see e.g., edge controller 144-1 and orchestrator 145-1 in edge cluster 140-1, and edge controller 144-3 and orchestrator 145-3 in edge cluster 140-3). Additionally or alternatively, the edge controller 144 and the orchestrator 145 can be implemented as separate SW entities in the same HW platform (see e.g., edge controller 144-2 and orchestrator 145-2 in edge cluster 140-2).

The orchestrator 145 is responsible for some or all of the following functions: maintaining an overall view of the edge system/platform based on deployed edge compute function (ECF) and/or ECP 146, available resources, available edge services, and/or network topology; on-boarding of app packages including integrity and authenticity checks, validating application rules and requirements and adjusting them to comply with operator policies (if necessary), keeping a record/log of on-boarded packages, and preparing the virtualized infrastructure manager (VIM) to handle (edge) apps; selecting appropriate ECFs/workloads for app instantiation based on constraints (e.g., latency, data rate, bandwidth, and/or the like), available resources, and/or available services; and/or triggering app instantiation, relocation/migration, and termination. Additionally or alternatively, the orchestrator 145 may also provide or perform failure detection, notification, location, and repairs that are intended to eliminate or reduce faults and keep a segment in an operational state and support activities required to provide the services of a subscriber access network to users/subscribers. As examples, the orchestrator 145 may be an O-RAN Service Management and Orchestration (SMO) function (see e.g., [O-RAN]), O-RAN non-real-time RAN intelligent controller (Non-RT RIC) (see e.g., [ORANWP] and/or [O-RAN]), ETSI Management and Orchestration (MANO) function (see e.g., [ETSINFV]), Open Network Automation Platform (ONAP) (see e.g., [ONAP]), a 3GPP Service Based Management Architecture (SBMA) (see e.g., [TS28533]), a network management system (NMS), an [IEEE802] OAM entity, and/or the like. The orchestrator 145 sends management commands and data to respective ECPs 146 via a suitable ECT interface, and receives relevant data from the respective ECPs 146 via such interfaces.

Each edge cluster 140 also includes an edge controller 144 (also referred to as "network controller 144", "intelligent controller 144", "intelligent coordinator 144", "RAN controller 144", "RAN Intelligent Controller 144" or "RIC 144", and/or the like). The edge controller 144 is responsible for some or all of the following functions: managing the life cycle of (edge) apps including informing the orchestrator 145 of relevant app related events; providing element management functions to one or more edge platforms 144; and/or managing (edge) app rules and requirements including service authorizations, traffic rules, DNS configuration, resolving conflicts, and the like.

In some implementations, the edge controllers 144 can include virtualized infrastructure manager (VIM) that provides hardware (HW)-level virtualization and/or OS-level virtualization on which virtual machines (VMs), edge apps, and/or containers operate. The VIM may be an operating system (OS), hypervisor, virtual machine monitor (VMM), and/or some other virtualization management service or app. Additionally or alternatively, the edge controller 144 receives virtualized resources fault reports and/or performance measurements from the VIM for further processing.

Additionally or alternatively, the edge controller 144 is responsible for some or all of the following functions: allocating, managing and releasing virtualized resources (e.g., compute, storage and networking resources) of virtualization infrastructure; preparing the virtualization infrastructure to run a software image (e.g., configuring the infrastructure, receiving and storing software images, and the like); provisioning (edge) apps; collecting and reporting performance and fault information about the virtualized resources; and/or performing app relocation (e.g., from/to external cloud environments via interaction with an external cloud manager to perform the app relocation). In implementations where the edge controller 144 is a RAN intelligent controller (RIC) (see e.g., [O-RAN]), the edge controller 144 is responsible for RAN controller functionality and provisioning compute resources for various RAN functions and/or other apps, which may include, for example, radio resource management (RRM) functionality (e.g., radio bearer control, radio admission control, connection and mobility control, radio resource control (RRC), dynamic resource allocation for UEs (e.g., scheduling), and the like), routing user plane data and control plane data, generating and provisioning measurement configurations at individual UEs (e.g., UEs 310 in FIG. 3, UE 610 in FIG. 6, UEs 1010, 1017 of FIG. 10, and/or the like), session management functions, network slicing support operations, transport level packet marking, flow management (e.g., QoS flow management, mapping to data radio bearers (DRBs), and the like), connectivity management and/or seamless handover control, and/or the like. The edge controllers 144 may communicates with apps (not shown), orchestrators 145, ECPs 146, and PDN 136 via one or more interfaces (not shown), which may include one or more APIs, server-side web APIs, web services (WS), and/or some other interface or reference point such as those specified by the underlying ECT of the edge clusters 140. As examples, these interface may be based on, or run on top of, one or more of Representational State Transfer (REST) APIs, RESTful web services, Simple Object Access Protocol (SOAP) APIs, Hypertext Transfer Protocol (HTTP) and/or HTTP secure (HTTPs), Web Services Description Language (WSDL), Message Transmission Optimization Mechanism (MTOM), MQTT (previously "Message Queueing Telemetry Transport"), Open Data Protocol (OData), JSON-Remote Procedure Call (RPC), XML-RPC, Asynchronous JavaScript And XML (AJAX), and/or any other suitable app layer, transport layer, and/or network protocol such as those discussed herein. Any other APIs and/or WS may be used including private and/or proprietary APIs/WS.

The ECPs 146 provide a framework for delivering edge services and platform essential functionality to edge apps running on the ECPs 146. Edge services are provided by one or more ECPs 146 and/or one or more edge apps. Edge services are consumed by UEs (user/client apps running on the UEs), other ECPs 146, and/or other edge apps. Furthermore, the ECPs 146 include virtualization infrastructure and/or respective HW platforms, which include resources for providing virtualized resources as discussed previously. In some implementations, the ECPs 146 include virtual (virtualized) radio access network (vRAN) compute HW that operates one or more RAN functions using one or more vRAN processors and/or vRAN accelerators as discussed infra. Additionally or alternatively, the HW platforms include edge compute HW including, for example, compute, acceleration, memory, and storage resources that can be used for edge-specific data processing. In various implementations, the compute, acceleration, memory, and storage resources of the edge compute HW correspond to the processor circuitry 1352, acceleration circuitry 1364, memory circuitry 1354, and storage circuitry 1358 of FIG. 13, respectively. In the example of FIG. 1, the ECPs 146 are shown as being implemented as individual compute platforms, however, in other implementations, each ECP 146 within an edge cluster ECP 140 can be provided as virtualized HW operating on a single HW platform or the like.

The NANs 130 provide network connectivity and provide other network or communication services to one or more UEs (not shown by FIG. 1). As examples, individual NANs 130 may be a 3GPP LTE evolved NodeB (eNB) (e.g., eNB 1112 of FIG. 11), 3GPP 5G/NR next generation NodeB (gNB) (e.g., gNB 1116 of FIG. 11), next generation (ng)-eNB (e.g., ng-eNB 1118 of FIG. 11), Road Side Unit (RSU), WiMAX AP, WiFi AP, relay node, remote radio head (RRH), and/or the like. Additionally or alternatively, the individual NANs 130 may be distributed units (DUs) and/or remote units (RUs) in a CU/DU split architecture. One or more NANs 130 may support a Uu interface and/or PC5 interface to one or more UEs (e.g., UE 1102 of FIG. 11 and/or UEs 1010, 1017 of FIG. 10) depending on the NAN 130 capability and/or UE app requirements. The Uu interface is the air interface in 3GPP systems. The LTE-Uu interface connects a UE to an eNB or ng-eNB over the air, and is used as one of several transport links for the LTE positioning protocol(s) for a target UE with LTE access and/or LTE access to an NG-RAN. The NR-Uu interface connects a UE to a gNB over the air, and is used as one of several transport links for the NR positioning protocol(s) for a target UE with NR access to NG-RAN. The PC5 interface is a 3GPP reference point between individual UEs for user plane Proximity-based Services (ProSe) Direct Communication for V2X Service. Aspects of the Uu interface and/or the PC5 interface are discussed in [TS38300], [TS23285], [TS23287], 3GPP TS 38.305 v16.7.0 (2021-12-23), 3GPP TS 36.305 v16.4.0 (2021-09-27), 3GPP TS 23.304 v17.2.1 (2022-03-25), 3GPP TR 37.985 v17.1.0 (2022-04-01), 3GPP TS 23.303 v17.0.0 (2021-12-23), and Garcia-Roger et al., V2X support in 3GPP specifications: From 4G to 5G and beyond, IEEE ACCESS, vol. 8, pp. 190946-63 (2020 Oct. 5), the contents of each of which are hereby incorporated by reference in their entireties.

In some implementations, the edge clusters 140 (or edge apps operated on one or more of the ECPs 146) operate as or include V2X app servers as discussed in [TS23285]. In these implementations, the NANs 130 may be RSUs collocated with the V2X app logic/server and/or some other entities of the 3GPP system (see e.g., Annex A of [TS23285]).

The example architecture 100 provides relatively seamless and low latency session continuity when switching or being handed over between the ECPs 146 for mobile UEs. The switching/handover (HO) may involve switching or transferring between ECPs 146 within an individual edge cluster 140 (e.g., intra-cluster switching or HO) or switching/transferring between ECPs 146 within different edge clusters 140 (e.g., inter-cluster switching or HO). During the deployment of an edge controller 144, the edge controller 144 is loaded with a neighbor database, which stores information about neighboring edge controllers 144 and/or other edge controllers 144. This information includes, for example, network addresses (e.g., IP addresses, and/or the like), locations, authentication keys, and/or the like. Using this information, the edge controllers 144 are able to securely communicate with the neighboring edge controller 144 over the PDN 136. The neighboring edge controllers' 144 databases are also updated with the new edge controller's 144 information for security and/or communication purposes.

The edge controllers 144 communicate certain configuration information with other edge controllers 144 of the neighboring edge clusters 140 in order to support inter-cluster ECP 146 switching/HO for a mobile UE when it moves from one edge cluster 140 to/with another edge cluster 140. Additionally or alternatively, the edge controllers 144 exchange configuration information with its neighboring edge controllers periodically (for example, once a day), or during certain events such as power-on, hardware changes (e.g., new RSU/ECP 146 added/removed), software updates, and the like.

Figure 2:
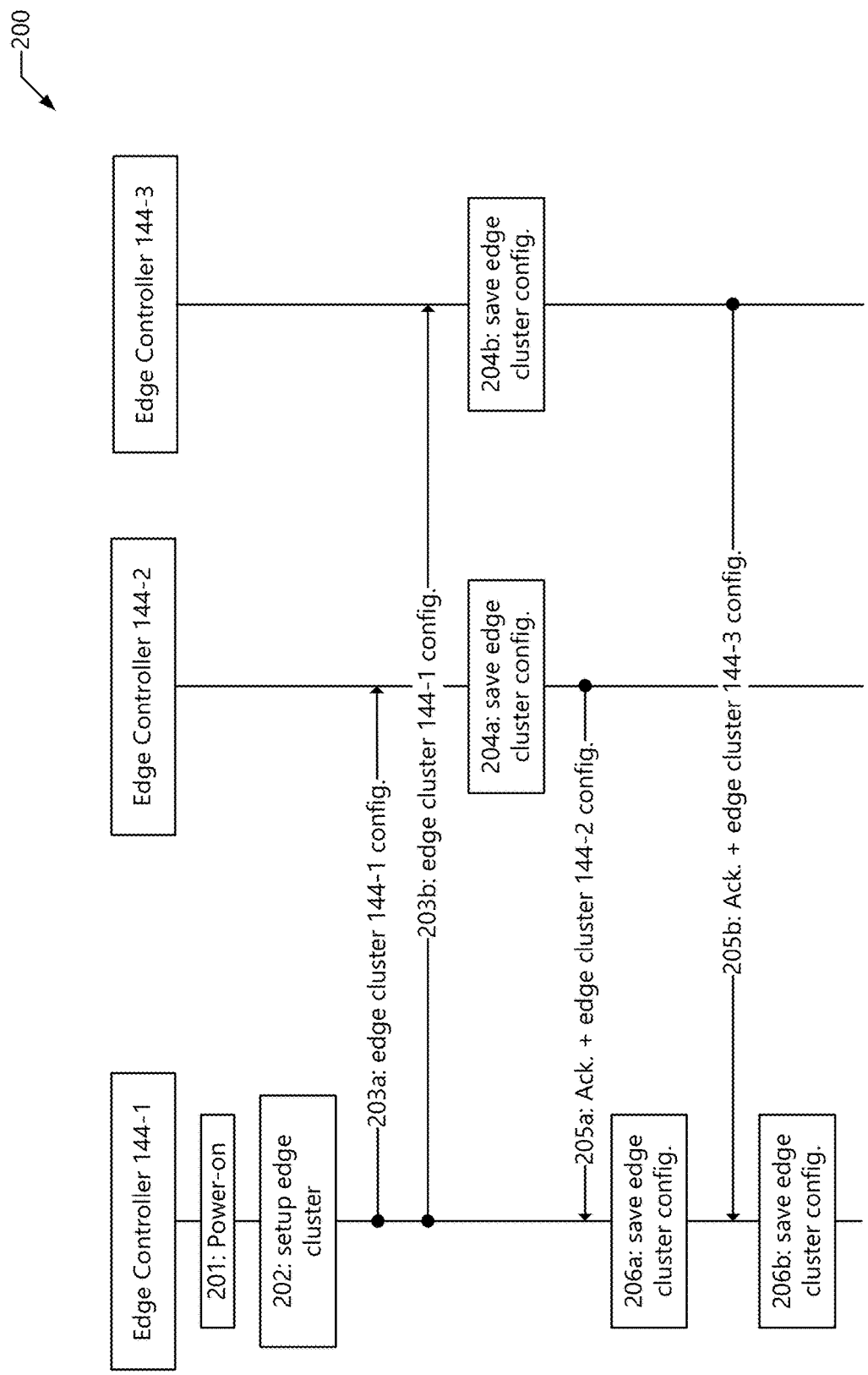
FIG. 2 depicts an example procedure for messaging between neighboring edge controllers to enable ECP session continuity for mobile UEs.

FIG. 2 illustrates an example procedure 200 for exchanging configuration messages between the edge controllers 144. In this example, the messaging sequence 200 is triggered by a power-on event in edge controller 144-1 (201), and after the power-on event, the edge cluster 140-1 performs and completes an edge cluster setup process (202). The edge controller 144-1 sends the edge cluster's 140-1 configuration details to its neighboring edge controllers 144-2 and 144-3 (203a, 203b). The configuration message contains information such as, for example, cluster topology, number of connected or co-located NANs 130 and/or ECPs 146, network addresses (e.g., IP addresses, or the like) of the ECPs 146, NAN/RSU IDs and locations, edge apps and/or edge services provided by the edge cluster 140-1 (or the underlying ECPs 146-1), and/or other like information. Each of the neighboring edge controllers 144-2 and 144-3 save the received configuration information (204a, 204b), and respond to the edge controller 144-1 with an acknowledgement (ACK) and their own configuration information (205a, 205b), which are stored by the edge controller 144-1 (206a, 206b)

1.1. Example Edge Compute Platform Session Continuity with PC5 Interface

Figure 3:
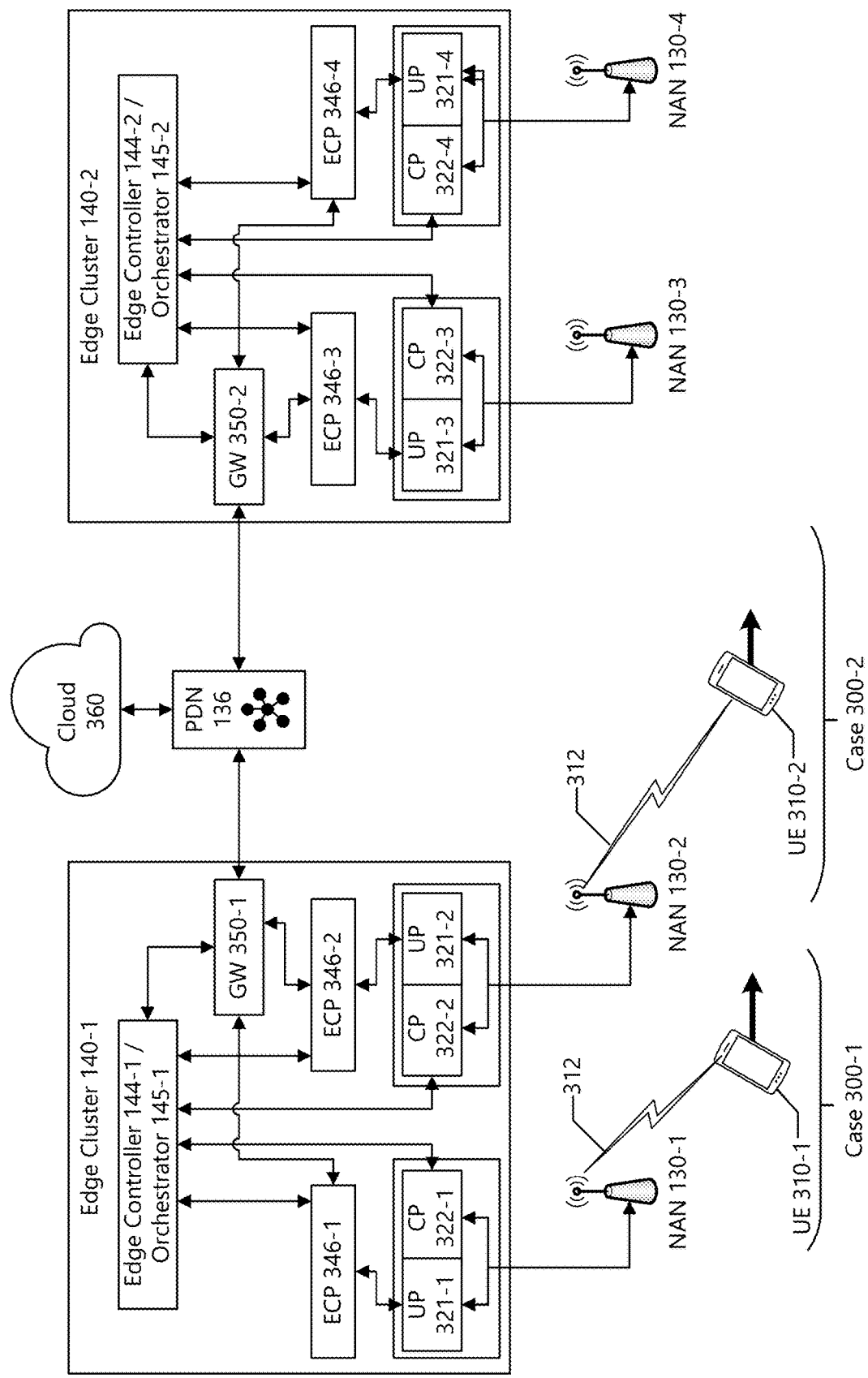
FIG. 3 depicts an example intra-cluster and inter-cluster ECP session continuity.

FIG. 3 shows an example scenarios where mobile UEs 310 are connected to respective NANs 130 via respective C-V2X interfaces 312. As examples, the C-V2X interface 312 can be a PC5 interface, an LTE-Uu interface, an NR-Uu interface, and/or the like. Although the UEs 310 are depicted as smartphones in FIG. 3, in other examples, the UEs 310 can be other types of user devices (such as those discussed herein); autonomous or semi-autonomous vehicles, drones or robots (including a collection of collaborative robots, drones, or robotic systems), and the like; autonomous or semi-autonomous sensors, actuators, Internet of Things (IoT) devices, and the like; business and/or industrial equipment; infrastructure equipment such as smart cities and/or building devices; or any other type of device. The UEs 310 may be the same or similar as the UEs 1010, 1017 in FIG. 10 and/or UE 1102 in FIG. 11, and the ECPs 346 may be the same or similar as the ECPs 146 in FIG. 1. Additionally, the edge clusters 140 are connected to the PDN 136 via respective gateways (GWs) 350-1 and 350-2 (e.g., IP gateways or the like), and the PDN 136 is connected to a cloud computing service or cloud service provider (CSP) 360, which may be the same or similar as cloud 1060 of FIG. 10. FIG. 3 depicts two cases including intra-cluster ECP switching case 300-1 and inter-cluster ECP switching case 300-2.

The intra-cluster ECP switching case 300-1 includes a first UE 310-1 that switches from a first NAN 130-1 and a first ECP 346-1 to a second NAN 130-2 and a second ECP 346-2, where ECP 346-1 and ECP 346-2 are within the same edge cluster 140-1. The UE 310-1 is connected to the ECP 346-1 via the NAN 130-1 and user plane entity (UP) 321-1 and control plane entity (CP) 322-1, and after the intra-cluster ECP switch, is connected to the ECP 346-2 via the NAN 130-2 and UP 321-2 and CP 322-2.

The inter-cluster ECP 146 switching case 300-2 includes a second UE 310-2 that switches from the second NAN 130-2 and the second ECP 346-2 in edge cluster 140-1 to a third ECP 346-3 in edge cluster 140-2 and/or third NAN 130-3. The UE 310-2 is connected to the ECP 346-2 via the NAN 130-2 and UP 321-2 and CP 322-2, and after the inter-cluster ECP switch, is connected to the ECP 346-3 via the NAN 130-3 and UP 321-3 and CP 322-3 (not shown by FIG. 3).

In this example, the NANs 130 are assumed to be connected to dedicated ECPs 146, 346 for servicing app requests operated by the UEs 310, and the ECPs 146, 346 operate corresponding edge apps that process the app requests and send back relevant responses to the UEs 310. The NANs 130 and ECPs 146, 346 in a cluster 140 are controlled by an edge controller 144 and edge orchestrator 145. When a UE 310 is handed over from one NAN 130 to another NAN 130, the serving ECP 146, 346 is also switched accordingly to provide seamless continuity in edge services to the UE 310.

1.1.1. Intra-Cluster ECP Switching/Handover

Figure 4:
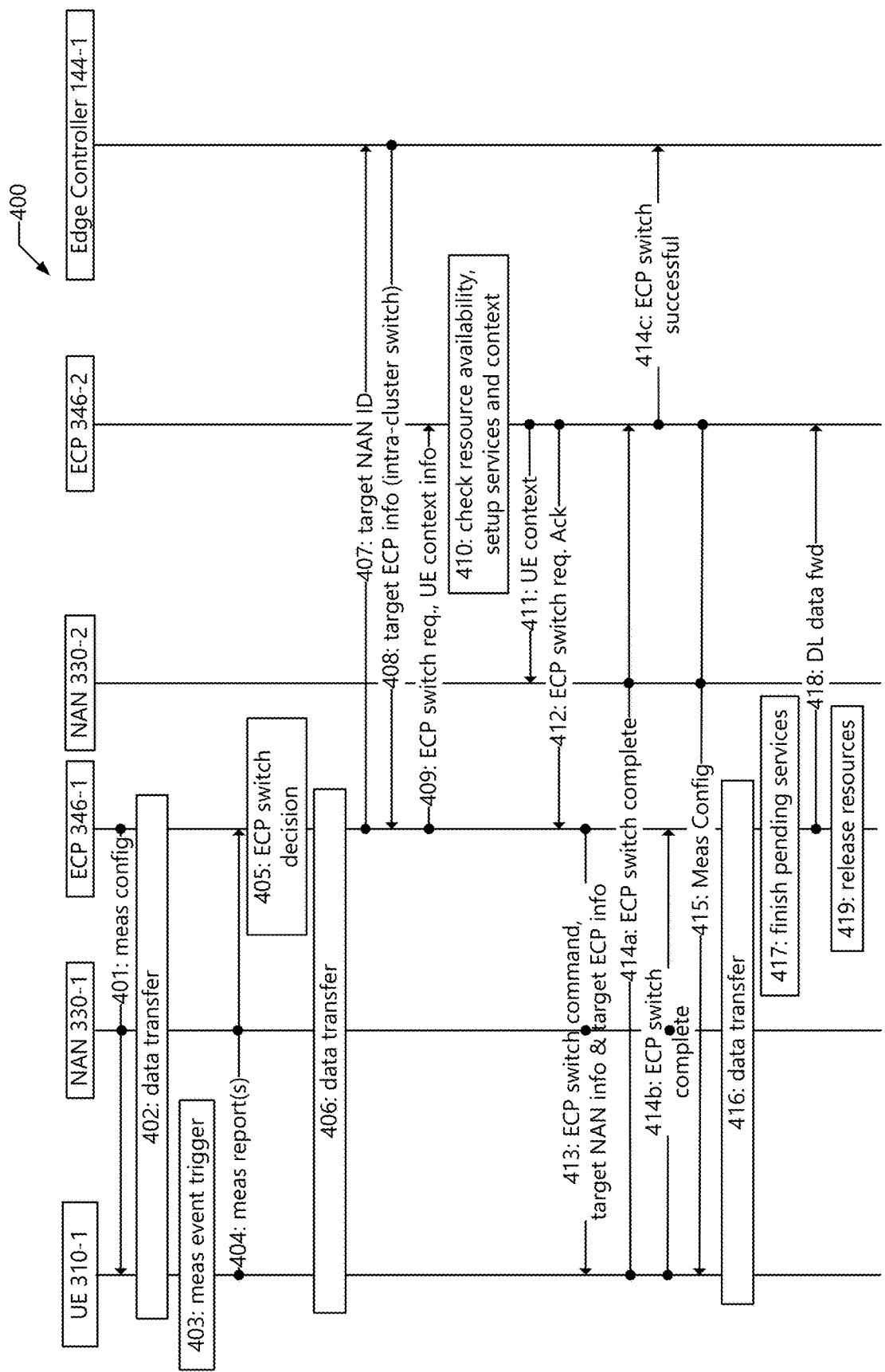
FIG. 4 depicts an example procedure for message sequence for intra-cluster ECP session continuity.

FIG. 4 shows an intra-cluster ECP switching procedure 400. In this example, the UE 310-1 obtains edge services from ECP 346-1 via NAN 130-1. The edge services are obtained from ECP 346-1 by exchanging downlink (DL) and uplink (UL) data with the ECP 346-1 via NAN 130-1 (402, 40x). The UE 310-1 periodically performs measurements of signal and/or channel characteristics (e.g., measuring reference signals from NAN 130-1 and other neighboring NANs 130) based on a measurement configuration sent by ECP 346-1 (401). In particular, the measurement configuration includes configured measurement events, and the UE 310-1 detects a measurement event and/or trigger condition (403), performs signal measurements as indicated by the measurement configuration, and sends a measurement report to the ECP 346-1 via the NAN 130-1 (404). In some implementations, the measurement configuration can be an RRC configuration provided by the NAN 130-1 (see e.g., [TS38331] and [TS36331]), or a RIC implemented by the ECP 346-1. Additionally or alternatively, the measurement configuration (401) and measurement report (404) can be communicated using a suitable API (e.g., the Radio Network Information service as discussed in [MEC012] and [MEC], or the like).

In an example, as the UE 310-1 moves towards NAN 130-2, a measurement event or condition is eventually triggered (403), the UE 310-1 performs and/or collects measurements, and sends a measurement report to the ECP 346-1 (404). Additionally or alternatively, the measurement event/trigger (403) can include, for example, detecting new radio conditions, detecting a radio link failure (RLF), detecting one or more load balancing criteria/conditions, moving to a new or different service area (e.g., a service area associated with NAN 130-2 and/or ECP 346-2), detecting specific service criteria/conditions (e.g., switching from data to voice or video services, or the like), and/or the like. Additionally or alternatively, the measurement event/trigger can include any of the measurement report triggers/events discussed in [TS38331] and/or [TS36331].

Then, the ECP 346-1 decides to perform an ECP/NAN switch for UE 310-1 (405) based on the contents of the measurement report. The ECP/NAN switch may also be referred to as an "ECP handover", "edge handover", or the like, and the decision at 405 can be referred to as an "ECP switch decision", "ECP handover decision", or the like. The ECP switch decision may be based on the signal measurements of signals from NAN 130-2 being better or greater in signal strength/quality than the signaling provided by NAN 130-1 (see e.g., [TS38331] and [TS36331]). Additional or alternative criteria may be used to determine whether an ECP switch should be made such as, for example, new radio conditions being detected at a NAN 130-1 and/or the UE 310-1, a load conditions (e.g., indicated by resource usage and/or other performance metrics) at the NAN 130-1 and/or the source ECP 346-1 meeting or exceeding a threshold, the UE 310-1 moving to a new or different service area (e.g., a service area associated with NAN 130-2 and/or ECP 346-2), detecting specific service criteria/conditions (e.g., switching from a first edge service to a second edge service, or the like), and/or the like. Meanwhile, the UE 310-1 may continue UL/DL communications and obtain edge services from ECP 346-1 via NAN 130-1 (406). The ECP switch decision involves determining a suitable target ECP 346 to serve the UE 310-1. The target ECP 346 refers to the ECP 346 to which the existing edge services session is to be transferred and/or an ECP 346 that will take over the edge services from a source ECP 346. In this example, the source ECP 346 is ECP 346-1 and the target ECP 346 is ECP 346-2. In order to determine a target ECP 346, the source ECP 346-1 sends a target NAN ID of the target NAN 130-2 to the edge controller 144-1 (407). The target NAN ID may be indicated by the measurement report (e.g., a NAN 130 in the measurement report associated with a best or highest signal strength/quality measurement), or the target NAN ID may be included in a list of NANs 130 neighboring the source NAN 130-1 (e.g., a neighbor cell map or the like). The list of neighboring NANs may be stored locally at the source ECP 346-1 or provided to the source ECP 346-1 via a suitable API or the like. From a local database at the edge controller 144-1 (or a remote database), the edge controller 144-1 maps the target NAN ID to the target ECP 346 (e.g., ECP 346-2) (or to a target ECP ID of the target ECP 346-2), and determines that the target ECP 346-2 is in the same cluster 140 as the source ECP 346 (408). Additionally or alternatively, the edge controller 144-1 may hash the target NAN ID, perform a lookup operation, and/or perform some other search/discovery technique to determine a corresponding target ECP 346.

The target NAN ID may be or include a network address (e.g., IP address, MAC address, UUID and/or GUID, a FQDN, socket, port number, Application Protocol Identity (AP ID), and/or the like such as those discussed herein, and/or any combination thereof), cell ID (e.g., cell radio network temporary identifier (C-RNTI), an NG-RAN ID such as any of those discussed in [TS38300], [TS38401], and/or the like), and/or the like. Additionally or alternatively, the target NAN ID can be a combination of any of the aforementioned addresses and/or IDs. Other target NAN information, such as the target NAN information discussed infra, may also be included. Then, the edge controller 144-1 sends target ECP information to the ECP 346-1 (408). As examples, the target ECP information includes or indicates the target ECP target ECP 346-2 using a target ECP ID or the like, indicates the target edge cluster 140 using a target cluster ID, platform properties of the target ECP 346-2 and/or target edge cluster 140, software version(s) (e.g., version or release number of one or more edge apps at the of the target ECP 346-2, or the like), and/or other like information. In some implementations, the target ECP ID is or includes one or more network addresses of the target ECP 346-2 (or combination of network addresses). Additionally or alternatively, and the target cluster ID is or includes one or more network addresses of the target edge cluster 140 (or combination of network addresses). The network addresses of the target ECP 346 and target edge cluster 140 may include IP address, MAC address, UUID and/or GUID, FQDN, socket, port number, AP ID, and/or any other suitable network address such as any of those discussed herein. In some implementations, the target ECP ID and/or target cluster ID can include one or more network address combined with the target NAN ID or the like. Additionally or alternatively, the target ECP information includes an intra-cluster switch indicator/command, or the intra-cluster switch indicator is sent in the message at 408 separate from the target ECP information. The intra-cluster switch indicator/command may include an indication that the ECP switch is an intra-cluster ECP switch and/or a cluster ID of the edge cluster 140 in which the target ECP 346 is located/disposed. In some implementations, the cluster ID of the target edge cluster 140 may be left out of the switch indicator/command, and the absence of a cluster ID of the target edge cluster 140 may indicate that the ECP switch is an intra-cluster ECP switch.

The ECP 346-1 sends an ECP switch request to ECP 346-2 along with UE context information of the UE 310-1 (409). The ECP switch request informs the target ECP 346-2 that the UE 310-1 has moved to a new target cell and provides an edge service session (or a list of edge service sessions) to be switched to the target ECP 346-2. Additional information may also be included such as, for example, access network (AN) information (e.g., AN tunnel information for each edge service session to be switched, list of edge service sessions that failed to be established with a failure cause, various AN identifiers such as those discussed in [TS38300] and [TS38401], and/or the like), capabilities for time synchronization service, and/or other information.

The UE context is a block of data at the UE 310-1, the NAN 130-1, and/or or the ECP 346-1 that includes information about a user, application, or UE 310, or data associated with an individual user, application, and/or an individual UE 310. Additionally or alternatively, the UE context includes network-specific and/or application-specific runtime data maintained by an edge app, which is associated with a user of the edge app, a corresponding user app or client app, or the UE 310 itself. Additionally or alternatively, the UE context contains the relevant information used to maintain edge services and/or an edge compute session towards the individual user/UE 310. As examples, the UE context information can include one or more of UE network/communication capabilities (e.g., radio or RAT capabilities such as different RAT circuitries of the UE 310, capabilities for specific air interfaces, and/or the like), application-related security information and/or authentication credentials, UE security capabilities, UE location information, subscription data, user profile data, UE availability and capabilities for time synchronization service(s), user/edge app state information, serving ECP ID (e.g., source ECP ID or the like), edge app ID, flow IDs (e.g., QoS IDs, 5QI, bearer IDs, and/or the like) and/or IDs of one or more logical connections between the individual user/UE 310 and the ECP 346-1, and/or other like information. Additionally or alternatively, the UE context includes some or all of the UE context information indicated by Table 5.2.2.2.2-1 in [TS23502], the access and mobility related information in table 6.5-1 of [TS23503], the UE capabilities and/or context information discussed in 3GPP TS 24.301 v17.6.0 (2022-03-25) and/or 3GPP TS 24.501 v17.6.1 (2022-03-26), and/or the like.

The ECP 346-2 checks for resource availability at the target ECP 346-2, and then sets up an edge service environment to host the ongoing edge service session based on the UE context information (410). This may involve setting up relevant apps and/or a software/runtime environment (e.g., setting up virtualization/OS containers and/or VMs in which to operate relevant edge apps, and/or the like) and/or other operations. The ECP 346-2 also sends UE context information of the UE 310-1 to the target NAN 130-2 so that the UE's 310-1 messages are not filtered out by the target NAN 130-2 (411).

The ECP 346-2 responds to ECP 346-1 with an ECP switch request ACK message (412), and the ECP 346-1 sends an ECP switch command to the UE 310-1 along with target NAN information and target ECP information (413). The target NAN information includes any relevant information about the target NAN 130-2 that can be used by the UE 310-1 to establish or transfer a suitable connection or session with the target NAN 130-2. The target NAN information may be the same or similar as the handover information discussed in [TS38300], [TS23501], [TS23502]. Additionally or alternatively, the target NAN information can include, for example, relevant target NAN IDs (e.g., network addresses, cell IDs, RAN IDs, and/or the like including those discussed herein); NAN context information such as flow contexts, bearer contexts, and the like (see e.g., [TS38401]); AN security context (see e.g., [TS23501]); mobility restriction list to be used by the target NAN 130-2; time synchronization information, and/or other like information.

The target ECP information includes any relevant information about the target ECP 346-2 that can be used by the UE 310-1 to establish or transfer a suitable connection or session with the target ECP 346-2. As examples, the target ECP information can include target ECP ID, reason for the ECP selection/change, and/or other like information. The target ECP ID can include, for example, a network address (e.g., IP address, MAC address, UUID and/or GUID, a FQDN, socket, port number, Application Protocol Identity (AP ID), and/or the like such as those discussed herein, and/or any combination thereof), device ID, serial numbers, location information of the target ECP 346-2, and/or the like and/or any combination thereof.

At this point, the UE 310-1 reconfigures its app and protocol parameters to switch the edge service session to the target ECP 346-2. Additionally, the UE 310-1 may perform various operations to attached to the target NAN 130-2 and perform a network attachment procedure with the target NAN 130-2 (e.g., RRC connection (re)establishment procedure and/or the like). Additionally or alternatively, the target NAN 130-2 may perform a handover (HO) procedure with the source NAN 130-1. The HO may be a traditional HO, a conditional HO (CHO), a conditional PSCell change (CPC) (where the PSCell is a primary cell in a secondary cell group (SCG) or a primary SCG cell), and/or some other NAN switching mechanism. The switch time is typically relatively small since the UE 310-1 need not go through the synchronization process with the target NAN 130-2 (e.g., assuming that the NANs 130 and UEs 310 are synchronized via GNSS and/or a suitable time synchronization protocol (e.g., *IEEE Standard for Local and Metropolitan Area Networks—Timing and Synchronization for Time-Sensitive Applications*, IEEE Std 802.1AS-2020 (19 Jun. 2020) ("[IEEE802.1AS]")); *IEEE Standard for a Precision Clock Synchronization Protocol for Networked Measurement and Control Systems*, IEEE Std 1588-2019 (16 Jun. 2020) ("[IEEE1588]"); Network Time Protocol (NTP) as specified in IETF RFC 2030 (October 1996), RFC 5905 (June 2010), RFC 9109 (August 2021), and the like; and/or other like synchronization mechanisms), and/or the random access channel (RACH).

Then, the UE 310-1 sends an ECP switch complete message to both ECP 346-1 and ECP 346-2 (414a, 414b) to acknowledge that the switch of the edge service session to the target ECP 346-2 has been completed. Additionally, the ECP 346-2 sends an ECP switch successful message to the edge controller 144-1 to indicate successful completion of the ECP switch (414c). In some implementations, the ECP 346-2 receives the ECP switch complete message received from the UE 310-1 (414a) and forwards the ECP switch complete message to the edge controller 144-1 as the ECP switch successful message (414c). The ECP switch complete message and/or the ECP switch successful message may include any of the UE IDs discussed herein and/or any of the information discussed herein.

The target ECP 346-2 sends new measurement configuration message to the UE 310-1 (415) and starts providing edge services via data transfer that includes the exchange of DL/UL data (416). At the source ECP 346-1, if there were any pending services that could not be completed before the UE 310-1 switched to the target ECP 346-2, then such services are completed (417) and the results after finishing the pending services are forwarded to the target ECP 346-2 for transmission to UE 310-1 (418). The source ECP 346-1 then releases the relevant resources to be used by other users/subscribers (419). In some implementations, the ECP switch ACK (412) from the target ECP 346-2 or the ECP switch complete message from the UE 310-1 (414b) triggers the release of resources at the source ECP 346-1 (419).

1.1.2. Inter-Cluster ECP Switching/Handover

Figure 5:
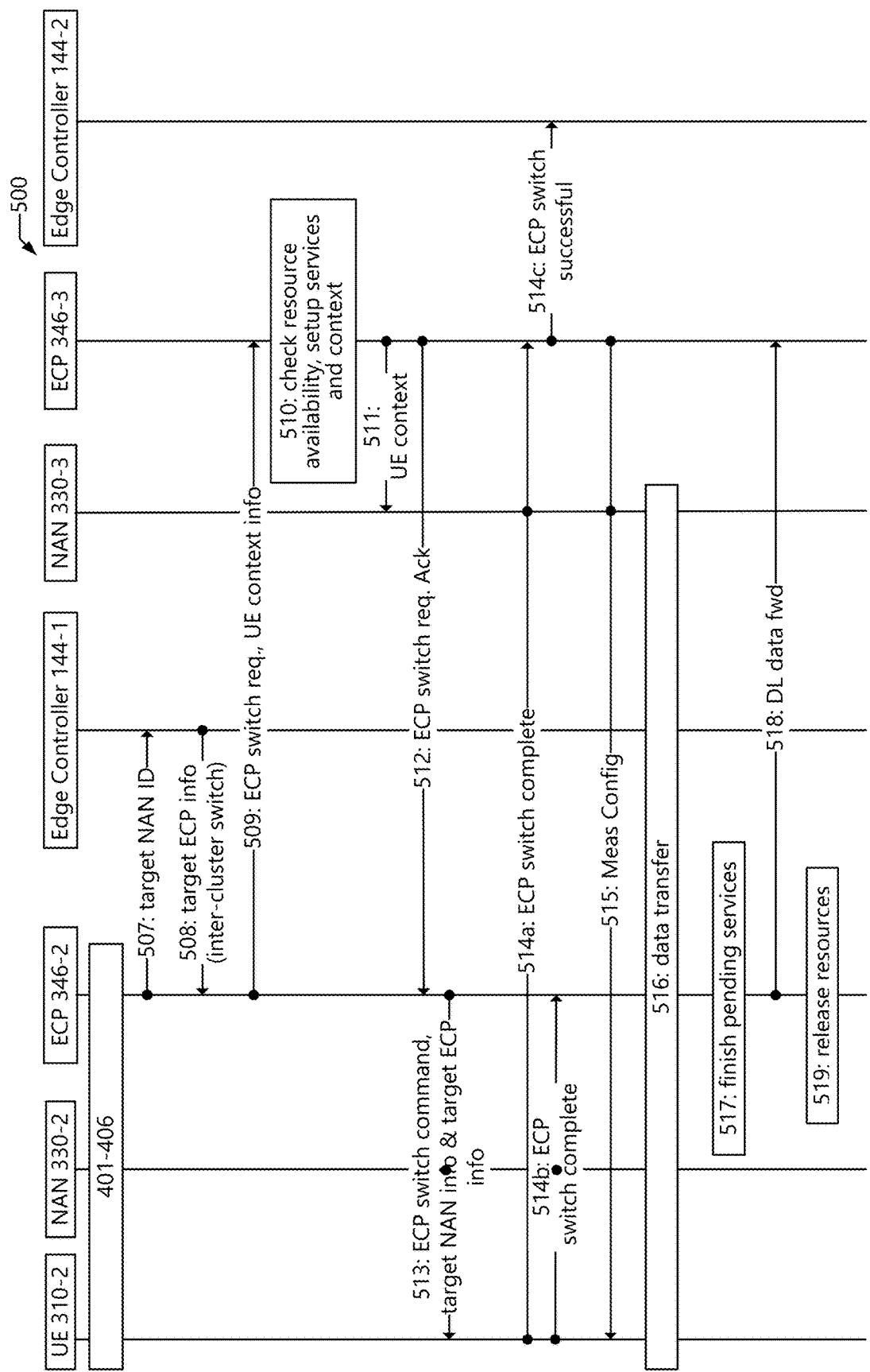
FIG. 5 depicts an example procedure for message sequence for inter-cluster ECP session continuity.

FIG. 5 shows an example inter-cluster ECP switching procedure 500 in which UE 310-2 from FIG. 3 moves from coverage of NAN 130-2 and ECP 346-2 (in edge cluster 140-1) to NAN 130-3 and ECP 346-3 (in edge cluster 140-2). The inter-cluster ECP switching procedure 500 is similar to the intra-cluster ECP switching procedure 400 of FIG. 4. One difference is that the inter-cluster ECP switching procedure 500 involves the ECP 346-2 communicating with the ECP 346-3 (target ECP) located in a different cluster via a data network (e.g., IP network or the like).

Procedure 500 begins with operations 401-406 of procedure 400 in FIG. 4 being performed. Then, the source ECP 346-1 sends a NAN ID of the target NAN 130-2 to the edge controller 144-1 (507) to determine a target ECP 346 (e.g., ECP 346-3). The target ECP 346 may be determined in a same or similar manner as discussed previously with respect to (w.r.t.) FIG. 4, and the target NAN ID may be the same or similar (or include the same or similar information) as discussed previously w.r.t. FIG. 4. Here, the edge controller 144-1 determines that the target ECP 346-3 is in a different cluster 140 than the source ECP 346 (508).

The edge controller 144-1 sends target ECP information to the ECP 346-2 (508), which may be the same or similar as the target ECP information discussed previously w.r.t. FIG. 4. In this example, the target ECP information includes an inter-cluster switch indicator/command, or the inter-cluster switch indicator is sent in the message at 508 separate from the target ECP information sent at 508. The inter-cluster switch indicator/command may include an indication that the ECP switch is an inter-cluster ECP switch and/or a cluster ID of the edge cluster 140 in which the target ECP 346 is located/disposed (e.g., an ID of edge cluster 140-2 in which target ECP 346-3 is disposed). Then, the ECP 346-2 sends an ECP switch request to ECP 346-3 along with UE context information of the UE 310-2 (509).

The ECP 346-3 checks for resource availability at the target ECP 346-3, and then sets up relevant apps and software environment based on the UE context information (510). The ECP 346-3 also sends the UE's 310-2 context information to the target NAN 130-3 so that the UE's 310-2 messages are not filtered out by the target NAN 130-3 (511). The ECP 346-3 sends an ECP switch request ACK message to the ECP 346-2 (512), and the ECP 346-2 sends an ECP switch command to the UE 310-2 along with target NAN information and target ECP information (513). The UE 310-2 sends an ECP switch complete message to the ECP 346-2 and ECP 346-3 (514a, 514b) to acknowledge that the switch to the target ECP 346-3 has been completed. The ECP 346-3 sends an ECP switch successful message to the edge controller 144-2 to indicate successful completion of the ECP switch (514c).

The target ECP 346-3 sends a measurement configuration message to the UE 310-2 via target NAN 130-3 (515), and starts providing edge services via data transfer that includes exchanging DL/UL data with the UE 310-2 via target NAN 130-3 (516). The source ECP 346-2 completes any pending edge services that could not be completed before the UE 310-2 switched to the target ECP 346-3 (517) and the results (e.g., DL data destined for the UE 310-2) after finishing the pending services are forwarded to the target ECP 346-3 for transmission to UE 310-2 (518). The source ECP 346-2 then releases the relevant resources to be used by other users/subscribers (519). In some implementations, the ECP switch ACK (512) from the target ECP 346-3 or the ECP switch complete message from the UE 310-2 (514b) triggers the release of resources at the source ECP 346-2 (519).

1.2. Example ECP Switching/Handover with Multiple Interfaces

Figure 6:
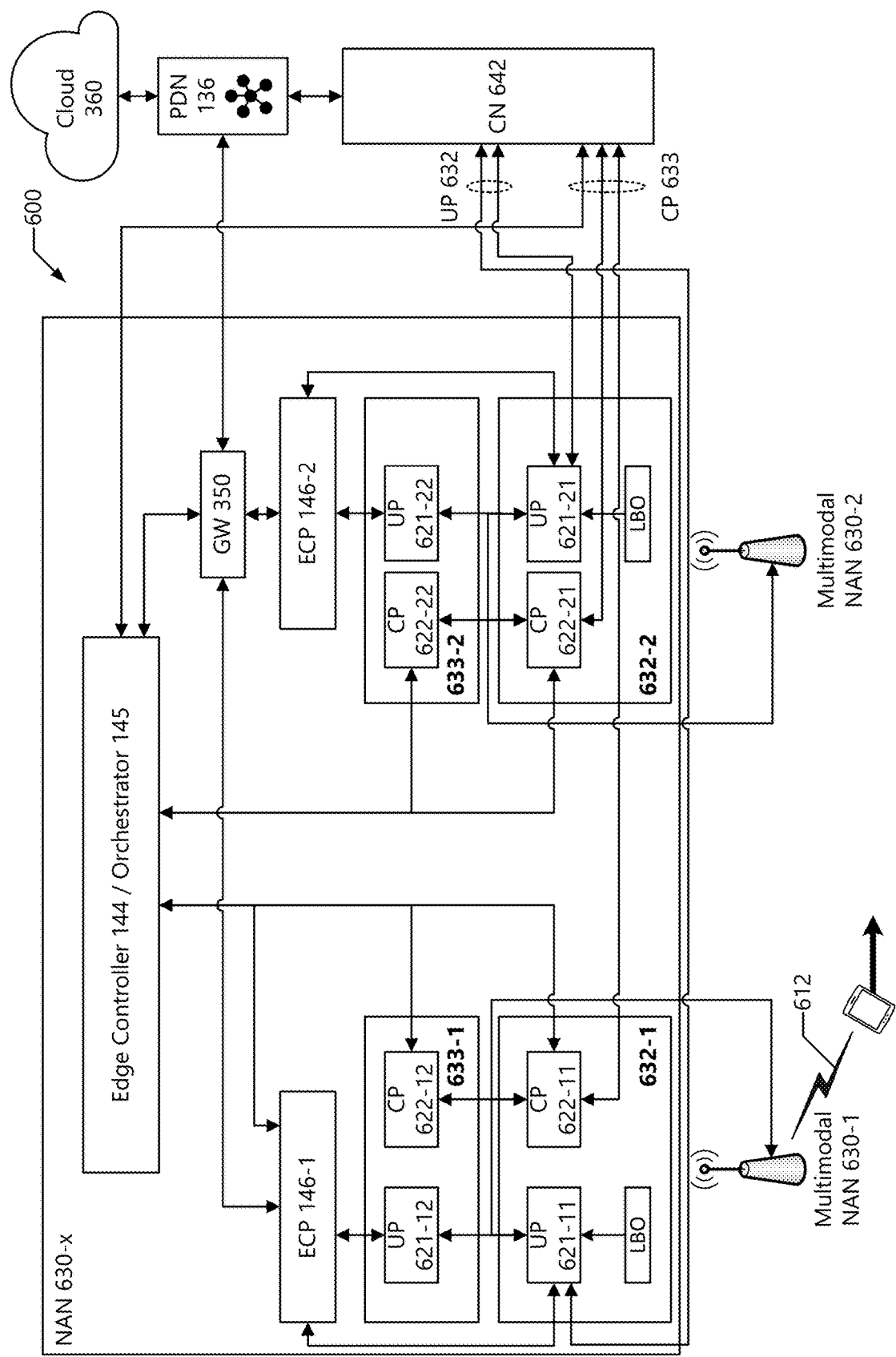
FIGS. 6 and 7 depict example intra-cluster ECP switching scenarios involving multiple air interfaces.

FIG. 6 shows an example scenario 600 where a UE 610 is connected to a multi-modal NAN 630-1 (also referred to as "multimode NAN 630" or the like) via two or more air interfaces 612. The multi-modal NANs 630-1, 630-2 are connected to the NAN 630-x, which includes a set of ECPs 146 and an edge controller/orchestrator 144, 145. The multi-modal NANs 630-1, 630-2, 630-x are NANs that are capable of serving or otherwise communicating with UEs 610 according to one or more RATs, and/or include baseband circuitry and antenna elements that support radio communications of more than one communication protocol. The specific RAT to be used by a NAN 630 is not fixed, and be selected by the NAN 630 based on various selection criteria such as, for example, current traffic conditions, service requests, and/or the like. Any suitable RATs may be utilized such as any of the RATs discussed herein.

The NAN 630-x includes interface elements 632, 633 for each ECP 146 and each NANs 630-1, 630-2, and each interface element 632, 633 corresponds to respective interfaces of the two or more air interfaces 612. In this example, the NAN 630-x includes a first interface element 632-1 that corresponds to a first interface 612 and a second interface element 633-1 that corresponds to a second interface 612, and these interface element 632-1, 633-1 are connected to the ECP 146-1 and the NAN 630-1. The NAN 630-x also includes a first interface element 632-2 for that corresponds to the first interface 612 and a second interface element 633-2 that corresponds to the second interface 612, and these interface element 632-2, 633-2 are connected to the ECP 146-2 and the NAN 630-2.

Additionally, each interface element 632, 633 includes respective UP entities 621 and respective CP entities 622. For example, the first interface element 632-1 includes a UP entity 621-11 and a CP entity 622-11, the second interface element 633-1 includes a UP entity 621-12 and a CP entity 622-12, the first interface element 632-2 includes a UP entity 621-21 and a CP entity 622-21, and the second interface element 633-2 includes a UP entity 621-22 and a CP entity 622-22. In one example, the two or more air interfaces 612 can include the Uu interface (e.g., corresponding to the interface elements 632) and the PC5 interface (e.g., corresponding to the interface elements 633). In another example, the two or more air interfaces 612 can include the Uu and/or PC5 interface (e.g., corresponding to the interface elements 632) and a W-V2X interface (e.g., corresponding to the interface elements 633).

Within the NAN 630-x, a local breakout (LBO) entity handles the routing of packets from the UE 610 between CN 642 and the ECP 146, and from the CN 642 and the ECP 146 to the UE 610 (see e.g., [TS23501], [TS23502]). Additionally or alternatively, a Backhaul Adaptation Protocol (BAP) sublayer/entity can be used to route packets to/from the UE 610, the CN 642, and the ECP 146 (see e.g., [TS38300] § 6.11). Other packet forwarding and/or packet routing mechanisms can be used in other implementations. In either implementation, packets related to edge services are routed to the ECP 146, while other packets are routed to the CN 642.

Figure 7:
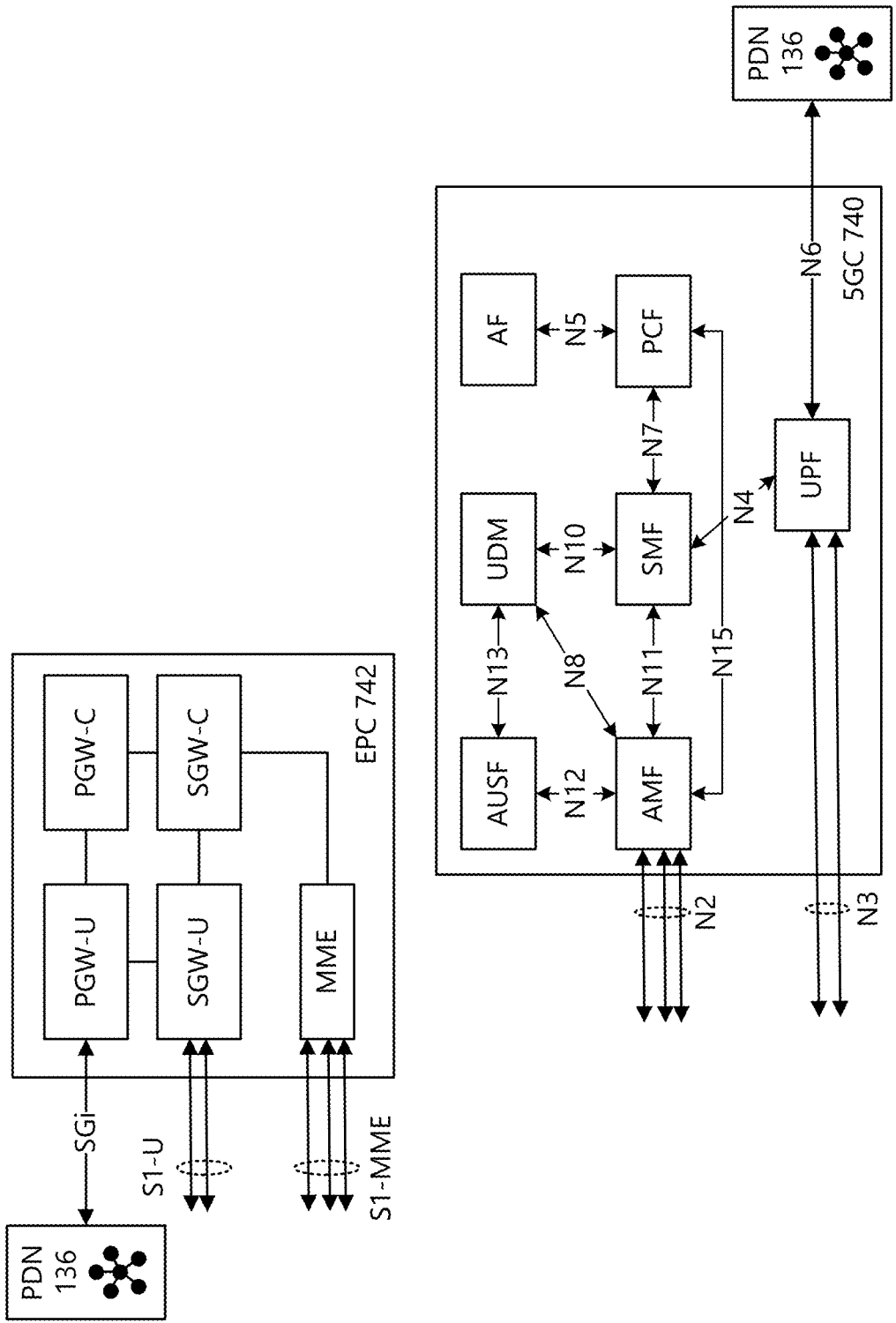

In one example implementation, the multi-modal NANs 630-1, 630-2 are RRHs/RUs or DUs, and the NAN 630-x is a CU. In another example implementation, the multi-modal NANs 630-1, 630-2 are RSUs, and the NAN 630-x is an eNB or an ng-eNB. Additionally or alternatively, the NAN 630-x is a RAN controller, a virtualized RAN, a cloud RAN, a RIC, and/or the like. The NAN 630-x is connected to CN 642 via an UP and CP interfaces 632, 633. Examples of the CN 642 and the UP and CP interfaces 632, 633 are discussed infra w.r.t. FIG. 7.

FIG. 7 shows examples of the CN 642 the UP and CP interfaces 632, 633 of FIG. 6. In a first example, the CN 642 is an evolved packet core (EPC) 742, which includes a user plane PGW (PGW-U), a control plane PGW (PGW-C), a user plane SGW (SGW-U), a control plane SGW (SGW-C), and an MME, among many other NFs not shown. In this example, the UP interface 632 is or includes an S1 user plane interface (S1-U) between the SGW-U and the UP entities 621-11, 621-21 (see e.g., FIG. 6), and an SGi interface between the PGW-U and the PDN 136 (which is also a UP interface). Additionally, the CP interface 633 is or includes an S1-MME interface between the MME and the CP entities 622-11, 622-21. Here, the first interface element 632 may be an LTE-Uu interface element, and the second interface element 633 may be a PC5 interface element. Additionally, the interface 612 includes both the LTE-Uu and the PC5 interfaces. The NFs within the EPC 742 and the S1 interfaces are discussed in more detail infra with respect to FIG. 11.

In a second example, the CN 642 is an 5G core network (5GC) 740, which includes an AMF, SMF, PCF, AUSF, UDM, AF, and UPF, among many other NFs not shown. In this example, the UP interface 632 is or includes N3 interface (reference point) between the UPF and the UP entities 621-11, 621-21 (see e.g., FIG. 6), and an N4 interface between the UPF and the PDN 136 (which is also a UP interface). Additionally, the CP interface 633 is or includes an N2 interface (reference point) between the AMF and the CP entities 622-11, 622-21. In this example, the first interface element 632 may be an NR-Uu interface element, and the second interface element 633 may be a PC5 interface element. Additionally, the interface 612 includes both the NR-Uu and the PC5 interfaces. The NFs within the 5GC 740 and the various depicted interfaces/reference points are discussed in more detail infra with respect to FIG. 11.

The HO procedure for the Uu interface (e.g., LTE-Uu and NR-Uu) is already standardized in 3GPP specifications. The HO procedure involves the UE 610 switching from a source NAN (e.g., NAN 630-1 in FIG. 6) to a target NAN (e.g., NAN 630-2 in FIG. 6). Since the UE 610 performs measurements on both the PC5 and Uu interfaces, the NAN 630-x can take advantage of both interfaces to improve mobility handling performance, and hence the reliability of the system. The coordination between multiple interfaces (e.g., Uu and PC5 interfaces) for mobility management is illustrated by FIG. 8.

Figure 8:
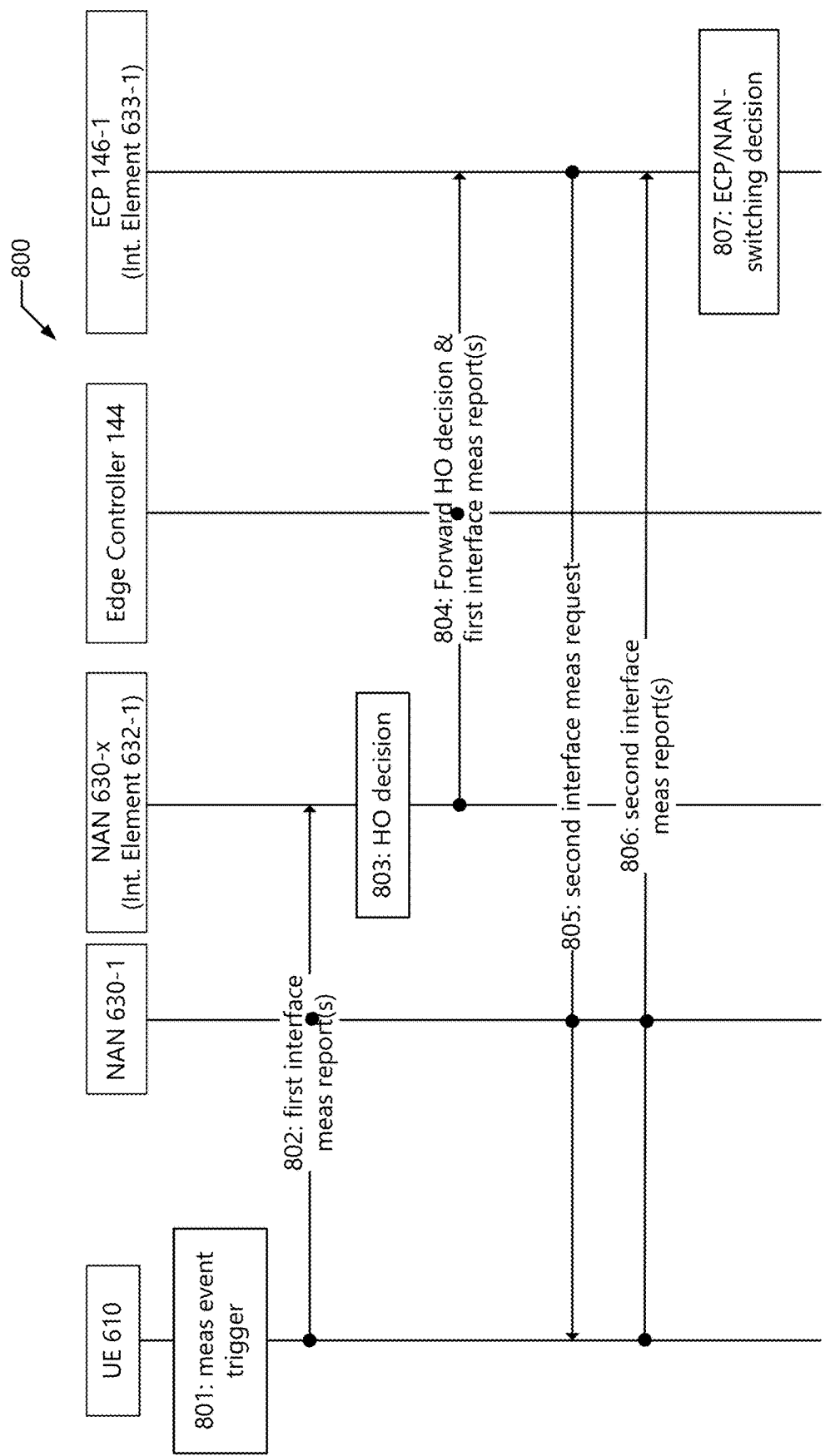
FIG. 8 depicts an example procedure for coordination between multiple air interfaces for mobility management.

FIG. 8 depicts an example multi-interface coordination procedure 800. Here, a measurement report trigger event is detected (801), which may be the same or similar to the measurement report trigger condition discussed previously w.r.t. FIG. 4, and a first interface (e.g., Uu interface) measurement report is sent by the UE 610 to the first interface element 632-1 in the NAN 630-x via NAN 630-1 (802). This triggers an HO decision at the NAN 630-x (or the first interface element 632-1) (803). The information about the HO decision and the measurement report(s) is shared with ECP 346-1 (and/or the second interface element 633-1) (804). Based on this information, the ECP 346-1 can start the ECP/NAN-switching preparation process earlier (in comparison with existing techniques), which in-turn improves the communication reliability. In this example, the ECP 346-1 (and/or the second interface element 633-1) requests the UE 610 perform measurements w.r.t. the second interface (e.g., PC5 interface) (805), and the second interface (e.g., PC5 interface) measurement report(s) is/are sent by the UE 610 to the second interface element 633-1 in the NAN 630-x via NAN 630-1 (806). Then, the ECP 346-1 determines an ECP/NAN-switching decision (807).

1.3. Different ECP Switching/Handover Scenarios with Multi-Access Connections

Since different air interface standards such as C-V2X (e.g., PC5, LTE/NR-Uu, and the like) and W-V2X (e.g., ITS-G5, 802.11bd, DSRC, and the like) are expected to co-exist in RSU deployments, there can be several different possibilities in UE mobility depending on the capabilities of the UE and the RSUs in the area.

Figure 9:
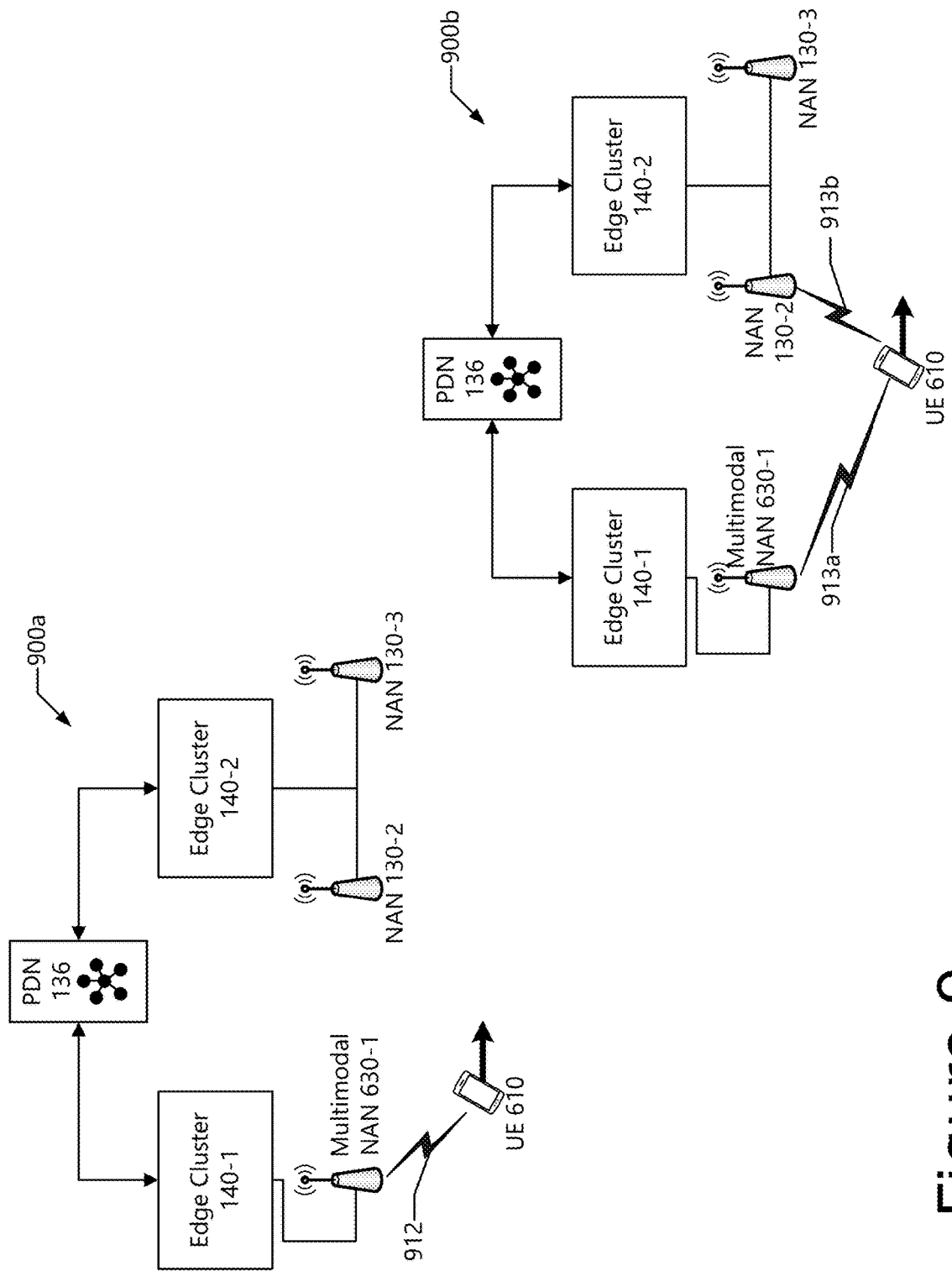
FIG. 9 depicts an example inter-cluster ECP session continuity scenario.

FIG. 9 shows example scenarios 900a, 900b in which a source cluster 140-1 and NAN 630-1 support multiple interfaces (e.g., PC5 and Uu interfaces) while target cluster 140-2 and NAN 130-2 only supports a single interface (e.g., PC5 interface). In scenario 900a, UE 610 is capable of utilizing multiple interfaces 912 and is being served by the NAN 630-1 via one or more of the multiple interfaces 912. In scenario 900b, the UE 610 moves from the coverage area of edge cluster 140-1/NAN 630-1 to the coverage area of edge cluster 140-2/NAN 130-2. In scenario 900b, the edge apps/services served via the interface 913b supported by edge cluster 140-2 and/or NAN 130-2 (e.g., PC5 interface) switch to being served by edge cluster 140-2 via NAN 130-2, whereas the edge apps/services served via the interface 913a not supported by edge cluster 140-2 and/or NAN 130-2 (e.g., Uu interface) continue to be served by edge cluster 140-1 via NAN 630-1.

2. Edge Computing and Communication Network Configurations and Arrangements

Edge computing refers to the implementation, coordination, and use of computing and resources at locations closer to the "edge" or collection of "edges" of a network. Deploying computing resources at the network's edge may reduce app and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, and the like) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, and the like) where respective partitionings may contain security and/or integrity protection capabilities. Edge nodes may also provide orchestration of multiple apps through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of app composition. The edge nodes are coordinated based on edge provisioning functions, while the operation of the various apps are coordinated with orchestration functions (e.g., VM or container engine, and the like). The orchestration functions may be used to deploy the isolated user-space instances, identifying and scheduling use of specific hardware, security related functions (e.g., key management, trust anchor management, and the like), and other tasks related to the provisioning and lifecycle of isolated user spaces.

Apps that have been adapted for edge computing include but are not limited to virtualization of traditional network functions including include, for example, SDN, NFV, distributed RAN units and/or RAN clouds, and the like. Additional example use cases for edge computing include computational offloading, CDN services (e.g., video on demand, content streaming, security surveillance, alarm system monitoring, building access, data/content caching, and the like), gaming services (e.g., AR/VR, and the like), accelerated browsing, IoT and industry apps (e.g., factory automation), media analytics, live streaming/transcoding, and V2X apps (e.g., driving assistance and/or autonomous driving apps).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 10:
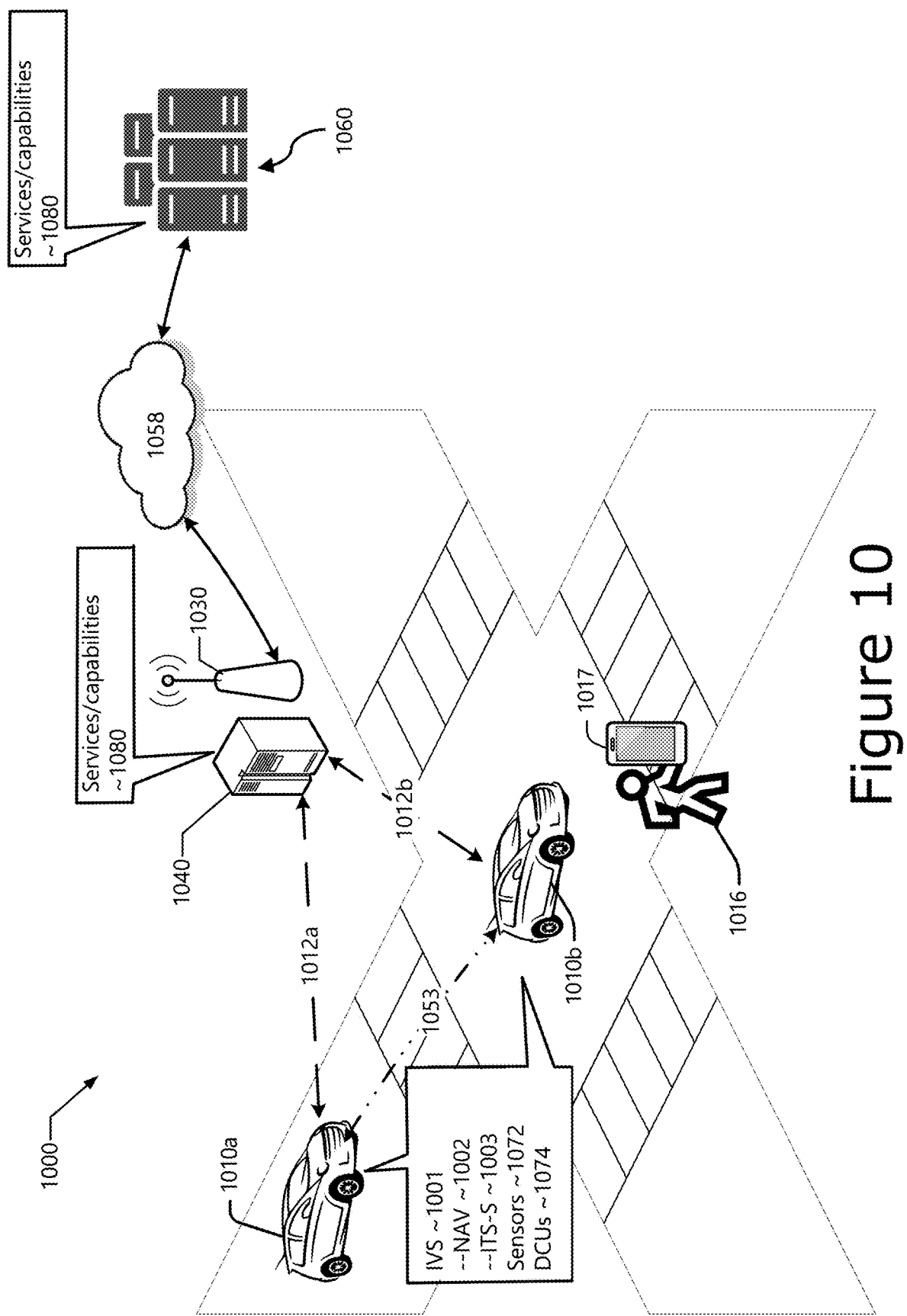
FIG. 10 illustrates an operative Intelligent Transport System (ITS) environment and/or arrangement.

FIG. 10 illustrates an overview of an environment 1000, which includes vehicles 1010A and 1010B (collectively "vehicle 1010"). Vehicles 1010 includes an engine, transmission, axles, wheels and so forth (not shown). The vehicles 1010 may be any type of motorized vehicles used for transportation of people or goods, each of which are equipped with an engine, transmission, axles, wheels, as well as control systems used for driving, parking, passenger comfort and/or safety, and/or the like. The terms "motor", "motorized", and/or the like as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 1010 shown by FIG. 10 may represent motor vehicles of varying makes, models, trim, and/or the like.

For illustrative purposes, the following description is provided for deployment scenarios including vehicles 1010 in a 2D freeway/highway/roadway environment wherein the vehicles 1010 are automobiles. However, other types of vehicles are also applicable, such as trucks, busses, motorboats, motorcycles, electric personal transporters, and/or any other motorized devices capable of transporting people or goods. 3D deployment scenarios are also applicable where some or all of the vehicles 1010 are implemented as flying objects, such as aircraft, drones, UAVs, and/or to any other like motorized devices. Additionally, for illustrative purposes, the following description is provided where the vehicles 1010 include in-vehicle systems (IVS) 1001, which are discussed in more detail infra. However, the vehicles 1010 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, and/or any other suitable device or system (such as those discussed herein) that may be operable to perform the functionality discussed herein. Vehicles 1010 including a computing system (e.g., IVS 1001) as well as the vehicles referenced throughout the present disclosure, may be referred to as vehicle user equipment (UE) 1010, vehicle stations 1010, vehicle ITS stations (V-ITS-S) 1010, computer assisted (CA)/autonomous driving (AD) vehicles 1010, and/or the like. In various implementations, the V-ITS-Ss 1010 may be the same or similar as the UEs 310, 610 of FIGS. 1-9 and/or UE 1102 of FIG. 11.

Each vehicle 1010 includes an in-vehicle system (IVS) 1001, one or more sensors 1072, and one or more driving control units (DCUs) 1074 (also referred to as "Electronic Control Units" or "ECUs"). The IVS 1000 includes a number of vehicle computing hardware subsystems and/or apps including, for example, various hardware and software elements to implement the ITS reference architecture 1200 of FIG. 12. Additionally, some or all of the vehicles 1010 may be computer-assisted or autonomous driving (CA/AD) vehicles, which may include artificial intelligence (AI) and/or machine learning (ML) element, and/or robotics to assist vehicle operation Additionally, the IVS 1001 and CA/AD vehicle 1010 may include other components/subsystems not shown by FIG. 10 such as the elements shown and described throughout the present disclosure.

Figure 12:
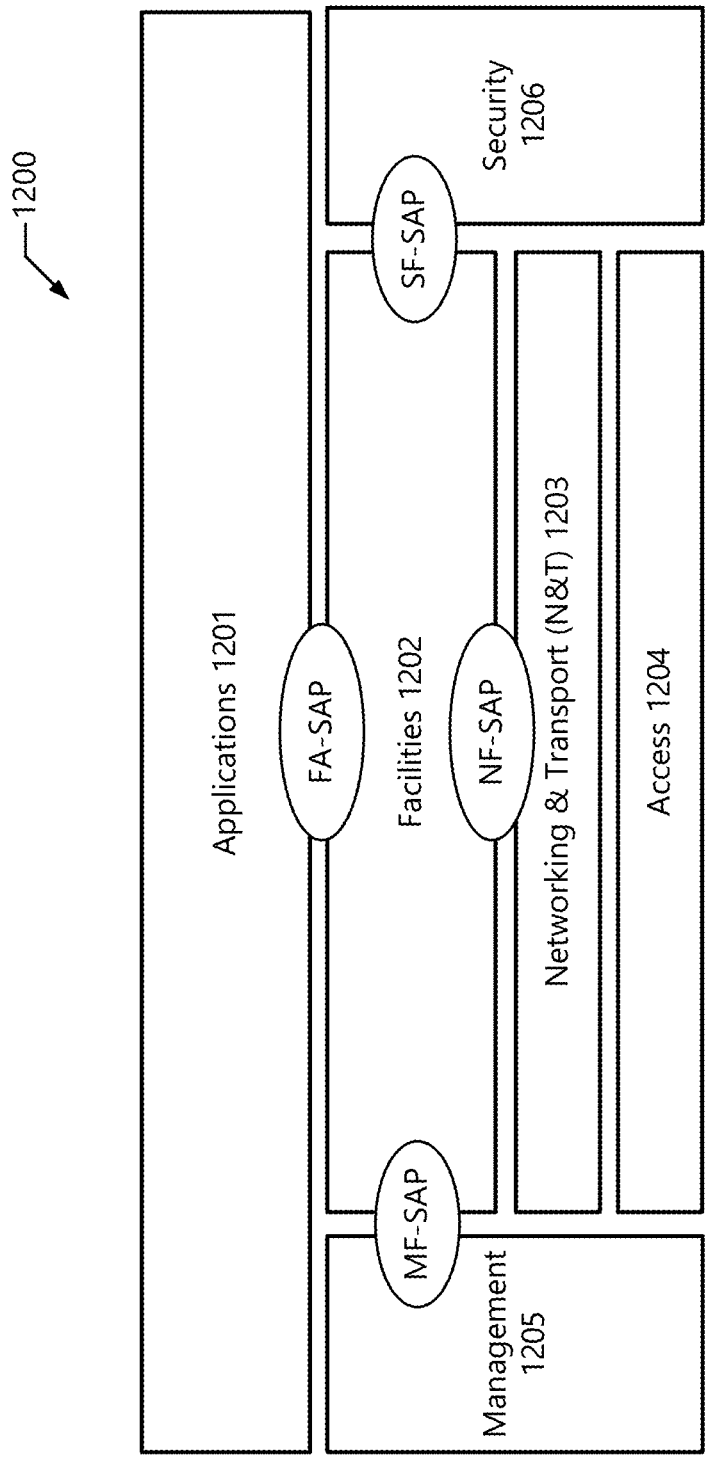
FIG. 12 depicts an ITS-S reference architecture.

The IVS 1001 includes the ITS-S 1003, which may be the same or similar to the ITS-S reference architecture 1200 of FIG. 12. The ITS-S 1003 employs one or more RATs, which allows the vehicles 1010 to communicate directly with one another and with infrastructure equipment (e.g., network access node (NAN) 1030. The one or more RATs may refer to cellular V2X (C-V2X) RATs (e.g., 3GPP LTE, 5G/NR, and beyond), a WLAN V2X (W-V2X) RAT (e.g., DSRC in the USA or ITS-G5 in the EU), and/or some other RAT such as those discussed herein. Some or all of the vehicles 1010 may include positioning circuitry (e.g., pos 1375 of FIG. 13) to (coarsely) determine their respective geolocations and communicate their current position with the NAN 1030 in a secure and reliable manner. This allows the vehicles 1010 to synchronize with one another and/or the NAN 1030.

Additionally or alternatively, the ITS-S 1003 may utilize respective connections (or channels) 1012a, 1012b to communicate data (e.g., transmit and receive) data with the NAN 1030. The connections 1012a, 1012b are illustrated as an air interface to enable communicative coupling consistent with one or more communications protocols, such as any of those discussed herein. Additionally or alternatively, the ITS-Ss 1003 can directly exchange data via direct links 1053, which may be LTE/NR Proximity Services (ProSe) link, PC5 interfaces/links, sidelink channels, or the like; WiFi based links or a personal area network (PAN) based links (e.g., [IREEE802154] based protocols including ZigBee, IPv6 over Low power Wireless Personal Area Networks (6LoW-PAN), WirelessHART, MiWi, Thread, and/or the like; WiFi-direct; Bluetooth/Bluetooth Low Energy (BLE) protocols); ITS-G5 and/or DSRC links, and/or the like.

Additionally or alternatively, the ITS-S 1003 is capable of collecting or otherwise obtaining radio information, and providing the radio information to one or more NANs 1030. The radio information may include, for example, signal strength measurements, signal quality measurements, various signal/channel characteristics, and/or the like. The radio information may be in the form of one or more measurement reports and/or the like. Each measurement report is tagged with a timestamp and the location of the measurement (e.g., a current location of the ITS-S 1003 or the vehicle 1010). The radio information may be used for various purposes including, for example, cell selection, handover, network attachment, testing, and/or other purposes. Additionally or alternatively, the same or similar measurements/characteristics discussed herein may be measured and/or collected by the VRU system 1017 and/or the NAN 1030 and provided to the edge compute node 1040 and/or the cloud system 1060.

Examples of the measurements/characteristics collected by individual UEs (e.g., ITS-S 1003, VRU system 1017, and/or the like) include one or more of the measurements/metrics discussed in 3GPP TS 36.214 v17.0.0 (2022-03-31) ("[TS36214]"), 3GPP TS 38.215 v17.1.0 (2022-04-01) ("[TS38215]"), 3GPP TS 38.314 v17.0.0 (2022-04-13) ("[TS38314]"), *IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, IEEE Std* 802.11-2020, pp. 1-4379 (26 Feb. 2021) ("[IREEE80211]"), the contents of which are hereby incorporated by reference in their entireties. The measurements/metrics can also be those defined by other suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., MAMS [RFC8743]), IEEE/WiFi (e.g., [IEEE80211], [WiMAX], [IREEE16090], and/or the like), and/or any other like standards such as those discussed elsewhere herein.

The subsystems/apps may also include instrument cluster subsystems, front-seat and/or back-seat infotainment subsystems and/or other like media subsystems, a navigation subsystem (NAV) 1002, a vehicle status subsystem/app, a HUD subsystem, an EMA subsystem, and so forth. The NAV 1002 may be configurable or operable to provide navigation guidance or control, depending on whether vehicle 1010 is a computer-assisted vehicle, partially or fully autonomous driving vehicle. NAV 1002 may be configured with computer vision to recognize stationary or moving objects (e.g., a pedestrian, another vehicle, or some other moving object) in an area surrounding vehicle 1010, as it travels enroute to its destination. The NAV 1002 may be configurable or operable to recognize stationary or moving objects in the area surrounding vehicle 1010, and in response, make its decision in guiding or controlling DCUs of vehicle 1010, based at least in part on sensor data collected by sensors 1072.

The DCUs 1074 include hardware elements that control various systems of the vehicles 1010, such as the operation of the engine, the transmission, steering, braking, and/or the like. DCUs 1074 are embedded systems or other like computer devices that control a corresponding system of a vehicle 1010. The DCUs 1074 may each have the same or similar components as devices/systems of FIG. 1374 discussed infra, or may be some other suitable microcontroller or other like processor device, memory device(s), communications interfaces, and the like. Individual DCUs 1074 are capable of communicating with one or more sensors 1072 and actuators (e.g., actuators 1374 of FIG. 13).

The sensors 1072 are hardware elements configurable or operable to detect an environment surrounding the vehicles 1010 and/or changes in the environment. The sensors 1072 are configurable or operable to provide various sensor data to the DCUs 1074 and/or one or more AI agents to enable the DCUs 1074 and/or one or more AI agents to control respective control systems of the vehicles 1010. Some or all of the sensors 1072 may be the same or similar as the sensor circuitry 1372 of FIG. 13. In particular, the IVS 1001 may include or implement a facilities layer and operate one or more facilities within the facilities layer. The sensors 1072 include(s) devices, modules, and/or subsystems whose purpose is to detect events or changes in its environment and send the information (sensor data) about the detected events to some other a device, module, subsystem, and/or the like. Examples of such sensors 1072 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., visible light cameras, thermographic camera and/or thermal imaging camera (TIC) systems, forward-looking infrared (FLIR) camera systems, radiometric thermal camera systems, active IR camera systems, ultraviolet (UV) camera systems, and/or the like); light detection and ranging (LiDAR) sensors; proximity sensors (e.g., IR radiation detector and the like), depth sensors, ambient light sensors, ultrasonic transceivers; microphones; and/or the like. Some of the sensor circuitry 1072 may be sensors used for various aerial asset and/or vehicle control systems such as, for example, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data; catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; pedal position sensors; accelerometers; altimeters; magnetometers; level sensors; flow/fluid sensors, barometric pressure sensors, vibration sensors (e.g., shock & vibration sensors, motion vibration sensors, main and tail rotor vibration monitoring and balancing (RTB) sensor(s), gearbox and drive shafts vibration monitoring sensor(s), bearings vibration monitoring sensor(s), oil cooler shaft vibration monitoring sensor(s), engine vibration sensor(s) to monitor engine vibrations during steady-state and transient phases, and/or the like), force and/or load sensors, remote charge converters (RCC), rotor speed and position sensor(s), fiber optic gyro (FOG) inertial sensors, Attitude & Heading Reference Unit (AHRU), fibre Bragg grating (FBG) sensors and interrogators, tachometers, engine temperature gauges, pressure gauges, transformer sensors, airspeed-measurement meters, vertical speed indicators, and/or the like. The sensor circuitry 1072 may include other sensors such as and/or other like sensors/systems.

IVS 1001, on its own or in response to user interactions, communicates or interacts with one or more vehicles 1010 via interface 1053, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, and/or the like). Other technologies could be used, such as Bluetooth/Bluetooth Low Energy (BLE) or the like. The vehicles 1010 may exchange ITS protocol data units (PDUs) or other messages (e.g., VAMs, CPMs, DENMs, and/or the like) with one another over the interface 1053. VS 1001, on its own or in response to user interactions, communicates or interacts with one or more vehicles 1010 via interface 1053, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, and/or the like). Other technologies could be used, such as Bluetooth/Bluetooth Low Energy (BLE) or the like. The vehicles 1010 may exchange ITS protocol data units (PDUs) or other messages (e.g., VAMs, CPMs, DENMs, and/or the like) with one another over the interface 1053.

IVS 1001, on its own or in response to user interactions, communicates or interacts with one or more remote/cloud servers 1060 via NAN 1030 over interface 1012 and over network 1058. The NAN 1030 is arranged to provide network connectivity to the vehicles 1010 via respective interfaces 1012 between the NAN 1030 and the individual vehicles 1010. The NAN 1030 is, or includes, an ITS-S that is the same or similar as ITS-S 1003 (referred to as a roadside ITS-S(R-ITS-S)).

The NAN 1030 is a network element that is part of an access network that provides network connectivity to the end-user devices (e.g., V-ITS-Ss 1010 and/or VRU ITS-Ss 1017). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. The CRAN, CR, or vBBUP may implement a RAN function split, wherein one or more communication protocol layers are operated by the CRAN/CR/vBBUP and other communication protocol entities are operated by individual RAN nodes 1030. This virtualized framework allows the freed-up processor cores of the NAN 1030 to perform other virtualized apps, such as virtualized apps for the VRU 1016/V-ITS-S 1010. The NAN 1030 may include ground stations (e.g., terrestrial access points) or satellite stations to provide network connectivity or coverage within a geographic area (e.g., a cell). The NAN 1030 may be implemented as one or more dedicated physical devices such as a macrocell base stations and/or a low power base station for providing femtocells, picocells, or other like cells having smaller coverage areas, smaller user capacity, or higher bandwidth compared to macrocells. In some implementations, the NAN 1030 corresponds to one or more of the NANs 130, 630 discussed previously w.r.t. FIGS. 1-9 and/or the AN 1108 of FIG. 11.

Environment 1000 also includes VRU 1016, which includes a VRU device 1017 (also referred to as "VRU equipment" or "VRU system"). The VRU 1016 is a non-motorized road users such as pedestrians, light vehicles carrying persons (e.g., wheelchair users, skateboards, e-scooters, Segways, and/or the like), motorcyclists (e.g., motorbikes, powered two wheelers, mopeds, and/or the like), and/or animals posing safety risk to other road users (e.g., pets, livestock, wild animals, and/or the like). The VRU device 1017 includes an ITS-S that is the same or similar as the ITS-S 1003 discussed previously, and/or related hardware components, other in-station services, and sensor sub-systems. The VRU device 1017 could be a pedestrian-type VRU device 1017 (e.g., a "personal ITS-S" such as a smartphone, tablet, wearable device, and the like), a vehicle-type VRU device 1017 (e.g., a device embedded in or coupled with a bicycle, motorcycle, or the like, or a pedestrian-type VRU device 1017 in or on a bicycle, motorcycle, or the like), or an IoT device (e.g., traffic control devices) used by a VRU 1016 integrating ITS-S technology. For purposes of the present disclosure, the term "VRU" may be used to refer to both the VRU 1016 and its VRU device 1017 unless the context dictates otherwise. Various details regarding VRUs and VAMs are discussed in ETSI TR 103 300-1 v2.1.1 (2019-09) ("[TR103300-1]"), ETSI TS 103 300-2 V0.3.0 (2019-12) ("[TS103300-2]"), and ETSI TS 103 300-3 V0.1.11 (2020-05) ("[TS103300-3]"). In various implementations, the VRU device 1017 may be the same or similar as the UEs 310, 610 of FIGS. 1-9 and/or UE 1102 of FIG. 11.

The Radio Access Technologies (RATs) employed by the NAN 1030, the V-ITS-Ss 1010, and the VRU ITS-S 1017 may include one or more V2X RATs, which allow the V-ITS-Ss 1010 to communicate directly with one another, with infrastructure equipment (e.g., NAN 1030), and with VRU devices 1017. In the example of FIG. 10, any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 1012a and the WLAN V2X RAT may utilize an air interface 1012b. The W-V2X RATs include, for example, IEEE 1609.0-2019, "IEEE Guide for Wireless Access in Vehicular Environments (WAVE) Architecture" (2019-04-10) ("[IEEE16090]"), SAE Int'l, "V2X Communications Message Set Dictionary" (formerly "Dedicated Short Range Communication (DSRC) Message Set Dictionary") (2020-07-23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) ("[EN302663]") and describes the access layer of the ITS-S reference architecture 1200. The ITS-G5 access layer comprises [IEEE80211] (which now incorporates IEEE 802.11p) and/or IEEE/ISO/IEC 8802-2-1998 protocols, as well as features for Decentralized Congestion Control (DCC) methods discussed in ETSI TS 102 687 V1.2.1 (2018-04) ("[TS1026871]"). The access layer for 3GPP LTE-V2X based interface(s) is outlined in, inter alia, ETSI EN 303 613 V1.1.1 (2020-01), 3GPP TS 23.285 v17.0.0 (2022-03-29) ("TS23285]"; and 3GPP 5G/NR-V2X is outlined in, inter alia, 3GPP TR 23.786 v16.1.0 (2019-06) and 3GPP TS 23.287 v17.2.0 (2021-12-23) ("[TS23287]"). In arrangement 1000, V-ITS-S 1010a may be equipped with a first V2X RAT communication system (e.g., C-V2X) whereas V-ITS-S 1010b may be equipped with a second V2X RAT communication system (e.g., W-V2X). Additionally or alternatively, the V-ITS-S 1010a and/or V-ITS-S 1010b may each be employed with multiple V2X RAT communication systems.

In V2X scenarios, V-ITS-Ss 1010, VRU device 1017, and/or NAN 1030 may be or act as an RSU or R-ITS-S, which refers to any transportation infrastructure entity used for V2X communications. In the example of FIG. 10, the NAN 1030 is a stationary RSU, such as an gNB/eNB-type RSU or other like infrastructure. In other implementations, a V-ITS-S 1010 and/or VRU device 1017 may be a mobile RSU or a UE-type RSU. In these cases, mobility issues can be managed in order to ensure a proper radio coverage of the translation entities. Additionally or alternatively, RSU may be a road embedded reflector, a smart street or traffic light, a road side tag, smart signage, or other like traffic control device/element.

The NAN 1030 or an edge compute node 1040 may provide one or more services/capabilities 1080. In an example implementation, RSU 1030 is a computing device coupled with radio frequency circuitry located on a roadside that provides connectivity support to passing V-ITS-Ss 1010. The RSU 1030 may also include internal data storage circuitry to store intersection map geometry, traffic statistics, media, as well as apps/software to sense and control ongoing vehicular and pedestrian traffic. The RSU 1030 provides various services/capabilities 1080 such as, for example, very low latency communications required for high speed events, such as crash avoidance, traffic warnings, and the like. Additionally or alternatively, the RSU 1030 may provide other services/capabilities 1080 such as, for example, cellular/WLAN communications services. In some implementations, the components of the RSU 1030 may be packaged in a weatherproof enclosure suitable for outdoor installation, and may include a network interface controller to provide a wired connection (e.g., Ethernet) to a traffic signal controller and/or a backhaul network. Further, RSU 1030 may include wired or wireless interfaces to communicate with other RSUs 1030 (not shown by FIG. 10).

The network 1058 may represent a network such as the Internet, a wireless local area network (WLAN), or a wireless wide area network (WWAN) including proprietary and/or enterprise networks for a company or organization, a cellular core network (e.g., CN 142, CN 642, CN 1120, a backbone network, and/or some other type of core network), an edge computing network, a cloud computing service (e.g., cloud 360 of FIG. 3), a data network (e.g., PDN 136 and/or DN 1136), an enterprise network, and/or combinations thereof. As examples, the network 1058 and/or access technologies may include cellular technology (e.g., 3GPP LTE, NR/5G, MuLTEfire, WiMAX, and so forth), WLAN (e.g., WiFi®), and/or the like. Different technologies exhibit benefits and limitations in different scenarios, and app performance in different scenarios becomes dependent on the choice of the access networks. The remote/cloud servers 1060 may represent one or more app servers, a cloud computing architecture/platform that provides cloud computing services, and/or some other remote infrastructure. The remote/cloud servers 1060 may include any one of a number of services and capabilities 1080 such as, for example, ITS-related apps and services, driving assistance (e.g., mapping/navigation), content provision (e.g., multimedia infotainment streaming), and/or the like.

Additionally, the NAN 1030 is co-located with an edge compute node 1040 (or a collection of edge compute nodes 1040), which may provide any number of services/capabilities 1080 to vehicles 1010 such as ITS services/apps, driving assistance, and/or content provision services 1080. The edge compute node 1040 may include or be part of an edge network or "edge cloud". The edge compute node 1040 may also be referred to as an "edge host 1040," "edge server 1040," or "compute platforms 1040." Aspects of the edge compute node 1040 and/or ECTs are discussed infra.

In any of the implementations discussed herein, the edge servers 1040 provide a distributed computing environment for app and service hosting, and also provide storage and processing resources so that data and/or content can be processed in close proximity to subscribers (e.g., users of UEs 1010, 1017) for faster response times The edge servers 1040 also support multitenancy run-time and hosting environment(s) for apps, including virtual appliance apps that may be delivered as packaged virtual machine (VM) images, middleware app and infrastructure services, content delivery services including content caching, mobile big data analytics, and computational offloading, among others. Computational offloading involves offloading computational tasks, workloads, apps, and/or services to the edge compute node 1040 from the UEs 1010, 1017, CN 142, cloud service, and/or server(s) 1060, or vice versa. For example, a device app or client app operating in a UE 1010, 1017 may offload app tasks or workloads to one or more edge servers 1040. In another example, an edge server 1040 may offload app tasks or workloads to one or more UEs 1010, 1017 (e.g., for distributed ML computation or the like).

The edge compute node 1040 includes or is part of an edge system (or edge network) that employs one or more ECTs. The edge compute node 1040 may also be referred to as "edge host 1040" or "edge server 1040." The edge system/ECT includes a collection of edge servers 1040 and edge management systems (not shown by FIG. 10) necessary to run edge computing apps within an operator network or a subset of an operator network. The edge servers 1040 are physical computer systems that may include an edge platform and/or virtualization infrastructure, and provide compute, storage, and network resources to edge computing apps. Each of the edge servers 1040 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 1010, 1017. The VI of the edge servers 1040 provide virtualized environments and virtualized resources for the edge hosts, and the edge computing apps may run as VMs and/or app containers on top of the VI.

In one example implementation, the ECT 1040 is and/or operates according to the MEC framework, as discussed in ETSI GR MEC 001 v3.1.1 (2022-01), ETSI GS MEC 003 v3.1.1 (2022-03) ("[MEC003]"), ETSI GS MEC 009 v3.1.1 (2021-06), ETSI GS MEC 010-1 v1.1.1 (2017-10), ETSI GS MEC 010-2 v2.2.1 (2022-02), ETSI GS MEC 011 v2.2.1 (2020-12), ETSI GS MEC 012 V2.2.1 (2022-02) ("[MEC012]"), ETSI GS MEC 013 V2.2.1 (2022-01), ETSI GS MEC 014 v2.1.1 (2021-03), ETSI GS MEC 015 v2.1.1 (2020-06), ETSI GS MEC 016 v2.2.1 (2020-04), ETSI GS MEC 021 v2.2.1 (2022-02), ETSI GR MEC 024 v2.1.1 (2019-11), ETSI GS MEC 028 V2.2.1 (2021-07), ETSI GS MEC 029 v2.2.1 (2022-01), ETSI MEC GS 030 v2.1.1 (2020-04) ("[MEC030]"), ETSI GR MEC 031 v2.1.1 (2020-10), and Int'l App. No. PCT/US2020/066969 filed on Dec. 23, 2020 (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021-03), ETSI GS NFV 002 V1.2.1 (2014-12), ETSI GR NFV 003 V1.6.1 (2021-03), ETSI GS NFV 006 V2.1.1 (2021-01), ETSI GS NFV-INF 001 V1.1.1 (2015-01), ETSI GS NFV-INF 003 V1.1.1 (2014-12), ETSI GS NFV-INF 004 V1.1.1 (2015-01), ETSI GS NFV-MAN 001 v1.1.1 (2014-12), and/or Israel et al., *OSM Release FIVE Technical Overview*, ETSI OPEN SOURCE MANO, OSM White Paper, 1st ed. (January 2019), https://osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2.pdf, Open Network Automation Platform (ONAP) documentation, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021-12-23) ("[TS28533]"), the contents of each of which are hereby incorporated by reference in their entireties.

In another example implementation, the ECT 1040 is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v05.00, O-RAN ALLIANCE WG1 (July 2021); *O-RAN Operations and Maintenance Architecture Specification* v04.00, O-RAN ALLIANCE WG1 (November 2020); *O-RAN Operations and Maintenance Interface Specification* v04.00, O-RAN ALLIANCE WG1 (November 2020); *O-RAN Information Model and Data Models Specification* v01.00, O-RAN ALLIANCE WG1 (November 2020); *O-RAN Working Group 1 Slicing Architecture* v05.00, O-RAN ALLIANCE WG1 (July 2021); *O-RAN Working Group 2 (Non-RT RIC and A1 interface WG) A1 interface: Application Protocol* v03.01, O-RAN ALLIANCE WG2 (March 2021); *O-RAN Working Group 2 (Non-RT RIC and A1 interface WG) A1 interface: Type Definitions* v02.00, O-RAN ALLIANCE WG2 (July 2021); *O-RAN Working Group 2 (Non-RT RIC and A1 interface WG) A1 interface: Transport Protocol* v01.01, O-RAN ALLIANCE WG2 (March 2021); *O-RAN Working Group 2 AI/ML workflow description and requirements* v01.03 O-RAN ALLIANCE WG2 (July 2021); *O-RAN Working Group 2 Non-RT RIC: Functional Architecture* v01.03 O-RAN ALLIANCE WG2 (July 2021); *O-RAN Working Group 3, Near-Real-time Intelligent Controller, E2 Application Protocol (E2AP)* v02.00, O-RAN ALLIANCE WG3 (July 2021); *O-RAN Working Group 3 Near-Real-time Intelligent Controller Architecture & E2 General Aspects and Principles* v02.00, O-RAN ALLIANCE WG3 (July 2021); *O-RAN Working Group 3 Near-Real-time Intelligent Controller E2 Service Model (E2SM)* v02.00, O-RAN ALLIANCE WG3 (July 2021); *O-RAN Working Group 3 Near-Real-time Intelligent Controller E2 Service Model (E2SM) KPM* v02.00, O-RAN ALLIANCE WG3 (July 2021); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) RAN Control* v01.00, O-RAN ALLIANCE WG3 (July 2021); *O-RAN Working Group 3 Near-Real-time Intelligent Controller Near-RT RIC Architecture* v02.00, O-RAN ALLIANCE WG3 (March 2021); *O-RAN Fronthaul Working Group 4 Cooperative Transport Interface Transport Control Plane Specification* v02.00, O-RAN ALLIANCE WG4 (March 2021); *O-RAN Fronthaul Working Group 4 Cooperative Transport Interface Transport Management Plane Specification* v02.00, O-RAN ALLIANCE WG4 (March 2021); *O-RAN Fronthaul Working Group 4 Control, User, and Synchronization Plane Specification* v07.00, O-RAN ALLIANCE WG4 (July 2021); *O-RAN Fronthaul Working Group 4 Management Plane Specification* v07.00, O-RAN ALLIANCE WG4 (July 2021); *O-RAN Open F1/W1/E1/X2/Xn Interfaces Working Group Transport Specification* v01.00, O-RAN ALLIANCE WG5 (April 2020); *O-RAN Alliance Working Group 5 O1 Interface specification for O-DU* v02.00, O-RAN ALLIANCE WGX (July 2021); *Cloud Architecture and Deployment Scenarios for O-RAN Virtualized RAN* v02.02, O-RAN ALLIANCE WG6 (July 2021); *O-RAN Acceleration Abstraction Layer General Aspects and Principles* v01.01, O-RAN ALLIANCE WG6 (July 2021); *Cloud Platform Reference Designs* v02.00, O-RAN ALLIANCE WG6 (November 2020); *O-RAN O2 Interface General Aspects and Principles* v01.01, O-RAN ALLIANCE WG6 (July 2021); *O-RAN White Box Hardware Working Group Hardware Reference Design Specification for Indoor Pico Cell with Fronthaul Split Option 6* v02.00, O-RAN ALLIANCE WG7 (July 2021); *O-RAN WG7 Hardware Reference Design Specification for Indoor Picocell (FR1) with Split Option 7-2* v03.00, O-RAN ALLIANCE WG7 (July 2021); *O-RAN WG7 Hardware Reference Design Specification for Indoor Picocell (FR1) with Split Option 8* v03.00, O-RAN ALLIANCE WG7 (July 2021); *O-RAN Open Transport Working Group 9 Xhaul Packet Switched Architectures and Solutions* v02.00, O-RAN ALLIANCE WG9 (July 2021); *O-RAN Open X-haul Transport Working Group Management interfaces for Transport Network Elements* v02.00, O-RAN ALLIANCE WG9 (July 2021); *O-RAN Open X-haul Transport WG9 WDM-based Fronthaul Transport* v01.00, O-RAN ALLIANCE WG9 (November 2020); *O-RAN Open X-haul Transport Working Group Synchronization Architecture and Solution Specification* v01.00, O-RAN ALLIANCE WG9 (March 2021); *O-RAN Operations and Maintenance Interface Specification* v05.00, O-RAN ALLIANCE WG10 (July 2021); *O-RAN Operations and Maintenance Architecture* v05.00, O-RAN ALLIANCE WG10 (July 2021); *O-RAN: Towards an Open and Smart RAN*, O-RAN ALLIANCE, White Paper (October 2018), ("[ORANWP]"), and U.S. application Ser. No. 17/484,743 filed on 24 Sep. 2021 (collectively referred to as "[O-RAN]"); the contents of each of which are hereby incorporated by reference in their entireties.

In another example implementation, the ECT 1040 is and/or operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.2.0 (2021-12-31), 3GPP TS 23.501 v17.4.0 (2022-03-23) ("[TS23501]"), 3GPP TS 23.502 v17.4.0 (2022-03-23) ("[TS23502]"), 3GPP TS 23.503 v17.4.0 (2022-03-23) ("[TS23503]"), 3GPP TS 28.538 v0.4.0 (2021-12-08), and U.S. application Ser. No. 17/484,719 filed on 24 Sep. 2021 (collectively referred to as "[SA6Edge]"), the contents of each of which are hereby incorporated by reference in their entireties.

In another example implementation, the ECT 1040 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/ ("[ISEO]"), the contents of which is hereby incorporated by reference in its entirety.

In another example implementation, the edge system 1040 operates according to the Multi-Access Management Services (MAMS) framework as discussed in Kanugovi et al., *Multi-Access Management Services (MAMS)*, INTERNET ENGINEERING TASK FORCE (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC (MP-QUIC)*, IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTOCOL-09, IETA, INTAREA (4 Mar. 2020), and Zhu et al., *Generic Multi-Access (GMA) Convergence Encapsulation Protocols*, IETF DRAFT-ZHU-INTAREA-GMA-14, IETA, INTAREA/Network Working Group (24 Nov. 2021) (collectively referred to as "[MAMS]"), the contents of each of which are hereby incorporated by reference in their entireties. In these implementations, an edge compute node UEs 1040 and/or one or more cloud computing nodes/clusters may be one or more MAMS servers that includes or operates a Network Connection Manager (NCM) for downstream/DL traffic, and the individual UEs 1010, 1017 include or operate a Client Connection Manager (CCM) for upstream/UL traffic. An NCM is a functional entity that handles MAMS control messages from clients (e.g., individual UEs 1010, 1017 configures the distribution of data packets over available access paths and (core) network paths, and manages user-plane treatment (e.g., tunneling, encryption, and/or the like) of the traffic flows (see e.g., [MAMS]). The CCM is the peer functional element in a client (e.g., individual UEs 1010, 1017 that handles MAMS control-plane procedures, exchanges MAMS signaling messages with the NCM, and configures the network paths at the client for the transport of user data (e.g., network packets, and/or the like) (see e.g., [MAMS]).

Figure 11:
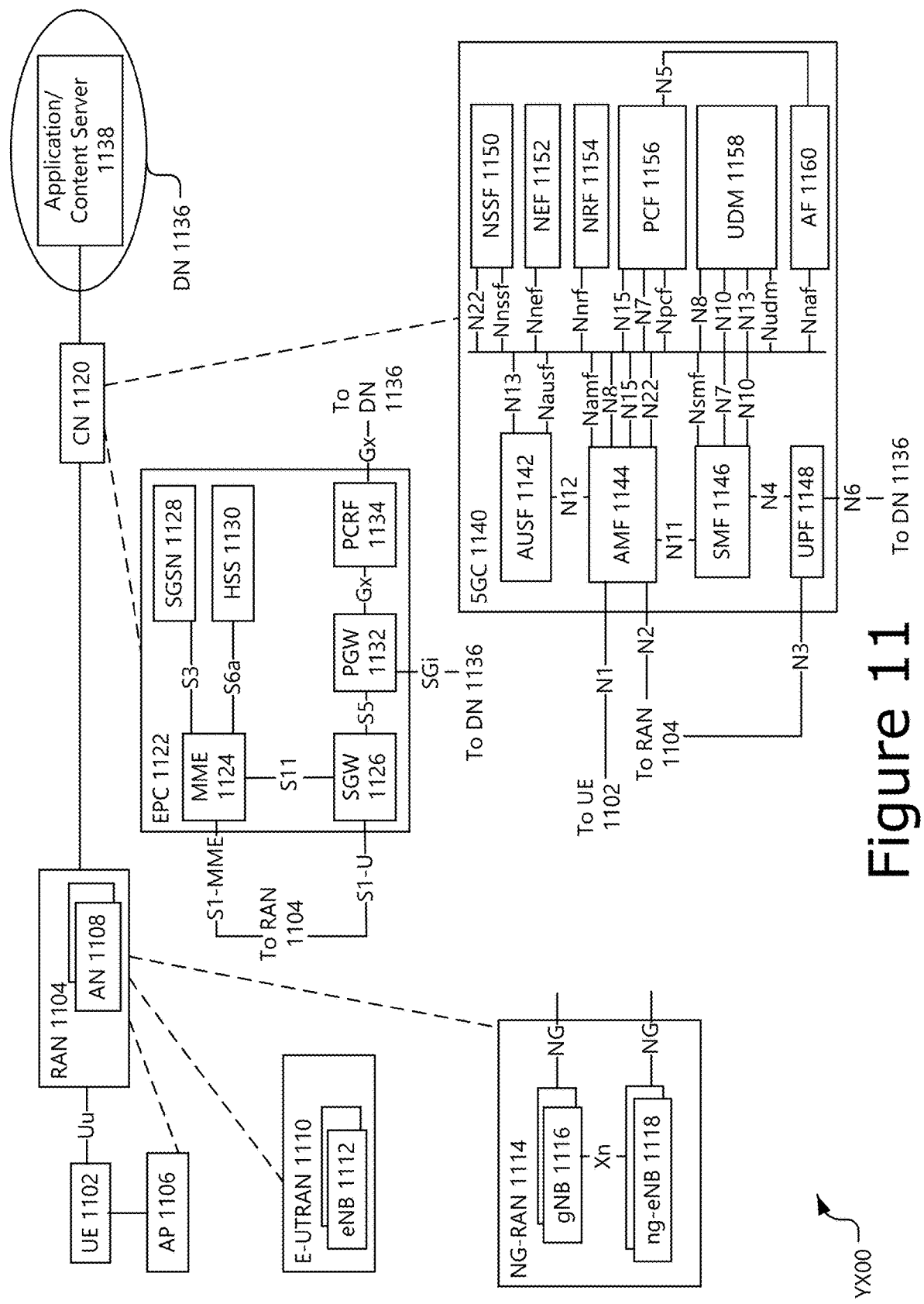
FIG. 11 illustrates an example network architecture.

FIG. 11 illustrates an example network architecture 1100. The network 1100 operates in a manner consistent with 3GPP technical specifications for LTE or 5G/NR systems. However, the present disclosure is not limited in this regard and the described examples may apply to other networks that benefit from the principles described herein, such as future 3GPP systems, or the like.

The network 1100 includes a UE 1102, which is any mobile or non-mobile computing device designed to communicate with a RAN 1104 via an over-the-air connection. The UE 1102 is communicatively coupled with the RAN 1104 by a Uu interface, which may be applicable to both LTE and NR systems. Examples of the UE 1102 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 1100 may include a plurality of UEs 1102 coupled directly with one another via a D2D, ProSe, PC5, and/or sidelink (SL) interface. These UEs 1102 may be M2M/D2D/MTC/IoT devices and/or vehicular systems that communicate using physical sidelink channels such as, but not limited to, PSBCH, PSDCH, PSSCH, PSCCH, PSFCH, and the like.

The UE 1102 may additionally communicate with an AP 1106 via an over-the-air (OTA) connection. The AP 1106 manages a WLAN connection, which may serve to offload some/all network traffic from the RAN 1104. The connection between the UE 1102 and the AP 1106 may be consistent with any IEEE 802.11 protocol. Additionally, the UE 1102, RAN 1104, and AP 1106 may utilize cellular-WLAN aggregation/integration (e.g., LWA/LWIP). Cellular-WLAN aggregation may involve the UE 1102 being configured by the RAN 1104 to utilize both cellular radio resources and WLAN resources.

The RAN 1104 includes one or more access network nodes (ANs) 1108. The ANs 1108 terminate air-interface(s) for the UE 1102 by providing access stratum protocols including RRC, PDCP, RLC, MAC, and PHY/L1 protocols. In this manner, the AN 1108 enables data/voice connectivity between CN 1120 and the UE 1102. The ANs 1108 may be a macrocell base station or a low power base station for providing femtocells, picocells or other like cells having smaller coverage areas, smaller user capacity, or higher bandwidth compared to macrocells; or some combination thereof. In these implementations, an AN 1108 be referred to as a base station, gNB, eNB, ng-eNB, en-gNB, NodeB, RAN node, RSU, TRxP, and the like.

One example implementation is a "CU/DU split" architecture where the ANs 1108 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v16.8.0 (2021-12-23) ("[TS38401]")). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 1108 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Additional aspects of the NG-RAN architecture, CUs, DUs, and the like are discussed in [O-RAN], [TS38401], 3GPP TS 38.410 v17.0.0 (2022-04-06) ("[TS38410]"), 3GPP TS 38.300 v17.0.0 (2022-04-13) ("[TS38300]"), 3GPP TR 38.801 v14.0.0 (2017-04-03), and U.S. application Ser. No. 17/704,658 filed on Mar. 25, 2022, the contents of each of which are hereby incorporated by reference in their entireties. Any other type of architectures, arrangements, and/or configurations can be used.

The ANs 1108 of the RAN 1104 may each manage one or more cells, cell groups, component carriers, and the like to provide the UE 1102 with an air interface for network access. The UE 1102 may be simultaneously connected with a plurality of cells provided by the same or different ANs 1108 of the RAN 1104. For example, the UE 1102 and RAN 1104 may use carrier aggregation to allow the UE 1102 to connect with a plurality of component carriers, each corresponding to a PCell or SCell. In dual connectivity scenarios, a first AN 1108 may be a master node that provides an MCG and a second AN 1108 may be secondary node that provides an SCG. The first/second ANs 1108 may be any combination of eNB, gNB, ng-eNB, and the like. Additionally or alternatively, the RAN 1104 may provide the air interface over a licensed spectrum or an unlicensed spectrum. To operate in the unlicensed spectrum, the nodes may use LAA, eLAA, and/or feLAA mechanisms based on CA technology with PCells/SCells. Prior to accessing the unlicensed spectrum, the nodes may perform medium/carrier-sensing operations based on, for example, a listen-before-talk (LBT) protocol.

The ANs 1108 may be coupled with one another via an X2 interface (if the RAN 1104 is an Evolved Universal Terrestrial Radio Access Network (E-UTRAN) 1110) or an Xn interface (if the RAN 1104 is a NG-RAN 1114). The X2/Xn interfaces, which may be separated into control/user plane interfaces, may allow the ANs to communicate information related to handovers, data/context transfers, mobility, load management, interference coordination, and the like.

The RAN 1104 may be an E-UTRAN 1110 with one or more eNBs 1112. The an E-UTRAN 1110 provides an LTE air interface (Uu) with the following characteristics: SCS of 15 kHz; CP-OFDM waveform for DL and SC-FDMA waveform for UL; turbo codes for data and TBCC for control; and the like. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

The RAN 1104 may be an next generation (NG)-RAN 1114 with one or more gNB 1116 and/or on or more ng-eNB 1118. The gNB 1116 connects with 5G-enabled UEs 1102 using a 5G NR interface. The gNB 1116 connects with a 5GC 1140 through an NG interface, which includes an N2 interface or an N3 interface. The ng-eNB 1118 also connects with the 5GC 1140 through an NG interface, but may connect with a UE 1102 via the Uu interface. The gNB 1116 and the ng-eNB 1118 may connect with each other over an Xn interface.

The NG interface may be split into two parts, an NG user plane (NG-U) interface, which carries traffic data between the nodes of the NG-RAN 1114 and a UPF 1148 (e.g., N3 interface), and an NG control plane (NG-C) interface, which is a signaling interface between the nodes of the NG-RAN 1114 and an AMF 1144 (e.g., N2 interface).

The NG-RAN 1114 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 1102 can be configured with multiple BWPs where each BWP configuration has a different SCS. When a BWP change is indicated to the UE 1102, the SCS of the transmission is changed as well. Another use case example of BWP is related to power saving. In particular, multiple BWPs can be configured for the UE 1102 with different amount of frequency resources (e.g., PRBs) to support data transmission under different traffic loading scenarios. A BWP containing a smaller number of PRBs can be used for data transmission with small traffic load while allowing power saving at the UE 1102 and in some cases at the gNB 1116. A BWP containing a larger number of PRBs can be used for scenarios with higher traffic load.

The RAN 1104 is communicatively coupled to CN 1120 that includes network elements and/or NFs to provide various functions to support data and telecommunications services to customers/subscribers (e.g., UE 1102). The components of the CN 1120 may be implemented in one physical node or separate physical nodes. NFV may be utilized to virtualize any or all of the functions provided by the network elements of the CN 1120 onto physical compute/storage resources in servers, switches, and the like. A logical instantiation of the CN 1120 may be referred to as a network slice, and a logical instantiation of a portion of the CN 1120 may be referred to as a network sub-slice.

The CN 1120 may be an LTE CN 1122 (also referred to as an Evolved Packet Core (EPC) 1122). The EPC 1122 may include MME 1124, SGW 1126, SGSN 1128, HSS 1130, PGW 1132, and PCRF 1134 coupled with one another over interfaces (or "reference points") as shown. The NFs in the EPC 1122 are briefly introduced as follows.

The MME 1124 implements mobility management functions to track a current location of the UE 1102 to facilitate paging, bearer activation/deactivation, handovers, gateway selection, authentication, and the like.

The SGW 1126 terminates an S1 interface toward the RAN 1110 and routes data packets between the RAN 1110 and the EPC 1122. The SGW 1126 may be a local mobility anchor point for inter-RAN node handovers and also may provide an anchor for inter-3GPP mobility. Other responsibilities may include lawful intercept, charging, and some policy enforcement.

The SGSN 1128 tracks a location of the UE 1102 and performs security functions and access control. The SGSN 1128 also performs inter-EPC node signaling for mobility between different RAT networks; PDN and S-GW selection as specified by MME 1124; MME 1124 selection for handovers; and the like. The S3 reference point between the MME 1124 and the SGSN 1128 enable user and bearer information exchange for inter-3GPP access network mobility in idle/active states.

The HSS 1130 includes a database for network users, including subscription-related information to support the network entities' handling of communication sessions. The HSS 1130 can provide support for routing/roaming, authentication, authorization, naming/addressing resolution, location dependencies, and the like. An S6a reference point between the HSS 1130 and the MME 1124 may enable transfer of subscription and authentication data for authenticating/authorizing user access to the EPC 1120.

The PGW 1132 may terminate an SGi interface toward a data network (DN) 1136 that may include an application (app)/content server 1138. The PGW 1132 routes data packets between the EPC 1122 and the data network 1136. The PGW 1132 is communicatively coupled with the SGW 1126 by an S5 reference point to facilitate user plane tunneling and tunnel management. The PGW 1132 may further include a node for policy enforcement and charging data collection (e.g., PCEF). Additionally, the SGi reference point may communicatively couple the PGW 1132 with the same or different data network 1136. The PGW 1132 may be communicatively coupled with a PCRF 1134 via a Gx reference point.

The PCRF 1134 is the policy and charging control element of the EPC 1122. The PCRF 1134 is communicatively coupled to the app/content server 1138 to determine appropriate QoS and charging parameters for service flows. The PCRF 1132 also provisions associated rules into a PCEF (via Gx reference point) with appropriate TFT and QCI.

The CN 1120 may be a 5GC 1140 including an AUSF 1142, AMF 1144, SMF 1146, UPF 1148, NSSF 1150, NEF 1152, NRF 1154, PCF 1156, UDM 1158, and AF 1160 coupled with one another over various interfaces as shown. The NFs in the 5GC 1140 are briefly introduced as follows.

The AUSF 1142 stores data for authentication of UE 1102 and handle authentication-related functionality. The AUSF 1142 may facilitate a common authentication framework for various access types.

The AMF 1144 allows other functions of the 5GC 1140 to communicate with the UE 1102 and the RAN 1104 and to subscribe to notifications about mobility events with respect to the UE 1102. The AMF 1144 is also responsible for registration management (e.g., for registering UE 1102), connection management, reachability management, mobility management, lawful interception of AMF-related events, and access authentication and authorization. The AMF 1144 provides transport for SM messages between the UE 1102 and the SMF 1146, and acts as a transparent proxy for routing SM messages. AMF 1144 also provides transport for SMS messages between UE 1102 and an SMSF. AMF 1144 interacts with the AUSF 1142 and the UE 1102 to perform various security anchor and context management functions. Furthermore, AMF 1144 is a termination point of a RAN-CP interface, which includes the N2 reference point between the RAN 1104 and the AMF 1144. The AMF 1144 is also a termination point of NAS (N1) signaling, and performs NAS ciphering and integrity protection.

AMF 1144 also supports NAS signaling with the UE 1102 over an N3IWF interface. The N3IWF provides access to untrusted entities. N3IWF may be a termination point for the N2 interface between the (R)AN 1104 and the AMF 1144 for the control plane, and may be a termination point for the N3 reference point between the (R)AN 1114 and the 1148 for the user plane. As such, the AMF 1144 handles N2 signaling from the SMF 1146 and the AMF 1144 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF may also relay UL and DL control-plane NAS signaling between the UE 1102 and AMF 1144 via an N1 reference point between the UE 1102 and the AMF 1144, and relay uplink and downlink user-plane packets between the UE 1102 and UPF 1148. The N3IWF also provides mechanisms for IPsec tunnel establishment with the UE 1102. The AMF 1144 may exhibit an Namf service-based interface, and may be a termination point for an N14 reference point between two AMFs 1144 and an N17 reference point between the AMF 1144 and a 5G-EIR (not shown by FIG. 11).

The SMF 1146 is responsible for SM (e.g., session establishment, tunnel management between UPF 1148 and AN 1108); UE IP address allocation and management (including optional authorization); selection and control of UP function; configuring traffic steering at UPF 1148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1144 over N2 to AN 1108; and determining SSC mode of a session. SM refers to management of a PDU session, and a PDU session or "session" refers to a PDU connectivity service that provides or enables the exchange of PDUs between the UE 1102 and the DN 1136.

The UPF 1148 acts as an anchor point for intra-RAT and inter-RAT mobility, an external PDU session point of interconnect to data network 1136, and a branching point to support multi-homed PDU session. The UPF 1148 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 1148 may include an uplink classifier to support routing traffic flows to a data network.

The NSSF 1150 selects a set of network slice instances serving the UE 1102. The NSSF 1150 also determines allowed NSSAI and the mapping to the subscribed S-NS-SAIs, if needed. The NSSF 1150 also determines an AMF set to be used to serve the UE 1102, or a list of candidate AMFs 1144 based on a suitable configuration and possibly by querying the NRF 1154. The selection of a set of network slice instances for the UE 1102 may be triggered by the AMF 1144 with which the UE 1102 is registered by interacting with the NSSF 1150; this may lead to a change of AMF 1144. The NSSF 1150 interacts with the AMF 1144 via an N22 reference point; and may communicate with another NSSF in a visited network via an N31 reference point (not shown).

The NEF 1152 securely exposes services and capabilities provided by 3GPP NFs for third party, internal exposure/re-exposure, AFs 1160, edge computing or fog computing systems (e.g., edge compute node, and the like. The NEF 1152 authenticates, authorizes, and/or throttles the AFs. NEF 1152 may also translate information exchanged with the AF 1160 and information exchanged with internal network functions. For example, the NEF 1152 may translate between an AF-Service-Identifier and an internal 5GC information. NEF 1152 may also receive information from other NFs based on exposed capabilities of other NFs. This information may be stored at the NEF 1152 as structured data, or at a data storage NF using standardized interfaces. The stored information can then be re-exposed by the NEF 1152 to other NFs and AFs, or used for other purposes such as analytics.

The NRF 1154 supports service discovery functions, receives NF discovery requests from NF instances, and provides information of the discovered NF instances to the requesting NF instances. NRF 1154 also maintains information of available NF instances and their supported services. The NRF 1154 also supports service discovery functions, wherein the NRF 1154 receives NF Discovery Request from NF instance or an SCP (not shown), and provides information of the discovered NF instances to the NF instance or SCP.

The PCF 1156 provides policy rules to control plane functions to enforce them, and may also support unified policy framework to govern network behavior. The PCF 1156 may also implement a front end to access subscription information relevant for policy decisions in a UDR of the UDM 1158. In addition to communicating with functions over reference points as shown, the PCF 1156 exhibit an Npcf service-based interface.

The UDM 1158 handles subscription-related information to support the network entities' handling of communication sessions, and stores subscription data of UE 1102. For example, subscription data may be communicated via an N8 reference point between the UDM 1158 and the AMF 1144. The UDM 1158 may include two parts, an app front end and a UDR. The UDR may store subscription data and policy data for the UDM 1158 and the PCF 1156, and/or structured data for exposure and app data (including PFDs for app detection, app request information for multiple UEs 1102) for the NEF 1152. The Nudr service-based interface may be exhibited by the UDR 221 to allow the UDM 1158, PCF 1156, and NEF 1152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1158 may exhibit the Nudm service-based interface.

AF 1160 provides app influence on traffic routing, provide access to NEF 1152, and interact with the policy framework for policy control. The AF 1160 may influence UPF 1148 (re)selection and traffic routing. Based on operator deployment, when AF 1160 is considered to be a trusted entity, the network operator may permit AF 1160 to interact directly with relevant NFs. Additionally, the AF 1160 may be used for edge computing implementations, The 5GC 1140 may enable edge computing by selecting operator/3rd party services to be geographically close to a point that the UE 1102 is attached to the network. This may reduce latency and load on the network. In edge computing implementations, the 5GC 1140 may select a UPF 1148 close to the UE 1102 and execute traffic steering from the UPF 1148 to DN 1136 via the N6 interface. This may be based on the UE subscription data, UE location, and information provided by the AF 1160, which allows the AF 1160 to influence UPF (re)selection and traffic routing.

The data network (DN) 1136 may represent various network operator services, Internet access, or third party services that may be provided by one or more servers including, for example, app/content server 1138. The app server 1138 may represent the physical hardware systems/devices providing app server functionality and/or the app software resident in the cloud or at an edge compute node that performs server function(s). The DN 1136 may be an operator external public, a private PDN, 5G private network, ITS network/system (see e.g., FIG. 10), or an intra-operator packet data network, for example, for provision of IMS services. The app server 1138 can be coupled to an IMS via an S-CSCF or the I-CSCF. In some implementations, the DN 1136 may represent one or more local area DNs (LADNs), which are DNs 1136 (or DN names (DNNs)) that is/are accessible by a UE 1102 in one or more specific areas. Outside of these specific areas, the UE 1102 is not able to access the LADN/DN 1136.

Additionally or alternatively, the DN 1136 may be an edge DN 1136, which is a (local) DN that supports the architecture for enabling edge apps (see e.g., [SA6Edge]). Here, the server(s) 1138 (e.g., implemented as one or more edge compute nodes) provide an edge hosting environment that provides support required for an edge application server's execution (see e.g., [SA6Edge]). Additionally or alternatively, the server(s) 1138 (e.g., implemented as one or more edge compute nodes) can use one or more NFV instances instantiated on virtualization infrastructure within the edge compute nodes to process wireless connections to and from the RAN 1114 and UPF 1148.

The interfaces of the 5GC 1140 include reference points and service-based interfaces. The reference points include: N1 (between the UE 1102 and the AMF 1144), N2 (between RAN 1114 and AMF 1144), N3 (between RAN 1114 and UPF 1148), N4 (between the SMF 1146 and UPF 1148), N5 (between PCF 1156 and AF 1160), N6 (between UPF 1148 and DN 1136), N7 (between SMF 1146 and PCF 1156), N8 (between UDM 1158 and AMF 1144), N9 (between two UPFs 1148), N10 (between the UDM 1158 and the SMF 1146), N11 (between the AMF 1144 and the SMF 1146), N12 (between AUSF 1142 and AMF 1144), N13 (between AUSF 1142 and UDM 1158), N14 (between two AMFs 1144; not shown), N15 (between PCF 1156 and AMF 1144 in case of a non-roaming scenario, or between the PCF 1156 in a visited network and AMF 1144 in case of a roaming scenario), N16 (between two SMFs 1146; not shown), and N22 (between AMF 1144 and NSSF 1150). Other reference point representations not shown in FIG. 11 can also be used. The service-based representation of FIG. 11 represents NFs within the control plane that enable other authorized NFs to access their services. The service-based interfaces (SBIs) include: Namf (SBI exhibited by AMF 1144), Nsmf (SBI exhibited by SMF 1146), Nnef (SBI exhibited by NEF 1152), Npcf (SBI exhibited by PCF 1156), Nudm (SBI exhibited by the UDM 1158), Naf (SBI exhibited by AF 1160), Nnrf (SBI exhibited by NRF 1154), Nnssf (SBI exhibited by NSSF 1150), Nausf (SBI exhibited by AUSF 1142). Other service-based interfaces (e.g., Nudr, N5g-eir, and Nudsf) not shown in FIG. 11 can also be used. The NEF 1152 can provide an interface to edge compute nodes 1136x, which can be used to process wireless connections with the RAN 1114.

In some implementations, the system 1100 may include an SMSF, which is responsible for SMS subscription checking and verification, and relaying SM messages to/from the UE 1102 to/from other entities, such as an SMS-GMSC/IWMSC/SMS-router. The SMS may also interact with AMF 1142 and UDM 1158 for a notification procedure that the UE 1102 is available for SMS transfer (e.g., set a UE not reachable flag, and notifying UDM 1158 when UE 1102 is available for SMS).

The 5GS may also include an SCP (or individual instances of the SCP) that supports indirect communication (see e.g., [TS23501]); delegated discovery (see e.g., [TS23501]); message forwarding and routing to destination NF/NF service(s), communication security (e.g., authorization of the NF Service Consumer to access the NF Service Producer API) (see e.g., 3GPP TS 33.501 v17.5.0 (2022-03-24)), load balancing, monitoring, overload control, and the like; and discovery and selection functionality for UDM(s), AUSF(s), UDR(s), PCF(s) with access to subscription data stored in the UDR based on UE's SUPI, SUCI or GPSI (see e.g., [TS23501]). Load balancing, monitoring, overload control functionality provided by the SCP may be implementation specific. The SCP may be deployed in a distributed manner. More than one SCP can be present in the communication path between various NF Services. The SCP, although not an NF instance, can also be deployed distributed, redundant, and scalable.

3. Station Configurations and Arrangements

FIG. 12 shows an ITS-S reference architecture 1200. Some or all of the components depicted by FIG. 12 follows the ITSC protocol, which is based on the principles of the OSI model for layered communication protocols extended for ITS apps. The ITSC 1200 includes an access layer 1204 that corresponds with the OSI layers 1 and 2, a networking & transport (N&T) layer 1203 that corresponds with OSI layers 3 and 4, the facilities layer which corresponds with OSI layers 5, 6, and at least some functionality of OSI layer 7, and an apps layer 1201 that corresponds with some or all of OSI layer 7. Each of these layers are interconnected via respective observable interfaces, service access points (SAPs), APIs, and/or other like connectors or interfaces (see e.g., ETSI EN 302 665 v1.1.1 (2010-09)). The interconnections in this example include the MF-SAP, FA-SAP, NF-SAP, and SF-SAP.

The apps layer 1201 provides ITS services, and ITS apps are defined within the app layer 1201. An ITS app is an app layer entity that implements logic for fulfilling one or more ITS use cases. An ITS app makes use of the underlying facilities and communication capacities provided by the ITS-S. Each app can be assigned to one of the three identified app classes: road safety, traffic efficiency, and other apps (see e.g., [EN302663] and ETSI TR 102 638

V1.1.1 (2009-06) ("[TR102638]")). Examples of ITS apps may include driving assistance apps (e.g., for cooperative awareness and road hazard warnings) including Automatic Emergency Braking (AEB), Forward Collision Warning (FCW), cooperative adaptive cruise control (CACC), control loss warning (CLW), queue warning, Automated Parking System (APS), pre-crash sensing warning, speed management (e.g., curve speed warning and the like), mapping and/or navigation apps (e.g., turn-by-turn navigation and cooperative navigation), apps providing location based services, and apps providing networking services (e.g., global Internet services and ITS-S lifecycle management services). A V-ITS-S 1010 provides ITS apps to vehicle drivers and/or passengers, and may require an interface for accessing in-vehicle data from the in-vehicle network or in-vehicle system. For deployment and performances needs, specific instances of a V-ITS-S 1010 may contain groupings of apps and/or facilities.

The facilities layer 1202 comprises middleware, software connectors, software glue, or the like, comprising multiple facility layer functions (or simply a "facilities"). In particular, the facilities layer contains functionality from the OSI app layer, the OSI presentation layer (e.g., ASN.1 encoding and decoding, and encryption) and the OSI session layer (e.g., inter-host communication). A facility is a component that provides functions, information, and/or services to the apps in the app layer and exchanges data with lower layers for communicating that data with other ITS-Ss. C-ITS facility services can be used by ITS Apps. Examples of these facility services include: Cooperative Awareness (CA) provided by cooperative awareness basic service (CABS) facility (see e.g., ETSI EN 302 637-2 v1.4.1 (2019-04) ("[EN302637-2]")) to create and maintain awareness of ITS-Ss and to support cooperative performance of vehicles using the road network; Decentralized Environmental Notification (DEN) provided by the DEN basic service (DENBS) facility to alert road users of a detected event using ITS communication technologies; Cooperative Perception (CP) provided by a CP services (CPS) facility (see e.g., ETSI TS 103 324 v.0.0.22 (2021-05) ("[TS103324]")) complementing the CA service to specify how an ITS-S can inform other ITS-Ss about the position, dynamics and attributes of detected neighboring road users and other objects; Multimedia Content Dissemination (MCD) to control the dissemination of information using ITS communication technologies; VRU awareness provided by a VRU basic service (VBS) facility to create and maintain awareness of vulnerable road users participating in the VRU system; Interference Management Zone to support the dynamic band sharing in co-channel and adjacent channel scenarios between ITS stations and other services and apps; Diagnosis, Logging and Status for maintenance and information purposes; Positioning and Time management (PoTi) provided by a PoTi facility that provides time and position information to ITS apps and services; Decentralized Congestion Control (DCC) contributing to the overall ITS-S congestion control functionalities using various methods at the facilities and apps layer for reducing at the number of generated messages based on the congestion level; Device Data Provider (DDP) for a V-ITS-S 1010 connected with the in-vehicle network and provides the vehicle state information; Local Dynamic Map (LDM), which is a local georeferenced database (see e.g., ETSI EN 302 895 v1.1.1 (2014-09), and ETSI TR 102 863 v1.1.1 (2011-06)); Signal Phase and Timing Service (SPATS); and Maneuver Coordination Services (MCS). A list of the common facilities is given by ETSI TS 102 894-1 v1.1.1 (2013-08) ("[TS102894-1]"), which is hereby incorporated by reference in its entirety.

The facility layer messages (e.g., CPMs, DENMs, VAMs, and the like) are included in ITS packets, which are facilities layer PDUs that are passed to the access layer 1204 via the N&T layer 1203 or passed to the app layer 1201 for consumption by one or more ITS apps. In this way, the DENM format is agnostic to the underlying access layer 1204 and is designed to allow DENMs to be shared regardless of the underlying access technology/RAT.

Additionally or alternatively, existing infrastructure services, such as those described herein, can be used in the context of the CPS 1221. For example, the broadcast of the SPAT and SPAT relevance delimited area (MAP) is already standardized and used by vehicles at intersection level. In principle they protect VRUs 1016, 1017 crossing. However, signal violation warnings may exist and can be detected and signaled using DENM. This signal violation indication using DENMs is very relevant to VRU devices 1017 as indicating an increase of the collision risk with the vehicle which violates the signal. If it uses local captors or detects and analyses VAMs, the traffic light controller may delay the red phase change to green and allow the VRU 1016, 1017 to safely terminate its road crossing. The contextual speed limit using In-Vehicle Information (IVI) can be adapted when a large cluster of VRUs 1016, 1017 is detected (e.g., limiting the vehicles' speed to 30 km/hour). At such reduced speed a vehicle 1010 may act efficiently when perceiving the VRUs by means of its own local perception system.

Referring back to FIG. 12, the N&T layer 1203 provides functionality of the OSI network layer and the OSI transport layer and includes one or more networking protocols, one or more transport protocols, and network and transport layer management. Each of the networking protocols may be connected to a corresponding transport protocol. Additionally, sensor interfaces and communication interfaces may be part of the N&T layer 1203 and access layer 1204. Examples of the networking protocols include IPv4, IPv6, IPv6 networking with mobility support, IPv6 over GeoNetworking, the CALM FAST protocol, and/or some other suitable network protocol such as those discussed herein. Examples of the transport protocols include BOSH, BTP, GRE, GeoNetworking protocol, MPTCP, MPUDP, QUIC, RSVP, SCTP, TCP, UDP, VPN, one or more dedicated ITSC transport protocols, and/or some other suitable transport protocol such as those discussed herein.

The access layer includes a physical layer (PHY) 1204 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 1204 and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other implementations.

The management entity 1205 is in charge of managing communications in the ITS-S including, for example, cross-interface management, Inter-unit management communications (IUMC), networking management, communications service management, ITS app management, station management, management of general congestion control, management of service advertisement, management of legacy system protection, managing access to a common Management Information Base (MIB), and so forth. The security entity 1206 provides security services to the OSI communication protocol stack, to the security entity and to the management entity 1205. The security entity 1206 contains security functionality related to the ITSC communication protocol stack, the ITS station and ITS applications such as, for example, firewall and intrusion management; authentication, authorization and profile management; identity, crypto key and certificate management; a common security information base (SIB); hardware security modules (HSM); and so forth. The security entity 1206 can also be considered as a specific part of the management entity 1205.

Other entities that are not included in the ITS-S include the relevant users at that level, the relevant HMI (e.g., audio devices, display/touchscreen devices, and/or the like); when the ITS-S is a vehicle 1010, vehicle motion control for computer-assisted and/or automated vehicles 1010 (both HMI and vehicle motion control entities may be triggered by the ITS-S apps); a local device sensor system and IoT Platform that collects and shares IoT data; local device sensor fusion and actuator app(s), which may contain ML/AI and aggregates the data flow issued by the sensor system; local perception and trajectory prediction apps that consume the output of the fusion app and feed the ITS-S apps; and the relevant ITS-S. The sensor system can include one or more cameras, radars, LIDARs, and/or the like, in a V-ITS-S 1010 or R-ITS-S 1030. In a central station, the sensor system includes sensors that may be located on the side of the road, but directly report their data to the central station, without the involvement of a V-ITS-S 1010 or R-ITS-S 1030. The central station (or "ITS central system") is an ITS system in the backend such as, for example, traffic control center, traffic management center, or cloud system from road authorities, ITS application suppliers or automotive OEMs. In some cases, the sensor system may additionally include gyroscope(s), accelerometer(s), and the like (see e.g., sensor circuitry 1372 of FIG. 13).

Figure 13:
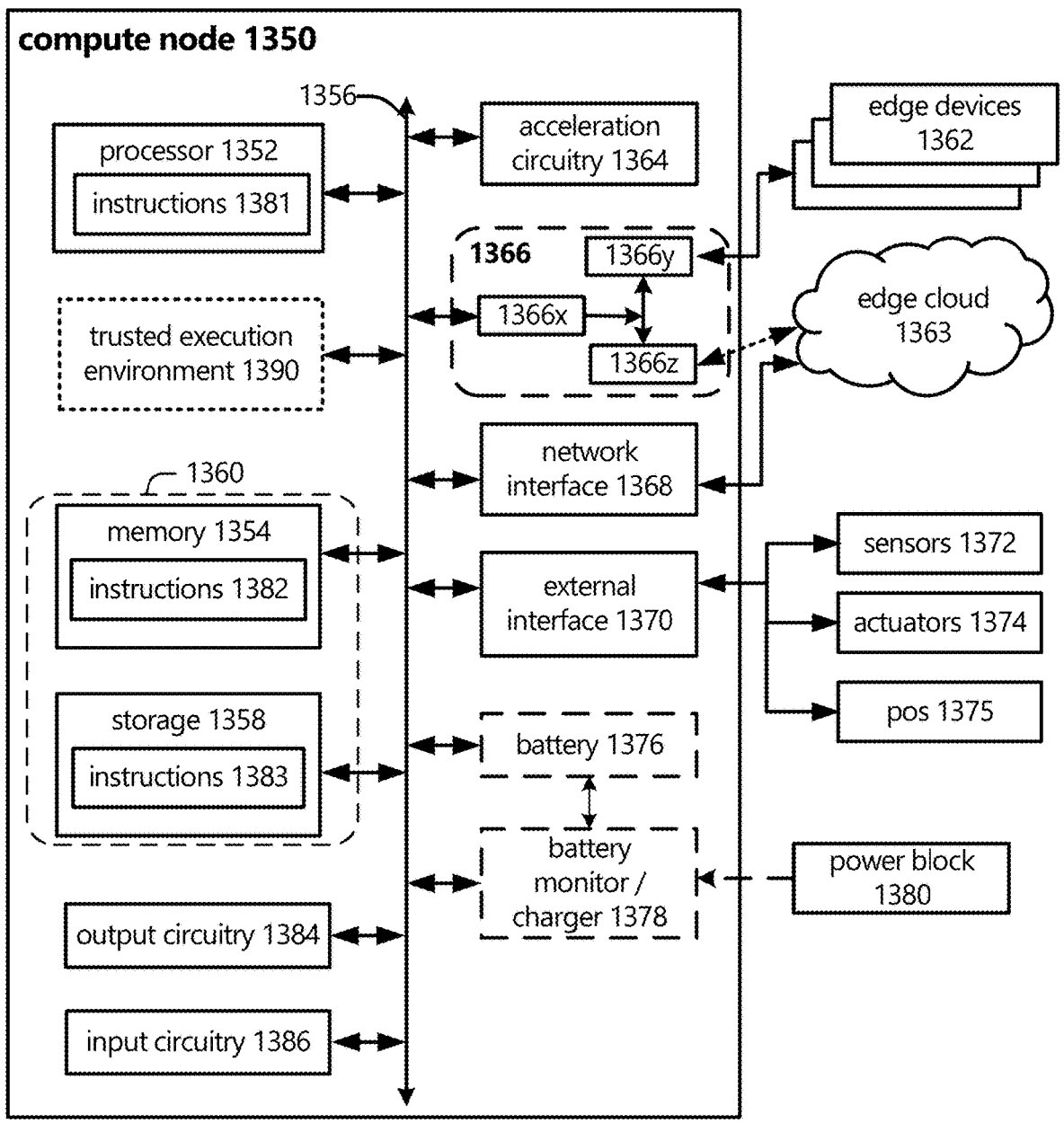
FIG. 13 depicts example components of a compute node, which may be used in edge computing system(s).

FIG. 13 illustrates an example of components that may be present in an compute node 1350 for implementing the techniques (e.g., operations, processes, methods, and methodologies) described herein. This compute node 1350 provides a closer view of the respective components of node 1350 when implemented as or as part of a computing device (e.g., as a mobile device, a base station, server, gateway, and the like). The compute node 1350 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 1350, or as components otherwise incorporated within a chassis of a larger system. The components of compute node 1350 and/or any of the devices and/or systems discussed herein may be servers, appliances, network infrastructure, machines, robots, drones, and/or any other type of computing devices. In various implementations, the compute node 1350 corresponds to one or more of NANs 130, edge controllers 144, orchestrators 145, ECP(s) 146, one or more compute nodes in PDN 136, and/or one or more network functions (NFs) in CN 142 in FIGS. 1-9; UEs 310, GWs 350, and/or one or more compute nodes in cloud 360 in FIGS. 3-9; UE 610, NANs 630, and/or one or more NFs in CN 642 of FIGS. 6-9; V-ITS-Ss 1010, VRU ITS-S 1017, NAN 1030, edge compute node 1040, one or more NFs in network 1058, and/or on or more servers 1060 in FIG. 10; UE 1102, AN 1108, and/or one or more network functions (NFs) in CN 1120 of FIG. 11.

The compute node 1350 includes processing circuitry in the form of one or more processors 1352. The processor circuitry 1352 includes circuitry such as, for example, one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1352 may include one or more hardware accelerators (e.g., same or similar to acceleration circuitry 1364), which may be microprocessors, programmable processing devices (e.g., FPGA, ASIC, and the like), or the like. The one or more accelerators may include, for example, computer vision and/or deep learning accelerators. In some implementations, the processor circuitry 1352 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1352 may be, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multi-threaded processor, ultra-low voltage processor, embedded processor, a specialized x-processing unit (xPU) or a data processing unit (DPU) (e.g., Infrastructure Processing Unit (IPU), network processing unit (NPU), and the like), and/or any other known processing elements, or any suitable combination thereof. In various implementations, the processor circuitry 1352 includes a μarch that is capable of executing the μenclave implementations and techniques discussed herein. The processors (or cores) 1352 may be coupled with or may include memory/storage and may be configured to execute instructions stored in the memory/storage to enable various apps or OSs to run on the platform 1350. The processors (or cores) 1352 is configured to operate app software to provide a specific service to a user of the platform 1350. Additionally or alternatively, the processor(s) 1352 may be a special-purpose processor(s)/controller(s) configured (or configurable) to operate according to the elements, features, and implementations discussed herein. In some implementations, the processor(s) 1352 may be a part of a system on a chip (SoC), System-in-Package (SiP), a multi-chip package (MCP), and/or the like, in which the processor(s) 1352 and other components are formed into a single integrated circuit, or a single package.

The processor(s) 1352 may communicate with system memory 1354 over an interconnect (IX) 1356. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs. Additionally or alternatively, the memory circuitry 1354 is or includes block addressable memory device(s), such as those based on NAND or NOR technologies (e.g., Single-Level Cell ("SLC"), Multi-Level Cell ("MLC"), Quad-Level Cell ("QLC"), Tri-Level Cell ("TLC"), or some other NAND).

To provide for persistent storage of information such as data, apps, OSs and so forth, a storage 1358 may also couple to the processor 1352 via the IX 1356. In an example, the storage 1358 may be implemented via a solid-state disk drive (SSDD) and/or high-speed electrically erasable memory (commonly referred to as "flash memory"). Other devices that may be used for the storage 1358 include flash memory cards, such as SD cards, microSD cards, eXtreme Digital (XD) picture cards, and the like, and USB flash drives. Additionally or alternatively, the memory circuitry 1354 and/or storage circuitry 1358 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 1354 and/or storage circuitry 1358 can include resistor-based and/or transistor-less memory architectures. The memory circuitry 1354 and/or storage circuitry 1358 may also incorporate three-dimensional (3D) cross-point (XPOINT) memory devices (e.g., Intel® 3D XPoint™ memory), and/or other byte addressable write-in-place NVM. The memory circuitry 1354 and/or storage circuitry 1358 may refer to the die itself and/or to a packaged memory product. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

Computer program code for carrying out operations of the present disclosure (e.g., computational logic and/or instructions 1381, 1382, 1383) may be written in any combination of one or more programming languages, including object oriented programming languages, procedural programming languages, scripting languages, markup languages, and/or some other suitable programming languages including proprietary programming languages and/or development tools, or any other languages tools. The computer program code 1381, 1382, 1383 for carrying out operations of the present disclosure may also be written in any combination of the programming languages discussed herein. The program code may execute entirely on the system 1350, partly on the system 1350, as a stand-alone software package, partly on the system 1350 and partly on a remote computer or entirely on the remote computer or server. In the latter scenario, the remote computer may be connected to the system 1350 through any type of network, including a LAN or WAN, or the connection may be made to an external computer (e.g., through the Internet using an Internet Service Provider (ISP)).

In an example, the instructions 1381, 1382, 1383 on the processor circuitry 1352 (separately, or in combination with the instructions 1381, 1382, 1383) may configure execution or operation of a trusted execution environment (TEE) 1390. The TEE 1390 operates as a protected area accessible to the processor circuitry 1302 to enable secure access to data and secure execution of instructions. In some implementations, the TEE 1390 may be a physical hardware device that is separate from other components of the system 1350 such as a secure-embedded controller, a dedicated SoC, or a tamper-resistant chipset or microcontroller with embedded processing devices and memory devices. Additionally or alternatively, the TEE 1390 may be implemented as secure enclaves (or "enclaves"), which are isolated regions of code and/or data within the processor and/or memory/storage circuitry of the compute node 1350, where only code executed within a secure enclave may access data within the same secure enclave, and the secure enclave may only be accessible using the secure app (which may be implemented by an application processor or a tamper-resistant microcontroller). Additionally or alternatively, the memory circuitry 1354 and/or storage circuitry 1358 may be divided into isolated user-space instances such as virtualization/OS containers, partitions, virtual environments (VEs), and/or the like. Virtual machines could also be used in some implementations. Such virtual computing environments may include a hypervisor managing (e.g., spawning, deploying, destroying, and the like) one or more virtual machines, one or more virtualization/OS containers, and the like. Such virtual computing environments provide an execution environment in which one or more applications and/or other software, code or scripts may execute while being isolated from one or more other applications, software, code or scripts. In some implementations, the memory circuitry 1304 and/or storage circuitry 1308 may be divided into one or more trusted memory regions for storing apps or software modules of the TEE 1390.

The OS stored by the memory circuitry 1354 and/or storage circuitry 1358 is software to control the compute node 1350. The OS may include one or more drivers that operate to control particular devices that are embedded in the compute node 1350, attached to the compute node 1350, and/or otherwise communicatively coupled with the compute node 1350. Example OSs include consumer-based OS, real-time OS (RTOS), hypervisors, and/or the like. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 1350 may be the same or different than a second OS on a second compute node 1350. For instance, the first OS may be an RTOS having particular performance expectations of responsivity to dynamic input conditions, and the second OS can include GUI capabilities to facilitate end-user I/O and the like.

The storage 1358 may include instructions 1383 in the form of software, firmware, or hardware commands to implement the techniques described herein. Although such instructions 1383 are shown as code blocks included in the memory 1354 and the storage 1358, any of the code blocks may be replaced with hardwired circuits, for example, built into an app specific integrated circuit (ASIC), FPGA memory blocks, and/or the like. In an example, the instructions 1381, 1382, 1383 provided via the memory 1354, the storage 1358, or the processor 1352 may be embodied as a non-transitory, machine-readable medium 1360 including code to direct the processor 1352 to perform electronic operations in the compute node 1350. The processor 1352 may access the non-transitory, machine-readable medium 1360 (also referred to as "computer readable medium 1360" or "CRM 1360") over the IX 1356. For instance, the non-transitory, CRM 1360 may be embodied by devices described for the storage 1358 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, CRM 1360 may include instructions to direct the processor 1352 to perform a specific sequence or flow of actions, for example, as described with respect to the flowchart(s) and/or block diagram(s) of operations and functionality depicted herein.

The components of edge computing device 1350 may communicate over an interconnect (IX) 1356. The IX 1356 may include any number of technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced eXtensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 1356 may be a proprietary bus, for example, used in a SoC based system.

The IX 1356 couples the processor 1352 to communication circuitry 1366 for communications with other devices, such as a remote server (not shown) and/or the connected edge devices 1362. The communication circuitry 1366 is a hardware element, or collection of hardware elements, used to communicate over one or more networks (e.g., cloud 1363) and/or with other devices (e.g., edge devices 1362). Communication circuitry 1366 includes modem circuitry 1366x that may interface with processor circuitry 1352 for generation and processing of baseband signals and for controlling operations of the TRx 1366y and/or TRx 1366z. The modem circuitry 1366x may handle various radio control functions that enable communication with one or more (R)ANs via the transceivers (TRx) 1366y and 1366z according to one or more wireless communication protocols and/or RATs. The modem circuitry 1366x may include circuitry such as, but not limited to, one or more single-core or multi-core processors (e.g., one or more baseband processors) or control logic to process baseband signals received from a receive signal path of the TRxs 1366y, 1366z, and to generate baseband signals to be provided to the TRxs 1366y, 1366z via a transmit signal path. The modem circuitry 1366x may implement an RTOS to manage resources of the modem circuitry 1366x, schedule tasks, perform the various radio control functions, process the transmit/receive signal paths, and the like. In some implementations, the modem circuitry 1366x includes a μarch that is capable of executing the μenclave implementations and techniques discussed herein.

The TRx 1366y may use any number of frequencies and protocols, such as 2.4 Gigahertz (GHz) transmissions under [IEEE802154], using Bluetooth® low energy (BLE), ZigBee®, among others. Any number of radios, configured for a particular wireless communication protocol, may be used for the connections to the connected edge devices 1362. For example, a wireless local area network (WLAN) unit may be used to implement WiFi® communications in accordance with a [IEEE802] standard (e.g., [IEEE80211] and/or the like). In addition, wireless wide area communications (e.g., according to a cellular or other wireless wide area protocol) may occur via a wireless wide area network (WWAN) unit.

The TRx 1366y (or multiple transceivers 1366y) may communicate using multiple standards or radios for communications at a different range. For example, the compute node 1350 may communicate with relatively close devices (e.g., within about 10 meters) using a local Bluetooth/BLE TRx, or another low power radio, to save power. More distant connected edge devices 1362 (e.g., within about 50 meters) may be reached over ZigBee® or other intermediate power radios. Both communications techniques may take place over a single radio at different power levels or may take place over separate TRxs, for example, a local TRx using BLE and a separate mesh transceiver using ZigBee®.

A TRx 1366z (e.g., a radio transceiver) may be included to communicate with devices or services in the edge cloud 1363 via (W)LAN or WAN protocols. The TRx 1366z may be an LPWA transceiver that follows [IEEE802154], among others. The edge computing node 1363 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 1366z, as described herein. For example, the TRx 1366z may include a cellular transceiver that uses spread spectrum (SPA/SAS) communications for implementing high-speed communications. Further, any number of other protocols may be used, such as WiFi® networks for medium speed communications and provision of network communications. The TRx 1366z may include radios that are compatible with any number of 3GPP specifications, such as LTE and 5G/NR communication systems.

A network interface controller (NIC) 1368 may be included to provide a wired communication to nodes of the edge cloud 1363 or to other devices, such as the connected edge devices 1362 (e.g., operating in a mesh, fog, and/or the like). The wired communication may provide an Ethernet connection (ses e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, a SmartNIC, Intelligent Fabric Processor(s) (IFP(s)), among many others. An additional NIC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, broadcasting, and so forth) may be embodied by such communications circuitry.

The compute node 1350 may include or be coupled to acceleration circuitry 1364, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. Additionally or alternatively, the acceleration circuitry 1364 may include xPUs and/or DPUs, IPUs, NPUs, and/or the like. These tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 1364 may comprise logic blocks or logic fabric and other interconnected resources that may be programmed (configured) to perform various functions, such as the procedures, methods, functions, and the like, discussed herein. In such implementations, the acceleration circuitry 1364 may also include memory cells (e.g., EPROM, EEPROM, flash memory, static memory (e.g., SRAM, antifuses, and the like) used to store logic blocks, logic fabric, data, and the like in LUTs and the like. In some implementations, the modem circuitry 1366x includes a µarch that is capable of executing the µenclave implementations and techniques discussed herein.

The IX 1356 also couples the processor 1352 to a sensor hub or external interface 1370 that is used to connect additional devices or subsystems. The additional/external devices may include sensors 1372, actuators 1374, and positioning circuitry 1345. Access to various components (e.g., sensors 1372, actuators 1374, positioning circuitry 1345, and the like) may be implementation specific.

The sensor circuitry 1372 includes devices, modules, or subsystems whose purpose is to detect events or changes in its environment and send the information (sensor data) about the detected events to some other a device, module, subsystem, and the like. Examples of such sensors 1372 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1350); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; inductive loops; and/or the like. In some implementations, the sensor(s) 1372 are the same or similar as the sensors 1072 of FIG. 10.

The actuators 1374, allow platform 1350 to change its state, position, and/or orientation, or move or control a mechanism or system. The actuators 1374 comprise electrical and/or mechanical devices for moving or controlling a mechanism or system, and converts energy (e.g., electric current or moving air and/or liquid) into some kind of motion. The actuators 1374 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1374 may include one or more electromechanical devices such as pneumatic actuators, hydraulic actuators, electromechanical switches including electromechanical relays (EMRs), motors (e.g., DC motors, stepper motors, servomechanisms, and the like), power switches, valve actuators, wheels, thrusters, propellers, claws, clamps, hooks, audible sound generators, visual warning devices, and/or other like electromechanical components. The platform 1350 may be configured to operate one or more actuators 1374 based on one or more captured events and/or instructions or control signals received from a service provider and/or various client systems. In some implementations, the actuators 1374 are used to change the operational state (e.g., on/off, zoom or focus, and/or the like), position, and/or orientation of the sensors 1372.

In some implementations, such as when the compute node 1350 is part of a vehicle system (e.g., V-ITS-S 1010 of FIG. 10), the actuators 1374 correspond to the driving control units (DCUs) 1074 discussed previously with respect to FIG. 10. In some implementations, such as when the compute node 1350 is part of roadside equipment (e.g., R-ITS-S 1030 of FIG. 10), the actuators 1374 can be used to change the operational state of the roadside equipment or other roadside equipment, such as gates, traffic lights, digital signage or variable message signs (VMS), and/or the like. The actuators 1374 are configured to receive control signals from the R-ITS-S 1030 via a roadside network, and convert the signal energy (or some other energy) into an electrical and/or mechanical motion. The control signals may be relatively low energy electric voltage or current.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and the like), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the communication circuitry 1366 to communicate with the nodes and components of the positioning network. The positioning circuitry 1345 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular app or service, a positioning augmentation technology can be used to provide augmented positioning information and data to the app or service. Such a positioning augmentation technology may include, for example, satellite based positioning augmentation (e.g., EGNOS) and/or ground based positioning augmentation (e.g., DGPS). In some implementations, the positioning circuitry 1345 is, or includes an INS, which is a system or device that uses sensor circuitry 1372 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1350 without the need for external references.

In some optional examples, various input/output (I/O) devices may be present within or connected to, the compute node 1350, which are referred to as input circuitry 1386 and output circuitry 1384 in FIG. 13. The input circuitry 1386 and output circuitry 1384 include one or more user interfaces designed to enable user interaction with the platform 1350 and/or peripheral component interfaces designed to enable peripheral component interaction with the platform 1350. The input circuitry 1386 and/or output circuitry 1384 may be, or may be part of a Human Machine Interface (HMI). Input circuitry 1386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1384 may be included to show information or otherwise convey information, such as sensor readings, actuator position(s), or other like information. Data and/or graphics may be displayed on one or more user interface components of the output circuitry 1384. Output circuitry 1384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and the like), with the output of characters, graphics, multimedia objects, and the like being generated or produced from the operation of the platform 1350. The output circuitry 1384 may also include speakers or other audio emitting devices, printer(s), and/or the like. Additionally or alternatively, the sensor circuitry 1372 may be used as the input circuitry 1384 (e.g., an image capture device, motion capture device, or the like) and one or more actuators 1374 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the compute node 1350, although, in examples in which the compute node 1350 is mounted in a fixed location, it may have a power supply coupled to an electrical grid, or the battery may be used as a backup or for temporary capabilities. The battery 1376 may be a lithium ion battery, or a metal-air battery, such as a zinc-air battery, an aluminum-air battery, a lithium-air battery, and the like.

A battery monitor/charger 1378 may be included in the compute node 1350 to track the state of charge (SoCh) of the battery 1376, if included. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 1378 may communicate the information on the battery 1376 to the processor 1352 over the IX 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the compute node 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the compute node 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The compute node 1350 can be implemented as a self-contained electronic device including a housing, chassis, case, or shell. In some implementations, the housing may be dimensioned for portability such that it can be carried by a human and/or shipped (e.g., as a UE or VRU system 1017). In other implementations, the housing may be a smaller module suitable for installation in a vehicle 1010. In other implementations, the housing may be a server rack enclosure or a ruggedized shell for deployment at a cell cite or otherwise collocated with a NAN 1030. Example housings may include materials that form one or more exterior surfaces that partially or fully protect contents of the appliance, in which protection may include weather protection, hazardous environment protection (e.g., electromagnetic interference (EMI), and/or radio-frequency interference (RFI), electromagnetic radiation, vibration, relatively extreme temperatures, and the like), and/or enable submergibility. The housing may include power circuitry (e.g., battery 1376, charger 1378, and/or power block 1380) to provide power for stationary and/or portable implementations including, for example, AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications (e.g., communication circuitry 1366 and/or positioning circuitry 1375). Example housings and/or surfaces thereof may include or connect to mounting hardware to enable attachment to structures such as buildings, telecommunication structures (e.g., poles, antenna structures, and the like) and/or racks (e.g., server racks, blade mounts, and the like). One or more sensors 1372 (e.g., temperature sensors, vibration sensors, light sensors, acoustic sensors, capacitive sensors, proximity sensors, and the like) may be contained in, carried by, or otherwise embedded in the surface and/or mounted to the surface of the housing. The housing and/or surfaces thereof may support mechanical connectivity using one or more actuators 1374, such as propulsion hardware (e.g., wheels, propellers, and the like) and/or articulating hardware (e.g., robot arms, pivotable appendages, and the like). In some circumstances, the housing and/or surfaces thereof includes various types of input devices 1386 such as user interface hardware (e.g., buttons, switches, dials, sliders, and the like), and/or the housing and/or surfaces thereof includes various types of output devices 1384 contained in, carried by, embedded therein and/or attached thereto (e.g., displays, touchscreens, lights, LEDs, speakers, I/O ports (e.g., USB), and the like). In some implementations, compute node 1350 is presented in a network for a specific purpose (e.g., roadside equipment control, provide edge compute services, and the like), but may have processing and/or other capacities that may be utilized for other purposes. In these implementations, the compute node 1350 may be independent from other networked devices and may be provided within the housing having a form factor suitable for its primary purpose; yet be available for other compute tasks that do not interfere with its primary task. Additionally or alternatively, the compute node 1350 may include hardware and software components to manage local issues such as device temperature, vibration, resource utilization, updates, power issues, physical and network security, and so forth.

The example of FIG. 13 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed herein (e.g., a mobile UE in industrial compute for smart city or smart factory, among many other examples).

4. Example Implementations

Additional examples of the presently described method, system, and device implementations include the following, non-limiting implementations. Each of the following non-limiting examples may stand on its own or may be combined in any permutation or combination with any one or more of the other examples provided below or throughout the present disclosure.

Example A01 includes a method of operating a source edge computing platform (ECP) in an edge cluster including a set of ECPs and an edge controller, the method comprising: determining to perform an ECP switch based on a measurement report received from a user equipment (UE) via the source NAN; receiving, via the NIC, target ECP information from the edge controller, wherein the target ECP information indicates a target ECP; sending, via the NIC, an ECP switch request to the target ECP based on the target ECP information, wherein the ECP switch request indicates that an ongoing edge service session should be transferred from the source ECP to the target ECP; and sending, via the NIC, an ECP switch command to the source NAN for delivery to the UE, wherein the ECP switch command instructs the UE to obtain services from the target ECP.

Example A02 includes the method of example A01 and/or some other example(s) herein, wherein the processor circuitry is to execute the instructions to: determining to perform the ECP switch when one or more conditions are met, wherein the one or more conditions include: one or more signal measurements indicated by the measurement report meeting or exceeding a first threshold, an indication that the UE is to be handed over from the source NAN to a target NAN, new or different radio conditions experienced at the source NAN or the UE, a load at the source NAN or the source ECP meeting or exceeding a second threshold, the UE moving to a new or different service area, and the UE switching from using a first edge service to using a second edge service.

Example A03 includes the method of examples A01-A02 and/or some other example(s) herein, wherein the method includes: determining a target NAN identifier (ID) of a target NAN associated with the target ECP; and sending the target NAN ID to the edge controller via the NIC, wherein receipt of the target ECP information is based on the target NAN ID.

Example A04 includes the method of examples A01-A03 and/or some other example(s) herein, wherein the method includes: receiving, from the edge controller, an intra-cluster switch indicator with the target ECP information when the target ECP is in the set of ECPs of the edge cluster.

Example A05 includes the method of examples A01-A04 and/or some other example(s) herein, wherein the method includes: receiving, from the edge controller, an inter-cluster switch indicator with the target ECP information when the target ECP is in another edge cluster.

Example A06 includes the method of examples A01-A05 and/or some other example(s) herein, wherein the method includes: sending, to the target ECP, UE context information of the UE with the ECP switch request.

Example A07 includes the method of example A06 and/or some other example(s) herein, wherein the UE context information includes one or more of data about the ongoing edge service session, UE capabilities, UE location information, security information, UE synchronization capabilities, user application state information, edge application state information, edge application ID, and data flow ID.

Example A08 includes the method of examples A01-A07 and/or some other example(s) herein, wherein the ECP switch command includes the target ECP information and target NAN information.

Example A09 includes the method of example A08 and/or some other example(s) herein, wherein the target ECP information includes a target ECP ID of the target ECP.

Example A10 includes the method of example A08 and/or some other example(s) herein, wherein the target NAN information includes a target NAN ID of a target NAN and target NAN context information of the target NAN.

Example A11 includes the method of examples A01-A10 and/or some other example(s) herein, wherein the method includes: receiving an ECP switch acknowledgement (ACK) message from the target NAN in response to the ECP switch request; and receiving an ECP switch complete message from the UE in response to the ECP switch command.

Example A12 includes the method of example A11 and/or some other example(s) herein, wherein the method includes: forwarding, to the target ECP, downlink edge data intended for the UE after receipt of the ECP switch ACK message or after receipt of the ECP switch complete message.

Example A13 includes a method of operating a target edge computing platform (ECP) in an edge cluster including a set of ECPs, the method comprising: receiving an ECP switch request from a source ECP, wherein the ECP switch request indicates that an ongoing edge service session between the source ECP and a user equipment (UE) should be transferred from the source ECP to the target ECP; preparing an edge service environment to host edge services of the edge service session; sending an ECP switch acknowledgement (ACK) message to the source ECP based on preparation of the edge service environment; receiving an ECP switch complete message from the UE; and hosting the edge services of the edge service session in the edge service environment in response to receipt of the ECP switch complete message.

Example A14 includes the method of example A13 and/or some other example(s) herein, wherein the ECP switch request is based on an ECP switch decision determined by the source ECP when one or more ECP switch conditions are met.

Example A15 includes the method of examples A13-A14 and/or some other example(s) herein, wherein the ECP switch request is based on target ECP information provided to the source ECP by an edge controller in the edge cluster or another edge cluster.

Example A16 includes the method of examples A13-A15 and/or some other example(s) herein, wherein the ECP switch complete message is based on an ECP switch command provided to the UE by the source ECP, wherein the ECP switch command instructs the UE to obtain services from the target ECP.

Example A17 includes the method of example A16 and/or some other example(s) herein, wherein the ECP switch command includes target ECP information and target NAN information, wherein the target ECP information includes a target ECP ID of the target ECP, and the target NAN information includes a target NAN ID of a target NAN and target NAN context information of the target NAN.

Example A18 includes the method of examples A13-A17 and/or some other example(s) herein, wherein the method includes: receiving the ECP switch complete message from the UE via a target network access node (NAN) communicatively coupled with the target ECP.

Example A19 includes the method of examples A13-A18 and/or some other example(s) herein, wherein the method includes: sending, to an edge controller, an ECP switch successful message based on the ECP switch complete message, wherein the edge controller is in the edge cluster or in another edge cluster.

Example A20 includes the method of examples A18-A19 and/or some other example(s) herein, wherein execution of the instructions is to cause the target ECP to: receiving UE context information of the UE with the ECP switch request; and preparing the service environment based on the UE context information.

Example A21 includes the method of example A20 and/or some other example(s) herein, wherein execution of the instructions is to cause the target ECP to: sending the UE context information to the target NAN.

Example A22 includes the method of example A21 and/or some other example(s) herein, wherein the UE context information includes one or more of data about the ongoing edge service session, UE capabilities, UE location information, security information, UE synchronization capabilities, user application state information, edge application state information, edge application ID, and data flow ID.

Example A23 includes the method of examples A18-A22 and/or some other example(s) herein, wherein the method includes: sending a measurement configuration to the UE via the target NAN after receipt of the ECP switch complete message.

Example A24 includes the method of examples A13-A23 and/or some other example(s) herein, wherein execution of the instructions is to cause the target ECP to: preparing the edge service environment when the target ECP is determined to have sufficient resources available to host the edge services.

Example A25 includes the method of examples A13-A24 and/or some other example(s) herein, wherein the method includes: receiving, from the source ECP, downlink edge data intended for the UE after receipt of the ECP switch ACK message or after receipt of the ECP switch complete message.

Example A26 includes a method of operating a user equipment (UE), the method comprising: detecting, by the UE during an edge service session between the UE and a source edge computing platform (ECP), a measurement trigger event indicated by a measurement configuration obtained from a source network access node (NAN) or the source ECP in an edge cluster, the edge cluster including a set of ECPs, and the set of ECPs includes the source ECP; sending, by the UE in response to the detecting, a measurement report including one or more signal measurements to the source ECP via the source NAN; receiving, by the UE, an ECP switch command from the source ECP via the source NAN, wherein the ECP switch command indicates a target ECP to take over the edge service session; sending, by the UE, an ECP switch complete message to the source ECP and the target ECP to indicate completion of a switch of the edge service session to the target ECP; and obtaining, by the UE, edge services from the target ECP.

Example A27 includes the method of example A26 and/or some other example(s) herein, further comprising: collecting, by the UE, one or more signal measurements in response to the detecting.

Example A28 includes the method of examples A26-A27 and/or some other example(s) herein, wherein the measurement trigger event includes one or more of one or more signal measurements of one or more signals from the source NAN meets or falls below a first threshold, one or more signal measurements of one or more signals from a neighboring NAN meets or exceeds a threshold, new or different radio conditions being experienced at the source NAN or the UE, moving into a new or different service area, and switching from using the edge service to using another edge service.

Example A29 includes the method of examples A26-A28 and/or some other example(s) herein, wherein the ECP switch command includes target ECP information, and the target ECP information includes a target ECP identifier (ID) and information for switching the edge service session from the source ECP to the target ECP.

Example A30 includes the method of examples A26-A29 and/or some other example(s) herein, wherein the ECP switch command includes target NAN information of a target NAN associated with the target ECP, and the target NAN information includes a target NAN identifier (ID) and information to establish a connection with the target NAN.

Example A31 includes the method of example A29 and/or some other example(s) herein, wherein the a handover procedure between the source NAN and the target NAN is to take place based on the measurement report.

Example A32 includes the method of examples A26-A31 and/or some other example(s) herein, wherein the target ECP is among the set of ECPs of the edge cluster.

Example A33 includes the method of examples A26-A32 and/or some other example(s) herein, wherein the edge cluster is a source edge cluster, and the target ECP is among another set of ECPs of a target edge cluster different than the source edge cluster.

Example A34 includes a method of operating an edge controller in an edge cluster, the edge cluster including a set of edge computing platforms (ECPs) communicatively coupled with a set of network access nodes (NANs), and the method comprises: receiving a target network access node (NAN) identifier (ID) from a source ECP among the set of ECPs, wherein the source ECP provides edge services to a user equipment (UE) during an edge service session; determining a target ECP associated with the target NAN ID; and sending, to the source ECP, target ECP information indicating the determined target ECP and a cluster switch indicator indicating that an ECP switch to the target ECP is one of an intra-cluster switch or an inter-cluster switch.

Example A35 includes the method of example A34 and/or some other example(s) herein, wherein the method includes: receiving an ECP switch successful message from the target ECP upon successful completion of the ECP switch from the source ECP to the target ECP.

Example A36 includes the method of examples A34-A35 and/or some other example(s) herein, wherein the method includes: mapping the target NAN ID to a target ECP ID of the target ECP.

Example A37 includes the method of examples A34-A36 and/or some other example(s) herein, wherein the method includes: performing a lookup operation on a local database using the target NAN ID to determine a target ECP ID of the target ECP.

Example A38 includes the method of examples A34-A37 and/or some other example(s) herein, wherein the method includes: hashing the target NAN ID to determine the target ECP ID of the target ECP.

Example B01 includes a method comprising: interconnecting one or more edge clusters via public data network and/or one or more private networks as shown and described herein.

Example B02 includes the method of example B01 and/or some other example(s) herein, further comprising: ensuring session continuity for edge computing services between one or more user equipment (UEs) and one or more network access nodes (NANs) including switching from a first communication interface to a second communication interface, and vice versa.

Example B03 includes the method of example B02 and/or some other example(s) herein, wherein the first communication interface is one or more of a cellular PC5 interface, a Uu interface, and/or a 5G-NR interface, and the second interface is a DSRC interface and/or an ITS-G5 interface.

Example B04 includes a method comprising: providing edge computing session continuity between one or more user equipment (UEs) and/or one or more network access nodes (NANs), wherein providing edge computing session continuity comprises switching from a first communication interface to a second communication interface, and vice versa, based on operation of the one or more UEs and/or the one or more NANs and/or according to one or more aspects described herein, or portions thereof.

Example B05 includes the method of example B04 and/or some other example(s) herein, wherein the first communication interface is one or more of a cellular PC5 interface, a Uu interface, and/or a 5G-NR interface, and the second interface is a DSRC interface and/or an ITS-G5 interface Example C01 includes a source edge computing platform (ECP) comprising: network interface circuitry (NIC); memory circuitry to store instructions for operating the source ECP; and processor circuitry connected to the memory circuitry and the NIC, wherein the processor circuitry is to execute the instructions to perform the method of any one or more of examples A01-A12, B01-B05, and/or any other aspect discussed herein.

Example C02 includes a target edge computing platform (ECP) comprising: network interface circuitry (NIC); memory circuitry to store instructions for operating the target ECP; and processor circuitry connected to the memory circuitry and the NIC, wherein the processor circuitry is to execute the instructions to perform the method of any one or more of examples A13-A25, B01-B05, and/or any other aspect discussed herein.

Example C03 includes a user equipment (UE) comprising: communication circuitry; memory circuitry to store instructions for operating the UE; and processor circuitry connected to the memory circuitry and the communication circuitry, wherein the processor circuitry is to execute the instructions to perform the method of any one or more of examples A26-A33, B01-B05, and/or any other aspect discussed herein.

Example C04 includes the UE of example C03, wherein the UE is one of a smartphone, tablet, laptop, in-vehicle infotainment/entertainment system, instrument cluster, head-up display (HUD) device, helmet-mounted display device, augmented reality (AR) device, virtual reality (VR) device, mixed reality (MR) device, onboard diagnostic device, dashtop mobile equipment, mobile data terminal, electronic engine management system, electronic/engine control unit, embedded system, microcontroller, control module, autonomous or semi-autonomous vehicle, autonomous or semi-autonomous drone, autonomous or semi-autonomous robot, autonomous or semi-autonomous sensor, autonomous or semi-autonomous actuator, Internet of Things (IoT) device, business or industrial equipment, or infrastructure equipment.

Example C05 includes an apparatus employed as an edge controller in an edge cluster, the edge cluster including a set of edge computing platforms (ECPs) communicatively coupled with a set of network access nodes (NANs), wherein the apparatus comprises: a memory to store instructions for operating the edge controller; a network interface to communicatively couple the edge controller with the set of ECPs; and one or more processors connected to the memory and the network interface, wherein the one or more processors are to execute the instructions to perform the method of any one or more of examples A34-A38, B01-B05, and/or any other aspect discussed herein.

Example C06 includes the apparatus of example C05 and/or any other aspect discussed herein, wherein the set of NANs includes one or more of evolved NodeBs (eNBs), next generation eNBs, next generation NodeBs (gNBs), E-UTRA-NR gNBs (en-gNBs), road side units (RSUs), remote radio heads (RRHs), WiFi access points (APs), WiMAX base stations, gateway devices, routers, switches, hubs, terrestrial satellites, and/or non-terrestrial satellites.

Example Z01 includes one or more computer readable media comprising instructions, wherein execution of the instructions by processor circuitry is to cause the processor circuitry to perform the method of any of examples A01-A38, B01-B05, and/or any other aspect discussed herein.

Example Z02 includes a computer program comprising the instructions of example Z01.

Example Z03 includes an Application Programming Interface defining functions, methods, variables, data structures, and/or protocols for the computer program of example Z02.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01, wherein the data unit is a datagram, network packet, data frame, data segment, a Protocol Data Unit (PDU), a Service Data Unit (SDU), a message, or a database object.

Example Z11 includes a signal encoded with the data unit of example Z10.

Example Z12 includes an electromagnetic signal carrying the instructions of example Z01.

Example Z13 includes an apparatus comprising means for performing the method of any of examples A01-A38, B01-B05, and/or any other aspect discussed herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," "in some embodiments," or the like, each of which may refer to one or more of the same or different embodiments. The description may use the phrases "in an implementation," "in an example implementation," "in some implementations", or the like, each of which may refer to one or more of the same or different implementations or examples. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "colocated", "collocated", or "co-located" at least in some embodiments refers to two or more elements being in the same place or location, or relatively close to one another (e.g., within some predetermined distance from one another). Additionally or alternatively, the term "colocated" or "co-located" at least in some embodiments refers to the placement or deployment of two or more compute elements or compute nodes together in a secure dedicated storage facility, or within a same enclosure or housing.

The term "establish" or "establishment" at least in some examples refers to (partial or in full) acts, tasks, operations, and the like, related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, and the like, or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value. The term "metric" at least in some examples refers to a standard definition of a quantity, produced in an assessment of performance and/or reliability of the network, which has an intended utility and is carefully specified to convey the exact meaning of a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period. The term "identification" at least in some examples refers to a process of recognizing an identity as distinct from other identities in a particular scope or context, which may involve processing identifiers to reference an identity in an identity database.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), and so forth, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The terms "machine-readable medium" and "computer-readable medium" refers to tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and the like), interpreting, loading, organizing (e.g., dynamically or statically linking), encoding, decoding, encrypting, unencrypting, packaging, unpackaging, or otherwise manipulating the information into the instructions. In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and the like) on one or several remote servers. The source code packages may be encrypted when in transit over a network and decrypted, uncompressed, assembled (e.g., linked) if necessary, and compiled or interpreted (e.g., into a library, stand-alone executable, and the like) at a local machine, and executed by the local machine. The terms "machine-readable medium" and "computer-readable medium" may be interchangeable for purposes of the present disclosure. The term "non-transitory computer-readable medium at least in some examples refers to any type of memory, computer readable storage device, and/or storage disk and may exclude propagating signals and transmission media.

The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "appliance," "computer appliance," or the like, at least in some examples refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "access point" or "AP" at least in some examples refers to an entity that contains one station (STA) and provides access to the distribution services, via the wireless medium (WM) for associated STAs. An AP comprises a STA and a distribution system access function (DSAF).

The term "network controller" at least in some examples refers to a functional block that centralizes some or all of the control and management functionality of a network domain and may provide an abstract view of the network domain to other functional blocks via an interface. The term "network access controller" at least in some examples refers to a functional block that centralizes some or all of the control and management functionality of a network domain and optionally provides an abstract view of its domain to other functional blocks via well-defined interfaces.

The term "cell" at least in some examples refers to a radio network object that can be uniquely identified by a UE from an identifier (e.g., cell ID) that is broadcasted over a geographical area from a network access node (NAN). Additionally or alternatively, the term "cell" at least in some examples refers to a geographic area covered by a NAN.

The term "E-UTEAN NodeB", "eNodeB", or "eNB" at least in some examples refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface. The term "next generation eNB" or "ng-eNB" at least in some examples refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface. The term "Next Generation NodeB", "gNodeB", or "gNB" at least in some examples refers to a RAN node providing NR user plane and control plane protocol terminations towards a UE, and connected via the NG interface to the 5GC. Two or more gNBs are interconnected with each other (and/or with one or more ng-eNBs) by means of an Xn interface. The term "E-UTRA-NR gNB" or "en-gNB" at least in some examples refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.8.0 (2021-12-23)). Two or more en-gNBs are interconnected with each other (and/or with one or more eNBs) by means of an X2 interface. The term "Next Generation RAN node" or "NG-RAN node" at least in some examples refers to either a gNB or an ng-eNB. The term "IAB-node" at least in some examples refers to a RAN node that supports new radio (NR) access links to user equipment (UEs) and NR backhaul links to parent nodes and child nodes. The term "IAB-donor" at least in some examples refers to a RAN node (e.g., a gNB) that provides network access to UEs via a network of backhaul and access links.

The term "Transmission Reception Point" or "TRxP" at least in some examples refers to an antenna array with one or more antenna elements available to a network located at a specific geographical location for a specific area.

The term "Central Unit" or "CU" at least in some examples refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs. The term "Distributed Unit" or "DU" at least in some examples refers to a logical node hosting Backhaul Adaptation Protocol (BAP), F1 application protocol (F1AP), radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU. The term "Radio Unit" or "RU" at least in some examples refers to a logical node hosting PHY layer or Low-PHY layer and radiofrequency (RF) processing based on a lower layer functional split.

The term "Road Side Unit" or "RSU" at least in some examples refers to a stationary infrastructure entity supporting V2X applications that can exchange messages with other entities supporting V2X applications. Additionally or alternatively, the term "Road Side Unit" or "RSU" at least in some examples refers to a logical entity that supports V2X application logic using functionality provided by either a network or a UE (referred to as "UE-type RSU").

The term "split architecture" at least in some examples refers to an architecture in which an RU and DU are physically separated from one another, and/or an architecture in which a DU and a CU are physically separated from one another. The term "integrated architecture at least in some examples refers to an architecture in which an RU and DU are implemented on one platform, and/or an architecture in which a DU and a CU are implemented on one platform.

The term "Residential Gateway" or "RG" at least in some examples refers to a device providing, for example, voice, data, broadcast video, video on demand, to other devices in customer premises. The term "Wireline 5G Access Network" or "W-5GAN" at least in some examples refers to a wireline AN that connects to a 5GC via N2 and N3 reference points. The W-5GAN can be either a W-5GBAN or W-5GCAN. The term "Wireline 5G Cable Access Network" or "W-5GCAN" at least in some examples refers to an access network defined in/by CableLabs. The term "Wireline BBF Access Network" or "W-5GBAN" at least in some examples refers to an Access Network defined in/by the Broadband Forum (BBF). The term "Wireline Access Gateway Function" or "W-AGF" at least in some examples refers to a Network function in W-5GAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "cloud service provider" or "CSP" indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing. The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems.

The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), OSs, virtual machines (VMs), software/applications, computer files, and/or the like.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s).

The term "network function virtualization" or "NFV" at least in some examples refers to the principle of separating network functions from the hardware they run on by using virtualization techniques and/or virtualization technologies. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed. The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s).

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node"

used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network.

The term "protocol" at least in some embodiments refers to a predefined procedure or method of performing one or more operations. Additionally or alternatively, the term "protocol" at least in some embodiments refers to a common means for unrelated objects to communicate with each other (sometimes also called interfaces.

The term "communication protocol" at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure.

The term "application layer" at least in some embodiments refers to an abstraction layer that specifies shared communications protocols and interfaces used by hosts in a communications network. Additionally or alternatively, the term "application layer" at least in some embodiments refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "transport layer" at least in some embodiments refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (µTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some embodiments refers to a protocol layer that includes means for transferring network packets from a source to a destination via one or more networks. Additionally or alternatively, the term "network layer" at least in some embodiments refers to a protocol layer that is responsible for packet forwarding and/or routing through intermediary nodes. Additionally or alternatively, the term "network layer" or "internet layer" at least in some embodiments refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "radio resource control", "RRC layer", or "RRC" at least in some embodiments refers to a protocol layer or sublayer that performs system information handling; paging; establishment, maintenance, and release of RRC connections; security functions; establishment, configuration, maintenance and release of Signaling Radio Bearers (SRBs) and Data Radio Bearers (DRBs); mobility functions/services; QoS management; and some sidelink specific services and functions over the Uu interface (see e.g., 3GPP TS 36.331 v17.0.0 (2022-04-13) ("[TS36331]") and/or 3GPP TS 38.331 v17.0.0 (2022-04) ("[TS38331]")).

The term "Service Data Adaptation Protocol", "SDAP layer", or "SDAP" at least in some embodiments refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022-04-13)).

The term "Packet Data Convergence Protocol", "PDCP layer", or "PDCP" at least in some embodiments refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.0.0 (2022-04-15) and/or 3GPP TS 38.323 v17.0.0 (2022-04-14)).

The term "radio link control layer", "RLC layer", or "RLC" at least in some embodiments refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 38.322 v17.0.0 (2022-04-15) and 3GPP TS 36.322 v17.0.0 (2022-04-15)).

The term "medium access control protocol", "MAC protocol", or "MAC" at least in some embodiments refers to a protocol that governs access to the transmission medium in a network, to enable the exchange of data between stations in a network. Additionally or alternatively, the term "medium access control layer", "MAC layer", or "MAC" at least in some embodiments refers to a protocol layer or sublayer that performs functions to provide frame-based, connectionless-mode (e.g., datagram style) data transfer between stations or devices. Additionally or alternatively, the term "medium access control layer", "MAC layer", or "MAC" at least in some embodiments refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (2022-04-14) and 3GPP TS 36.321 v17.0.0 (2022-04) (collectively referred to as "[TSMAC]")).

The term "physical layer", "PHY layer", or "PHY" at least in some embodiments refers to a protocol layer or sublayer that includes capabilities to transmit and receive modulated signals for communicating in a communications network (see e.g., [IEEE802], 3GPP TS 38.211 v17.0.1 (2022-04-01), 3GPP TS 36.211 v17.0.1 (2022-04-01), 3GPP TS 38.201 v17.0.0 (2022-01-05), and 3GPP TS 36.201 v17.0.0 (2022-03-31)).

The term "RAT type" at least in some examples may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("[IEEE802]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) (and variants thereof such as HSPA Plus (HSPA+), and the like), Long Term Evolution (LTE) (and variants thereof such as LTE-Advanced (LTE-A), Evolved UTRA (E-UTRA), LTE Extra, LTE-A Pro, LTE LAA, MuLTEfire, and the like), Fifth Generation (5G) or New Radio (NR), and the like; ETSI technologies such as High Performance Radio Metropolitan Area Network (HiperMAN) and the like; IEEE technologies such as [IEEE802] and/or WiFi (e.g., [IREEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), and the like; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and the like), IEEE 802.15 technologies/standards (e.g., IEEE Standard for Low-Rate Wireless Networks, IEEE Std 802.15.4-2020, pp. 1-800 (23 Jul. 2020) ("[IREEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as *IEEE Standard for Local and metropolitan area networks—Part 15.7: Short-Range Optical Wireless Communications*, IEEE Std 802.15.7-2018, pp. 1-407 (23 Apr. 2019), and the like; V2X communication including 3GPP cellular V2X (C-V2X), *Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments*, IEEE Std 802.11p-2010, pp. 1-51 (15 Jul. 2010) ("[IREEE80211p]"), which is now part of [IREEE80211]), IEEE 802.11bd (e.g., for vehicular ad-hoc environments), Dedicated Short Range Communications (DSRC), Intelligent-Transport-Systems (ITS) (including the European ITS-G5, ITS-GSB, ITS-GSC, and the like); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "flow" at least in some examples refers to a sequence of data and/or data units (e.g., datagrams, packets, or the like) from a source entity/element to a destination entity/element. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. For purposes of the present disclosure, the terms "traffic flow", "data flow", "dataflow", "packet flow", "network flow", and/or "flow" may be used interchangeably even though these terms at least in some examples refers to different concepts. The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use light-weight protocols. The term "network service" at least in some examples refers to a composition of Network Function (s) and/or Network Service(s), defined by its functional and behavioral specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems. The term "Quality of Service" or "QoS' at least in some examples refers to a description or measurement of the overall performance of a service (e.g., telephony and/or cellular service, network service, wireless communication/connectivity service, cloud computing service, and the like). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some examples refers to mechanisms that provide traffic-forwarding treatment based on flow-specific traffic classification. In some implementations, the term "Quality of Service" or "QoS" can be used interchangeably with the term "Class of Service" or "CoS".

The term "PDU Connectivity Service" at least in some examples refers to a service that provides exchange of protocol data units (PDUs) between a UE and a data network (DN). The term "PDU Session" at least in some examples refers to an association between a UE and a DN that provides a PDU connectivity service (see e.g., 3GPP TS 38.415 v16.6.0 (2021-12-23) ("[TS38415]") and 3GPP TS 38.413 v16.8.0 (2021-12-23) ("[TS38413]"), the contents of each of which are hereby incorporated by reference in their entireties); a PDU Session type can be IPv4, IPv6, IPv4v6, Ethernet (see e.g., [IREEE8023]), Unstructured, or any other network/connection type, such as those discussed herein. The term "PDU Session Resource" at least in some examples refers to an NG-RAN interface (e.g., NG, Xn, and/or E1 interfaces) and radio resources provided to support a PDU Session. The term "multi-access PDU session" or "MA PDU Session" at least in some examples refers to a PDU Session that provides a PDU connectivity service, which can use one access network at a time or multiple access networks simultaneously.

The term "data network" or "DN" at least in some examples refers to a network hosting data-centric services such as, for example, operator services, the internet, third-party services, or enterprise networks. Additionally or alternatively, a DN at least in some examples refers to service networks that belong to an operator or third party, which are offered as a service to a client or user equipment (UE). DNs are sometimes referred to as "Packet Data Networks" or "PDNs". The term "Local Area Data Network" or "LADN" at least in some examples refers to a DN that is accessible by the UE only in specific locations, that provides connectivity to a specific DNN, and whose availability is provided to the UE.

The term "network path" or "path" at least in some embodiments refers to a data communications feature of a communication system describing the sequence and identity of system components visited by one or more packets, where the components of the path may be either logical or physical. The term "network forwarding path" at least in some embodiments refers to an ordered list of connection points forming a chain of NFs and/or nodes, along with policies associated to the list.

The term "forwarding treatment" at least in some embodiments refers to the precedence, preferences, and/or prioritization a packet belonging to a particular dataflow receives in relation to other traffic of other dataflows. Additionally or alternatively, the term "forwarding treatment" at least in some embodiments refers to one or more parameters, characteristics, and/or configurations to be applied to packets belonging to a dataflow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "network address" at least in some examples refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) (including any RNTI discussed in clause 8.1 of [TS38300]), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI), 5G QoS Identifier (5QI), PC5 QoS Flow Identifier (PFI), PC5 5QI (PQI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, Provider Service Identifier (PSID), UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), and the like), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some examples refers to an identifier that can be mapped to a specific application or application instance; in the context of 3GPP 5G/NR systems, an "application identifier" at least in some examples refers to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer. The term "network socket" or "socket" at least in some examples refers to an element that serves as an endpoint for sending and receiving data across a network or for inter-process communication. The structure and properties of a socket can be defined by one or more APIs, and may be identified by a socket address or the like. The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service.

The term "Geo-Area" at least in some examples refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x,y) assumes the canonical form of the geometric shapes: The Cartesian coordinate system has its origin in the center of the shape. Its abscissa is parallel to the long side of the shapes. Point P is defined relative to this coordinate system.

The term "vehicle" may refer to road vehicle designed to carry people or cargo on public roads and highways such as AVs, busses, cars, trucks, vans, motor homes, and motorcycles; by water such as boats, ships, and the like; or in the air such as airplanes, helicopters, UAVs, satellites, and the like.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment. The term "process" at least in some examples refers to an instance of a computer program that is being executed by one or more threads. In some implementations, a process may be made up of multiple threads of execution that execute instructions concurrently. The term "algorithm" at least in some examples refers to an unambiguous specification of how to solve a problem or a class of problems by performing calculations, input/output operations, data processing, automated reasoning tasks, and/or the like. The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "user" in the context of reconfigurable radio equipment/systems, at least in some examples refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and the like). Furthermore, various standards (e.g., 3GPP, ETSI, and the like) may define various message formats, PDUs, containers, frames, and/or other data structures, as comprising a sequence of optional or mandatory data elements (DEs), data frames (DFs), information elements (IEs), and/or the like. However, the requirements of any particular standard should not limit the scope of the present disclosure, and as such, any combination of containers, frames, DFs, DEs, IEs, values, components, fields, actions, features, and/or data structures are possible, including any combination of containers, frames, DFs, DEs, IEs, values, components, fields, actions, features, and/or data structures that are strictly required to be followed in order to conform to such standards or any combination of containers, frames, DFs, DEs, IEs, values, components, fields, actions, features, and/or data structures strongly recommended and/or used with or in the presence/absence of optional elements.

The present disclosure includes the aforementioned description and the accompanying drawings. The present disclosure shows and described, by way of examples and not of limitation, specific implementations in which the subject matter may be practiced. The present disclosure shows and describes the inventive aspects in sufficient detail to enable those skilled in the art to practice the teachings disclosed herein. Although the present disclosure shows and describes specific example implementations, various modifications and changes may be made to these implementations without departing from the broader scope of the present disclosure. Other aspects may be utilized and derived from the implementations discussed herein, such that structural and logical substitutions and changes may be made without departing from the scope of the present disclosure. The present disclosure is not to be taken in a limiting sense, and the scope of various aspects is defined by the appended claims, along with the full range of equivalents to which such claims are entitled.

The invention claimed is:

1. A source edge computing platform (ECP) in an edge cluster including a set of ECPs and an edge controller, the source ECP comprising:
   network interface circuitry (NIC) to communicatively couple the source ECP to the edge controller and a source network access node (NAN);
   memory circuitry to store instructions for operating the source ECP; and
   processor circuitry connected to the memory circuitry and the NIC, wherein the processor circuitry is to execute the instructions to:
      determine to perform an ECP switch based on a measurement report received from a user equipment (UE) via the source NAN;
      receive, via the NIC, target ECP information from the edge controller, wherein the target ECP information indicates a target ECP;
      send, via the NIC, an ECP switch request to the target ECP based on the target ECP information, wherein the ECP switch request indicates that an ongoing edge service session should be transferred from the source ECP to the target ECP; and
      send, via the NIC, an ECP switch command to the source NAN for delivery to the UE, wherein the ECP switch command instructs the UE to obtain services from the target ECP.

2. The source ECP of claim 1, wherein the processor circuitry is to execute the instructions to:
determine to perform the ECP switch when one or more conditions are met, wherein the one or more conditions include one or more of:
one or more signal measurements indicated by the measurement report meeting or exceeding a first threshold,
an indication that the UE is to be handed over from the source NAN to a target NAN,
new or different radio conditions experienced at the source NAN or the UE,
a load at the source NAN or the source ECP meeting or exceeding a second threshold,
the UE moving to a new or different service area, and
the UE switching from using a first edge service to using a second edge service.

3. The source ECP of claim 1, wherein the processor circuitry is to execute the instructions to:
determine a target NAN identifier (ID) of a target NAN associated with the target ECP; and
send the target NAN ID to the edge controller via the NIC, wherein receipt of the target ECP information is based on the target NAN ID.

4. The source ECP of claim 1, wherein the processor circuitry is to execute the instructions to:
receive, from the edge controller, an intra-cluster switch indicator with the target ECP information when the target ECP is in the set of ECPs of the edge cluster.

5. The source ECP of claim 1, wherein the processor circuitry is to execute the instructions to:
receive, from the edge controller, an inter-cluster switch indicator with the target ECP information when the target ECP is in another edge cluster.

6. The source ECP of claim 1, wherein the processor circuitry is to execute the instructions to:
send, to the target ECP, UE context information of the UE with the ECP switch request, wherein the UE context information includes one or more of data about the ongoing edge service session, UE capabilities, UE location information, security information, UE synchronization capabilities, user application state information, edge application state information, edge application ID, and data flow ID.

7. The source ECP of claim 1, wherein the ECP switch command includes the target ECP information and target NAN information, wherein the target ECP information includes a target ECP ID of the target ECP, and the target NAN information includes a target NAN ID of a target NAN and target NAN context information of the target NAN.

8. The source ECP of claim 1, wherein the processor circuitry is to execute the instructions to:
receive an ECP switch acknowledgement (ACK) message from the target NAN in response to the ECP switch request; and
receive an ECP switch complete message from the UE in response to the ECP switch command.

9. The source ECP of claim 8, wherein the processor circuitry is to execute the instructions to:
forward, to the target ECP, downlink edge data intended for the UE after receipt of the ECP switch ACK message or after receipt of the ECP switch complete message.

10. One or more non-transitory computer readable medium, comprising instructions for operating a target edge computing platform (ECP) in an edge cluster including a set of ECPs, wherein execution of the instructions by one or more processors is to cause the target ECP to:
receive an ECP switch request from a source ECP, wherein the ECP switch request indicates that an ongoing edge service session between the source ECP and a user equipment (UE) should be transferred from the source ECP to the target ECP;
prepare an edge service environment to host edge services of the edge service session;
send an ECP switch acknowledgement (ACK) message to the source ECP based on preparation of the edge service environment;
receive an ECP switch complete message from the UE; and
host the edge services of the edge service session in the edge service environment in response to receipt of the ECP switch complete message.

11. The one or more non-transitory computer readable medium of claim 10, wherein the ECP switch request is based on an ECP switch decision determined by the source ECP when one or more ECP switch conditions are met.

12. The one or more non-transitory computer readable medium of claim 10, wherein the ECP switch request is based on target ECP information provided to the source ECP by an edge controller in the edge cluster or another edge cluster.

13. The one or more non-transitory computer readable medium of claim 10, wherein execution of the instructions is to cause the target ECP to:
receive the ECP switch complete message from the UE via a target network access node (NAN) communicatively coupled with the target ECP.

14. The one or more non-transitory computer readable medium of claim 13, wherein execution of the instructions is to cause the target ECP to:
send, to an edge controller, an ECP switch successful message based on the ECP switch complete message, wherein the edge controller is in the edge cluster or in another edge cluster.

15. The one or more non-transitory computer readable medium of claim 13, wherein execution of the instructions is to cause the target ECP to:
receive UE context information with the ECP switch request; and
prepare the service environment based on the UE context information.

16. The one or more non-transitory computer readable medium of claim 15, wherein execution of the instructions is to cause the target ECP to:
send the UE context information to the target NAN, wherein the UE context information includes one or more of data about the ongoing edge service session, UE capabilities, UE location information, security information, UE synchronization capabilities, user application state information, edge application state information, edge application ID, and a data flow ID.

17. The one or more non-transitory computer readable medium of claim 13, wherein execution of the instructions is to cause the target ECP to:
send a measurement configuration to the UE via the target NAN after receipt of the ECP switch complete message.

18. The one or more non-transitory computer readable medium of claim 10, wherein execution of the instructions is to cause the target ECP to:
prepare the edge service environment when the target ECP is determined to have sufficient resources available to host the edge services.

19. The one or more non-transitory computer readable medium of claim 10, wherein execution of the instructions is to cause the target ECP to:
  receive, from the source ECP, downlink edge data intended for the UE after receipt of the ECP switch ACK message or after receipt of the ECP switch complete message.

20. A method of operating a user equipment (UE), the method comprising:
  detecting, by the UE during an edge service session between the UE and a source edge computing platform (ECP), a measurement trigger event indicated by a measurement configuration obtained from a source network access node (NAN) or the source ECP in an edge cluster, the edge cluster including a set of ECPs, and the set of ECPs includes the source ECP;
  sending, by the UE in response to the detecting, a measurement report including one or more signal measurements to the source ECP via the source NAN;
  receiving, by the UE, an ECP switch command from the source ECP via the source NAN, wherein the ECP switch command indicates a target ECP to take over the edge service session;
  sending, by the UE, an ECP switch complete message to the source ECP and the target ECP to indicate completion of a switch of the edge service session to the target ECP; and
  obtaining, by the UE, edge services from the target ECP.

21. The method of claim 20, further comprising:
  collecting, by the UE, one or more signal measurements in response to the detecting.

22. The method of claim 21, wherein the measurement trigger event includes one or more of:
  one or more signal measurements of one or more signals from the source NAN meets or falls below a first threshold,
  one or more signal measurements of one or more signals from a neighboring NAN meets or exceeds a threshold,
  new or different radio conditions being experienced at the source NAN or the UE,
  moving into a new or different service area, and
  switching from using the edge service to using another edge service.

23. The method of claim 20, wherein the ECP switch command includes target ECP information, and the target ECP information includes a target ECP identifier (ID) and information for switching the edge service session from the source ECP to the target ECP.

24. The method of claim 20, wherein the ECP switch command includes target NAN information of a target NAN associated with the target ECP, and the target NAN information includes a target NAN identifier (ID) and information to establish a connection with the target NAN.

25. The method of claim 20, wherein the target ECP is among the set of ECPs of the edge cluster, or the target ECP is among another set of ECPs of another edge cluster different than the edge cluster.

* * * * *